(12) United States Patent
Mathur et al.

(10) Patent No.: US 12,348,581 B2
(45) Date of Patent: Jul. 1, 2025

(54) STREAMING ANOMALY DETECTION

(71) Applicant: VMware LLC, Palo Alto, CA (US)

(72) Inventors: Keshav Mathur, Palo Alto, CA (US); Jinyi Lu, Palo Alto, CA (US); Xing Wang, Palo Alto, CA (US); Darren Brown, Seattle, WA (US); Peng Gao, Palo Alto, CA (US); Junyuan Lin, Bellevue, WA (US); Paul Pedersen, Palo Alto, CA (US)

(73) Assignee: VMWare LLC, Palo Alto, CA (US)

( * ) Notice: Subject to any disclaimer, the term of this patent is extended or adjusted under 35 U.S.C. 154(b) by 641 days.

(21) Appl. No.: 16/682,255

(22) Filed: Nov. 13, 2019

(65) Prior Publication Data

US 2021/0144164 A1 May 13, 2021

(51) Int. Cl.
*H04L 67/10* (2022.01)
*H04L 9/40* (2022.01)
*H04L 41/14* (2022.01)
*H04L 41/147* (2022.01)
*H04L 41/40* (2022.01)
*H04L 43/08* (2022.01)

(52) U.S. Cl.
CPC ............ *H04L 67/10* (2013.01); *H04L 41/145* (2013.01); *H04L 41/147* (2013.01); *H04L 41/40* (2022.05); *H04L 43/08* (2013.01); *H04L 63/1425* (2013.01)

(58) Field of Classification Search
CPC ............... H04L 63/1425; H04L 41/145; H04L 41/147; H04L 42/08
USPC .......................................................... 726/23
See application file for complete search history.

(56) References Cited

U.S. PATENT DOCUMENTS

2017/0262275 A1* 9/2017 Mohiuddin ............ G06N 20/00
2019/0095478 A1* 3/2019 Tankersley .......... G06F 16/2379

* cited by examiner

*Primary Examiner* — Suraj M Joshi
(74) *Attorney, Agent, or Firm* — Quarles & Brady LLP

(57) ABSTRACT

Computational methods and systems to detect anomalous behaving resources and objects of a distributed computing system are described. Multiple streams of metric data representing usage of various resources of the distributed computing system are sent to a management system of the distributed computing system. The management system updates a performance model based on newly received metric values of the streams of metric data. The updated performance model is used to detect changes in one or more of the streams of metric data. The changes may be an indication of anomalous behavior at resources and objects associated with the streams of metric data. An anomaly listener is notified of anomalous behavior by the resource or object when a change in one or more of the streams of metric data is detected.

18 Claims, 55 Drawing Sheets

$$S = \begin{bmatrix} cov(s1, s1) & cov(s1, s2) & \cdots & cov(s1, sP) \\ cov(s2, s1) & cov(s2, s2) & & cov(s2, sP) \\ & \cdot & & \\ cov(sP, s1) & cov(sP, s2) & & cov(sP, sP) \end{bmatrix}$$

STREAMING ANOMALY DETECTION

TECHNICAL FIELD

This disclosure is directed to automated methods and systems that detect anomalous behavior of objects and of a distributed computing system.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies.

Because distributed computing systems have an enormous number of computational resources, various management systems have been developed to collect performance information about the resources and applications running in a distributed computing system. For example, a typical management system collects multiple streams of metric data regarding processor, memory, disk storage, and network usage and may collect streams representing error rates and response times of applications. Each data point of a stream of metric data represents an amount or measured quantity of a resource or application in use at a point in time. The management system may separately process each stream of metric data to detect performance problems and generate alerts when a performance problem occurs.

Streams of metric data are generated at high frequencies and ideally should be processed in real time to quickly detect and resolve performance problems. Failure to timely respond to a performance problem can interrupt services and have enormous cost implications for datacenter tenants, such as when a datacenter tenant's server applications stop running or fails to timely respond to client requests. For example, by the time an IT administrator of a large datacenter or an application owner has been alerted by a typical management system that a metric for a resource or application has violated a performance threshold, applications, VMs, and containers may have slowed significantly or stopped running. In recent years, the ability of typical management systems to detect performance problems in real time has become increasingly more challenging because the volume of metric data continues to increase with the increasing size and complexity of distributed computing systems. In addition, typical management systems detect performance problems for a single stream of metric data but are not able to detect performance problems from related streams of metric data when the streams separately do not indicate a performance problem. As a result, the IT administrator must immediately execute remedial measures after performance problems are detected, which is error prone and may only temporarily address the problems. IT administrators seek management systems that identify performance problems in real time so that IT administrators have time to assess the problems and implement appropriate remedial measures that avoid future interruptions in services.

SUMMARY

Computational methods and systems to detect anomalous behaving resources and objects of a distributed computing system are described herein. Multiple streams of metric data are sent to a management system of the distributed computing system. The management system updates one or more performance models based on newly received metric values of the streams of metric data. The updated performance model is used to detect anomalies in one or more of the streams of metric data. The anomalies me be point anomalies, contextual anomalies, and collective anomalies. A point anomaly occurs when a metric value is abnormal with respect to other metric values in a stream of metric data. A contextual anomaly occurs when metric values exhibit abnormal behavior in a specific context, but not in other contexts. Collective anomalies occur when metric values of related streams of metric data exhibit anomalous behavior but metric values of each stream of metric data do not exhibit anomalous behavior. An anomaly in a stream of metric data may be an indication of anomalous behavior at resources, applications, and objects. When anomalous behavior is detected, an anomaly listener is notified.

DETAILED DESCRIPTION

This disclosure presents computational methods and systems for detecting anomalous behavior in multiple streams of metric data of a distributed computing system. In a first subsection, computer hardware, complex computational systems, and virtualization are described. Methods and systems to detect anomalous behavior in a distributed computing system are described below in a second subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces.

Figure 1:
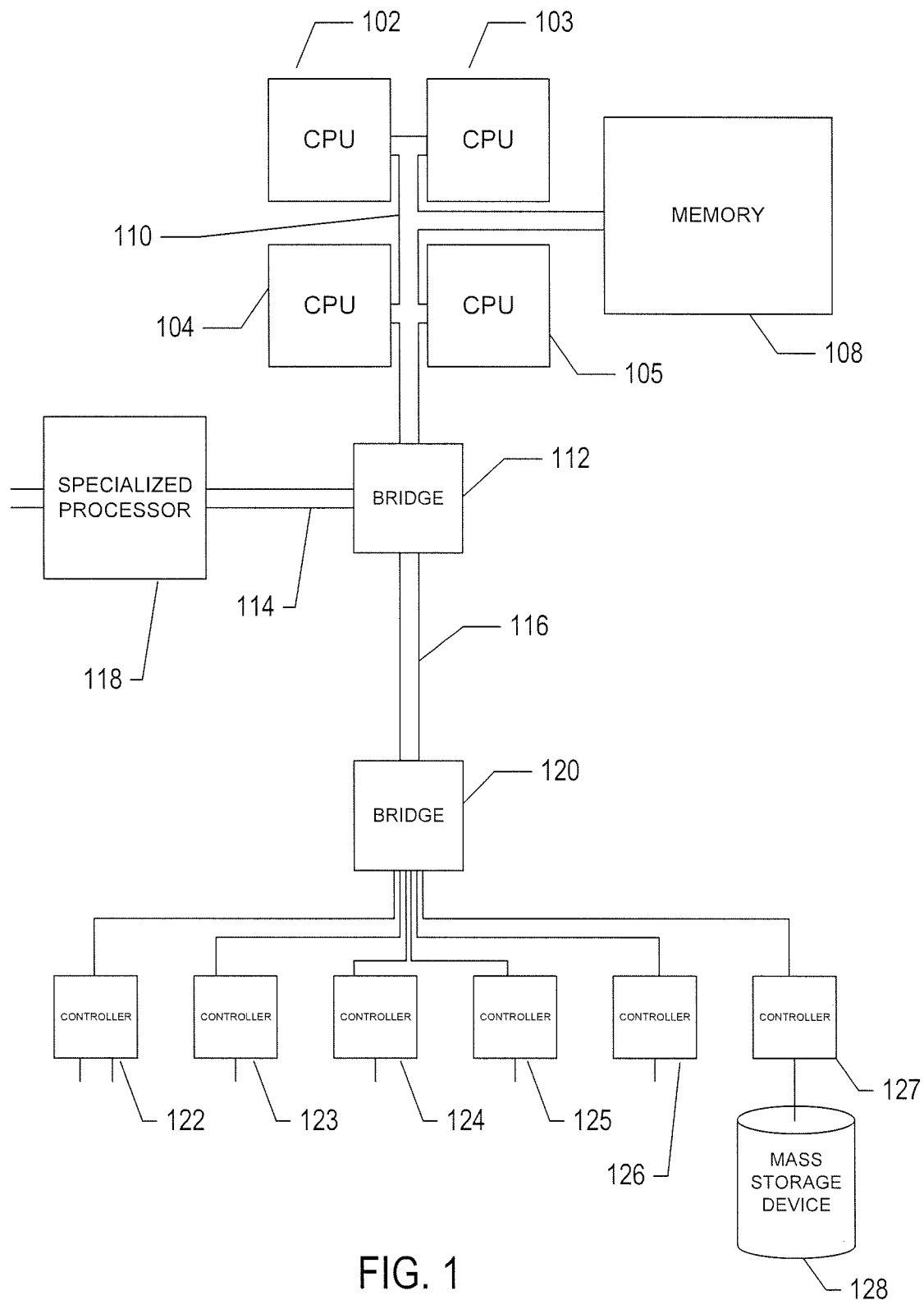
FIG. 1 shows an architectural diagram for various types of computers.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
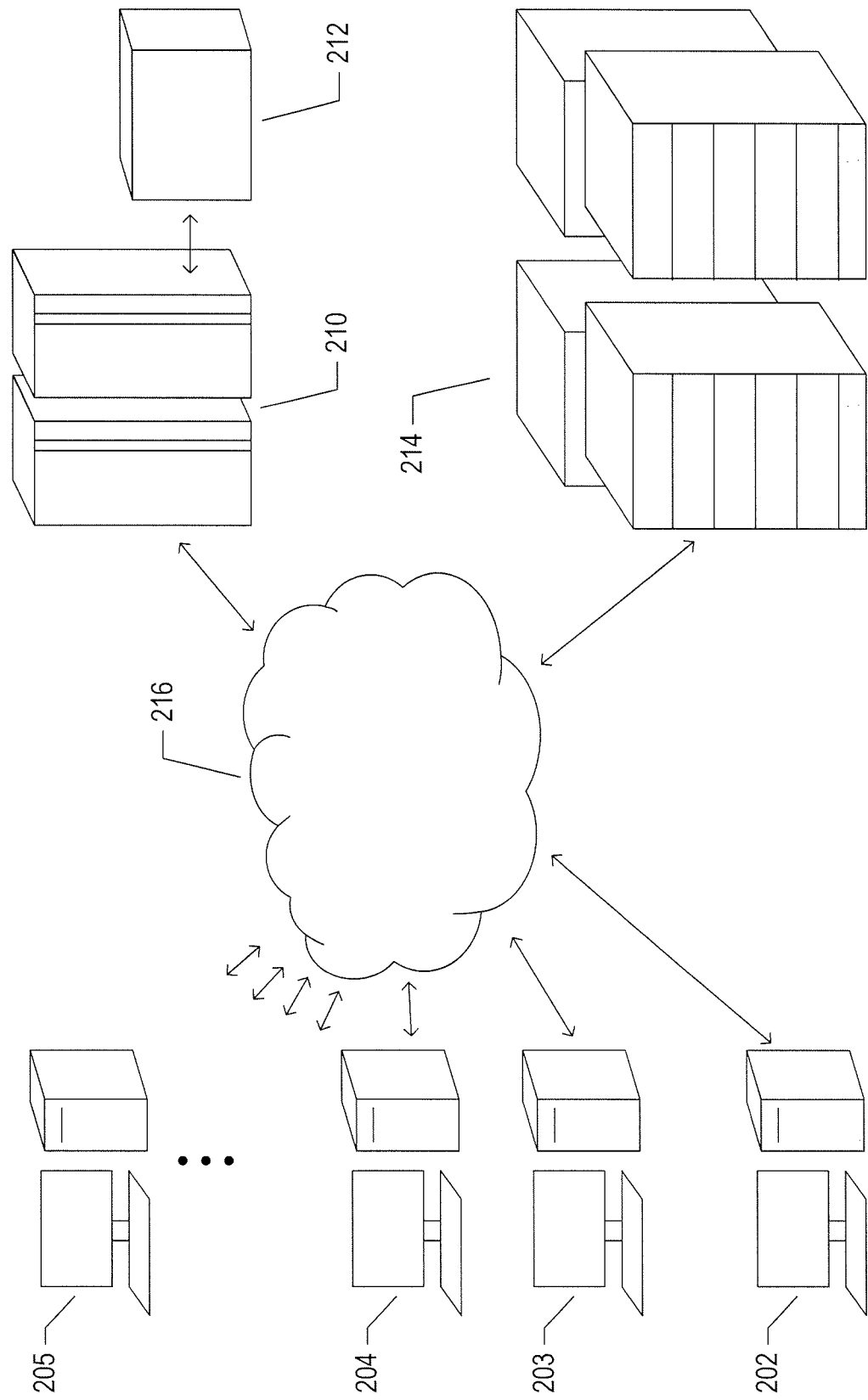
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
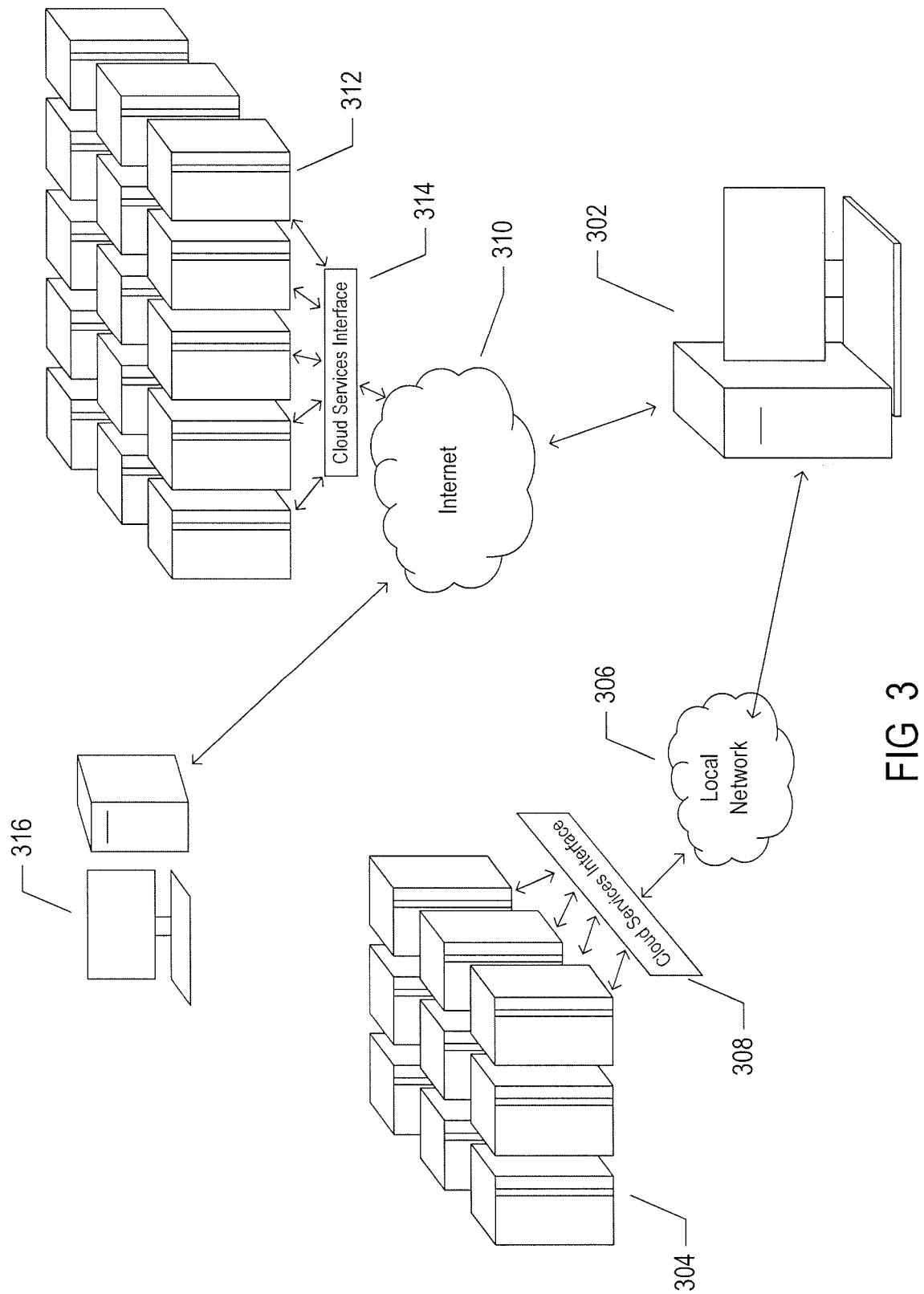
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
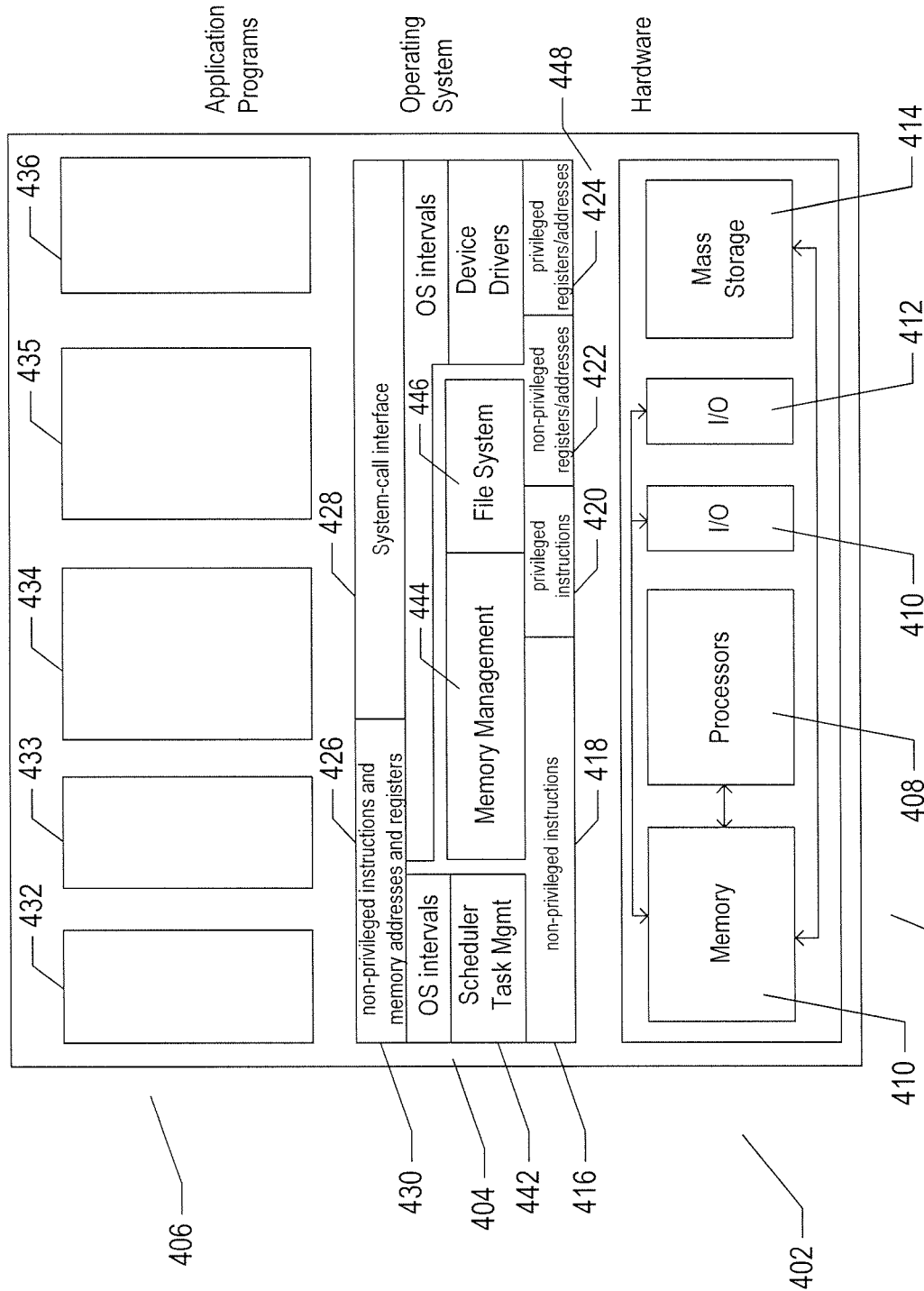
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
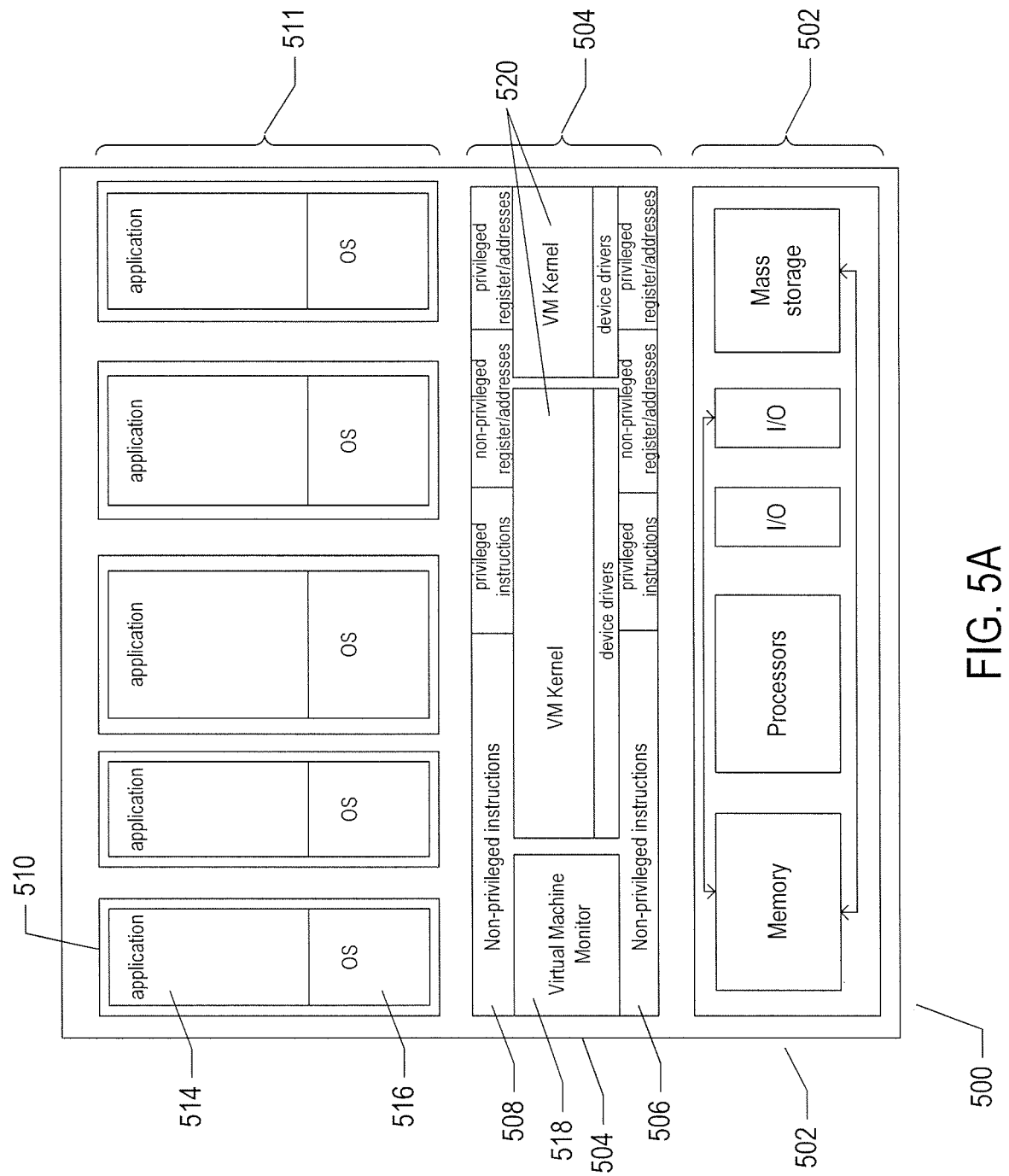
FIGS. 5A-5B show two types of virtual machine ("VM") and VM execution environments.
Figure 5B:
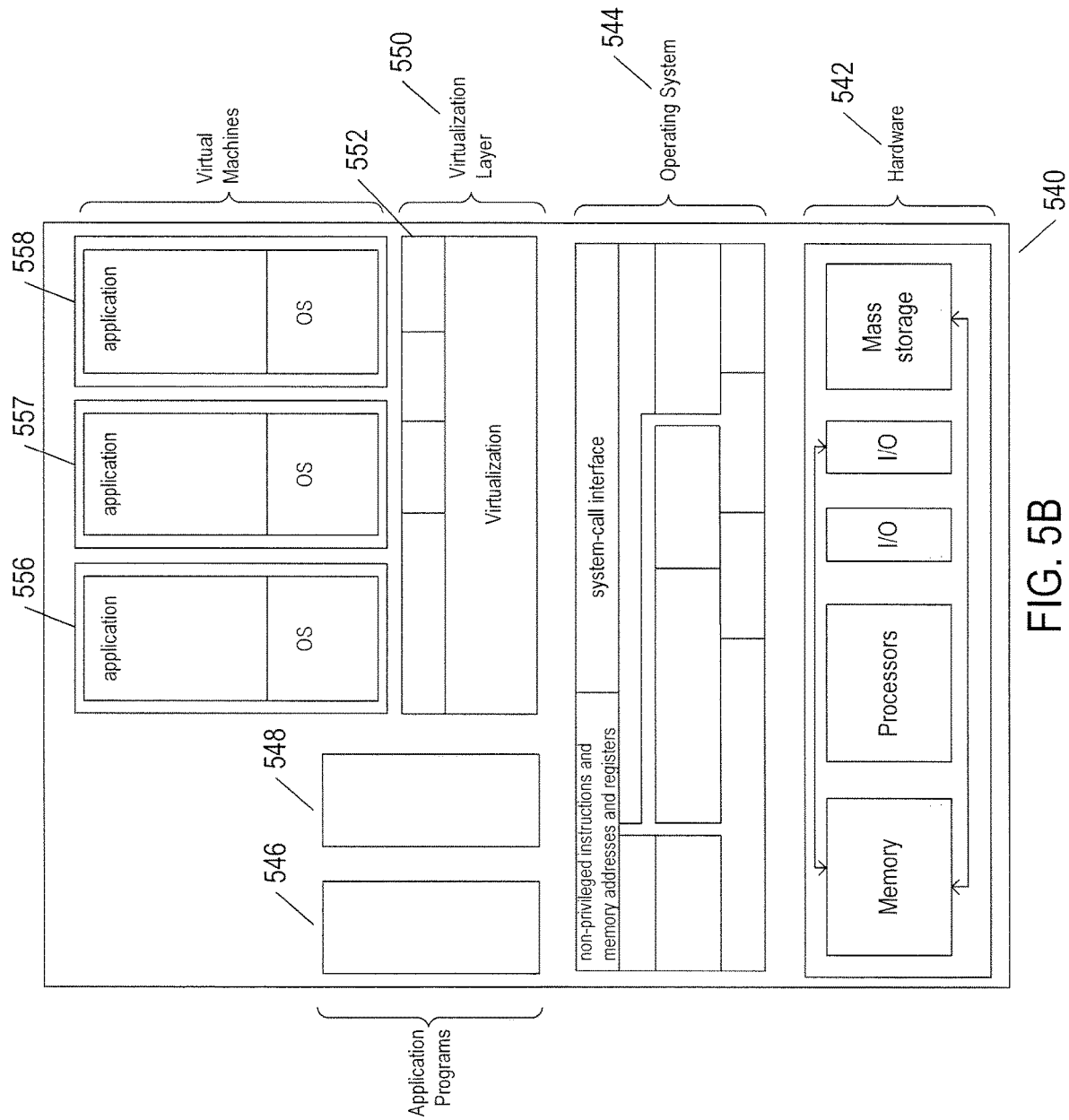

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within the VMs interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
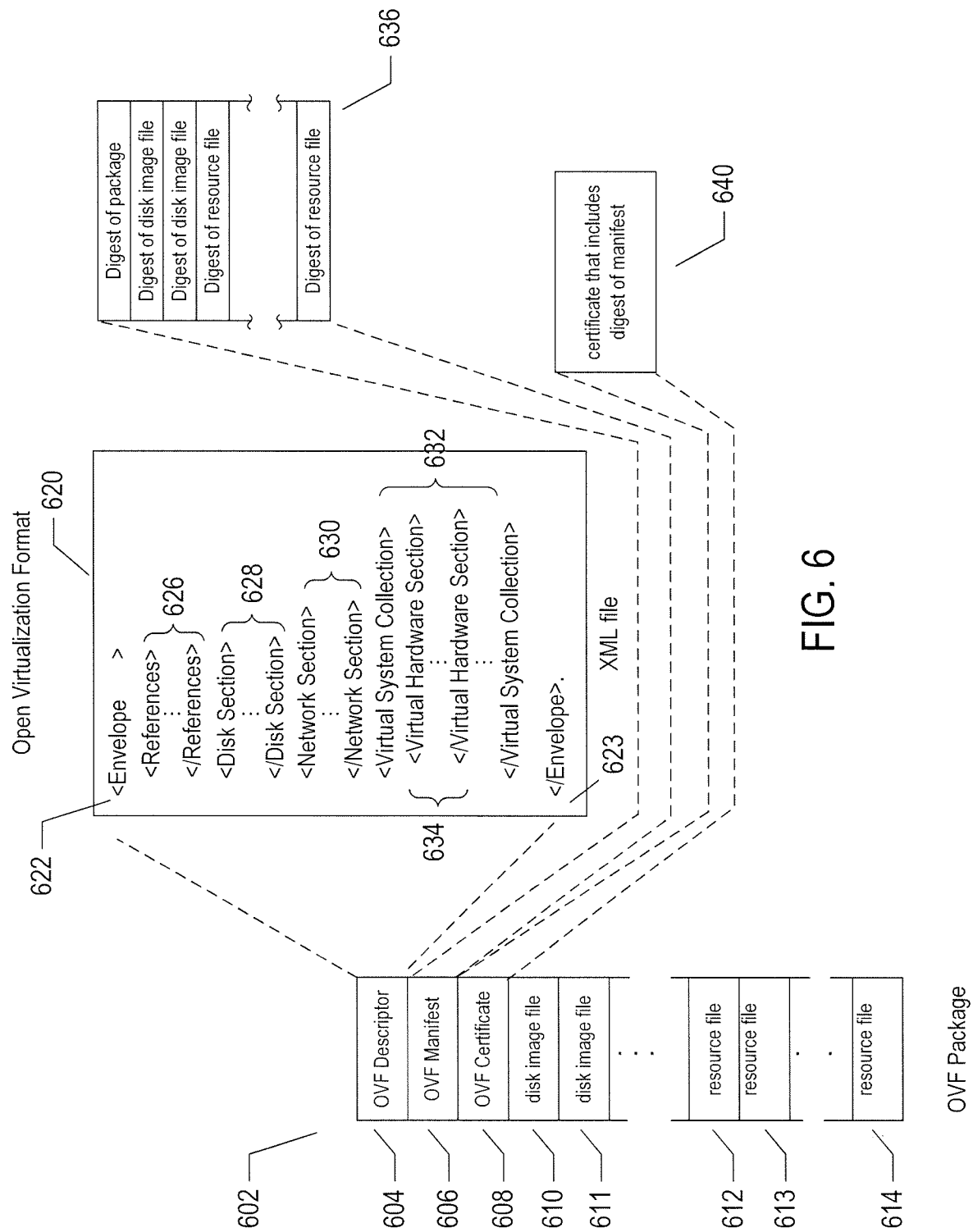
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
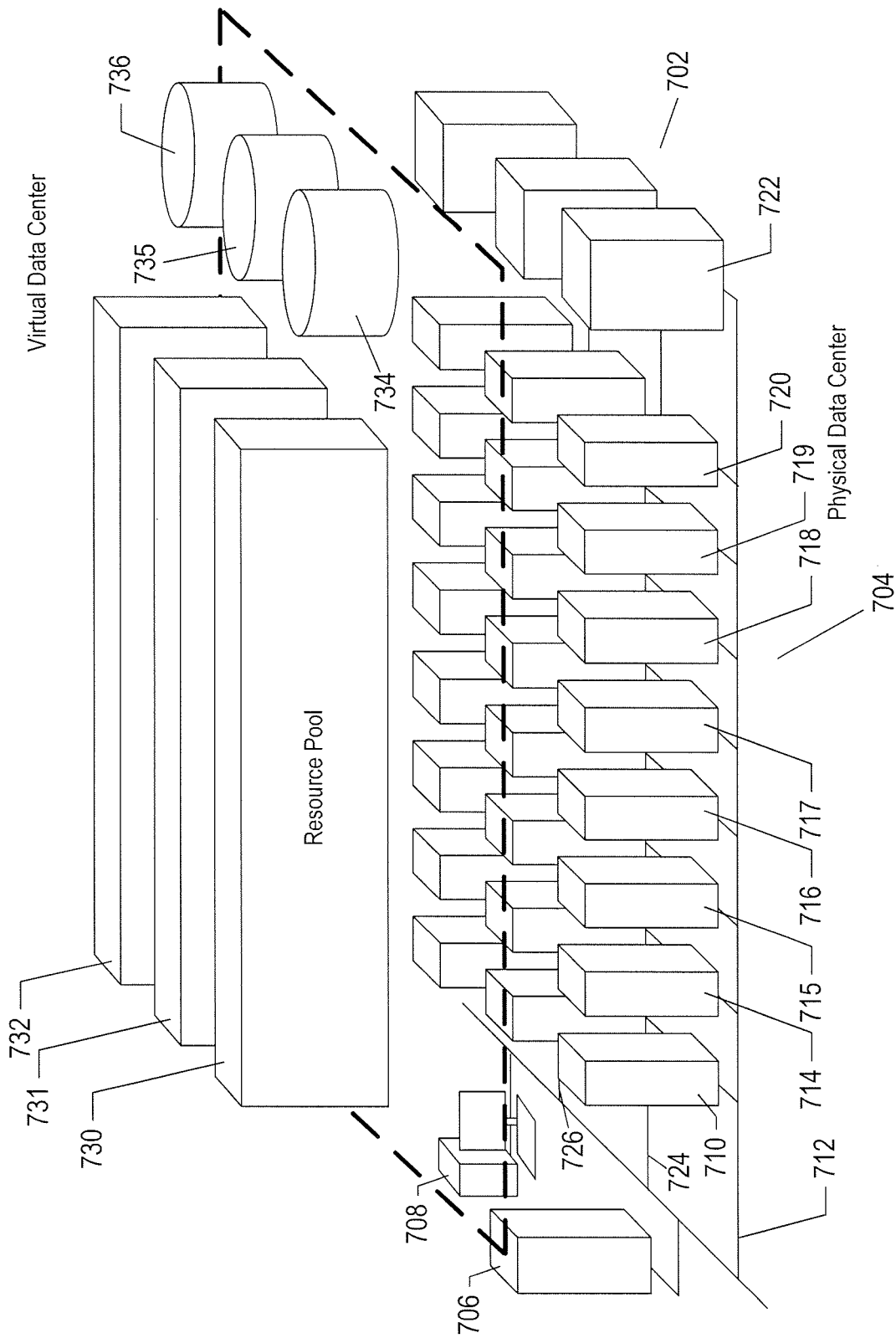
FIG. 7 shows example virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of various different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
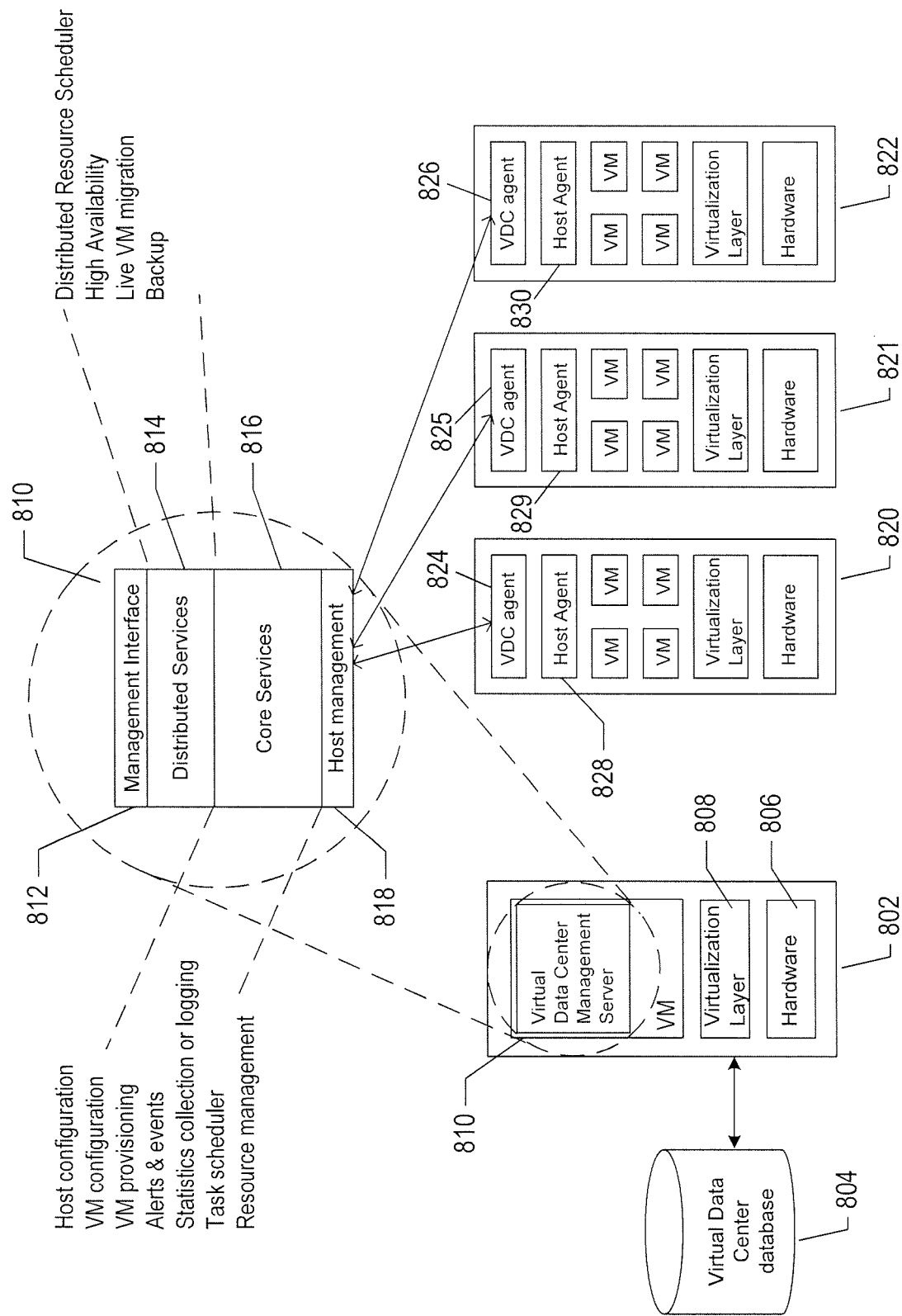
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808, and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
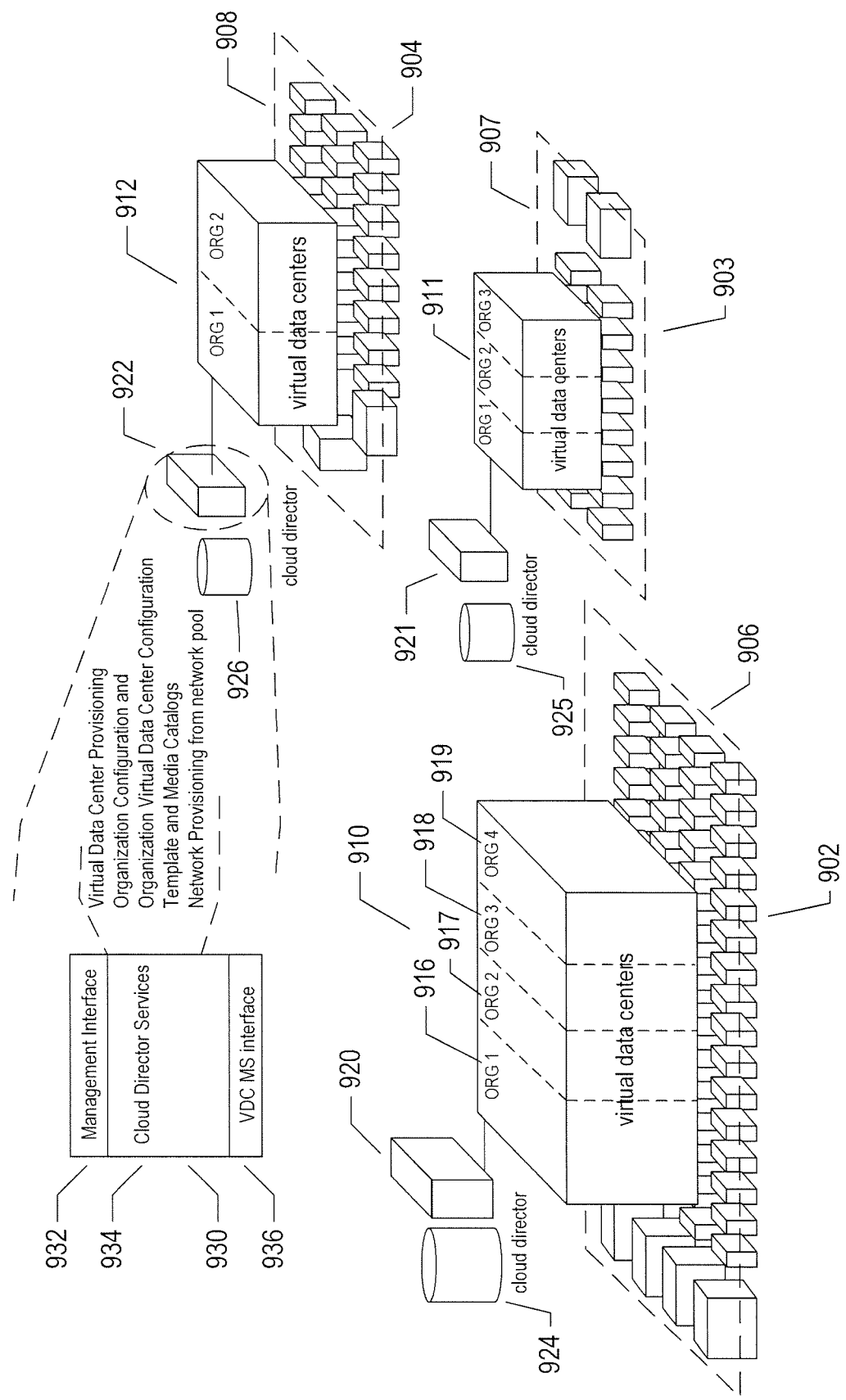
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
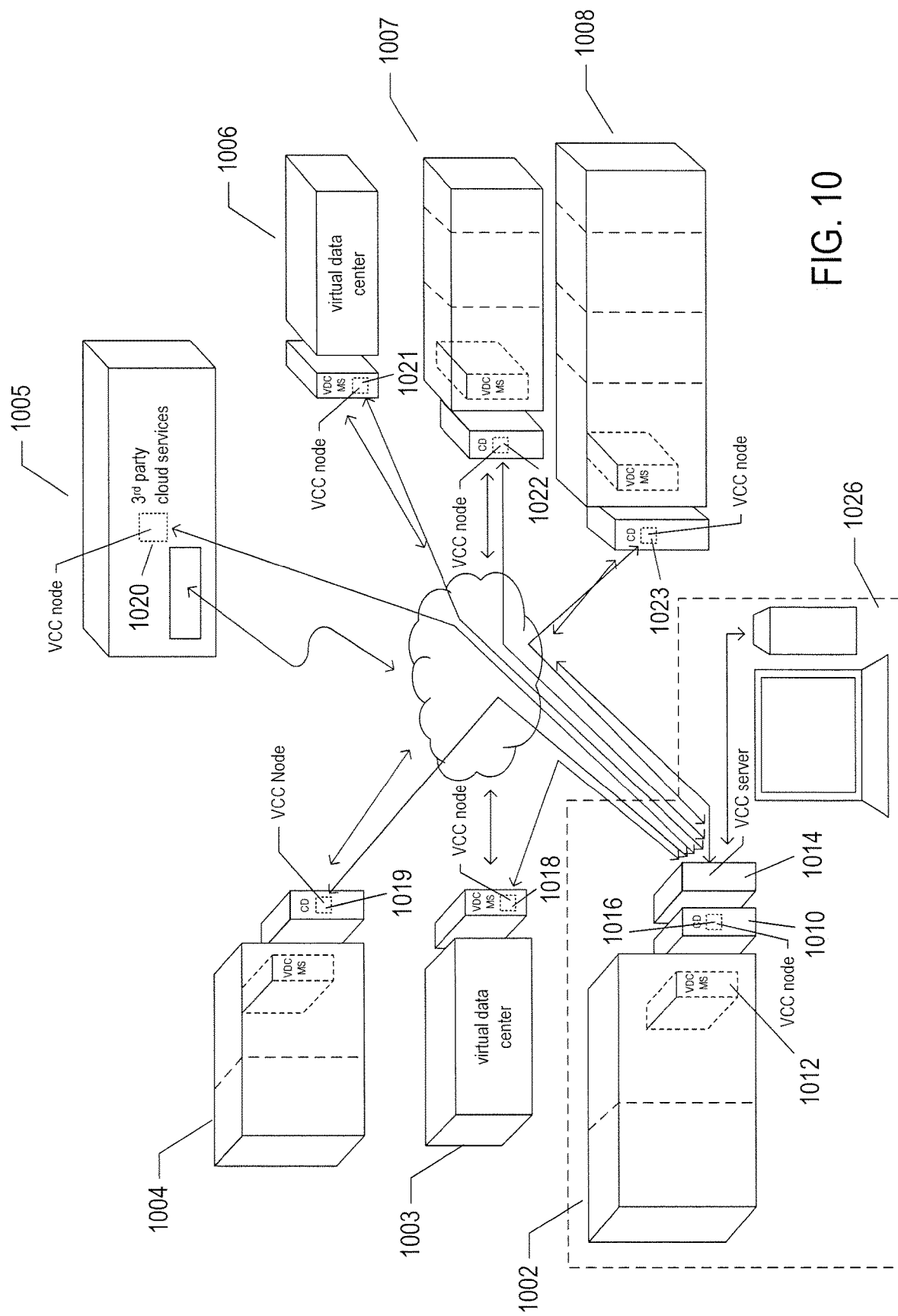
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
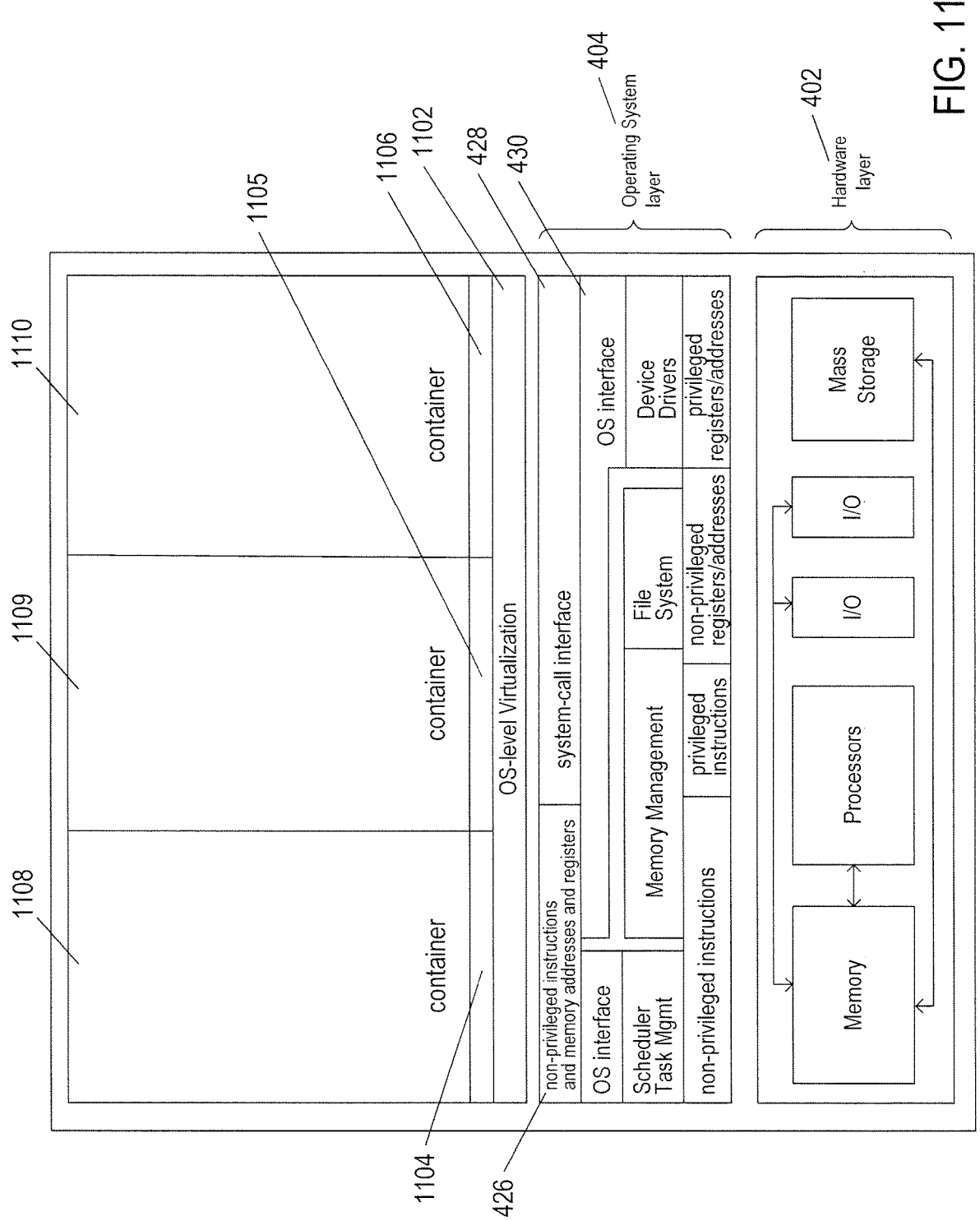
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
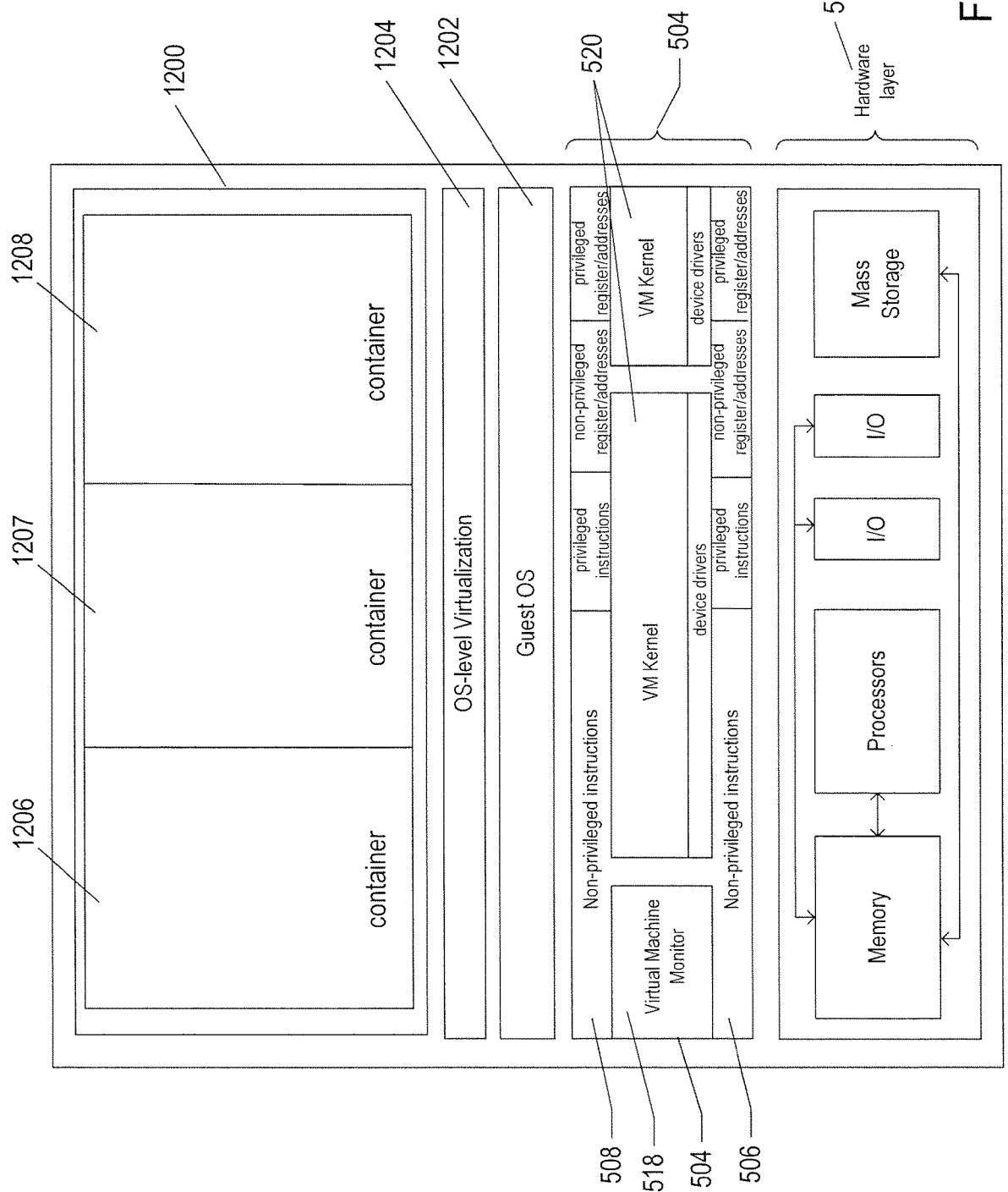
FIG. 12 shows an approach to implementing containers on a VM.

FIG. 12 shows an approach to implementing the containers on a VM. FIG. 12 shows a host computer similar to that shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Note that, although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Figure 13:
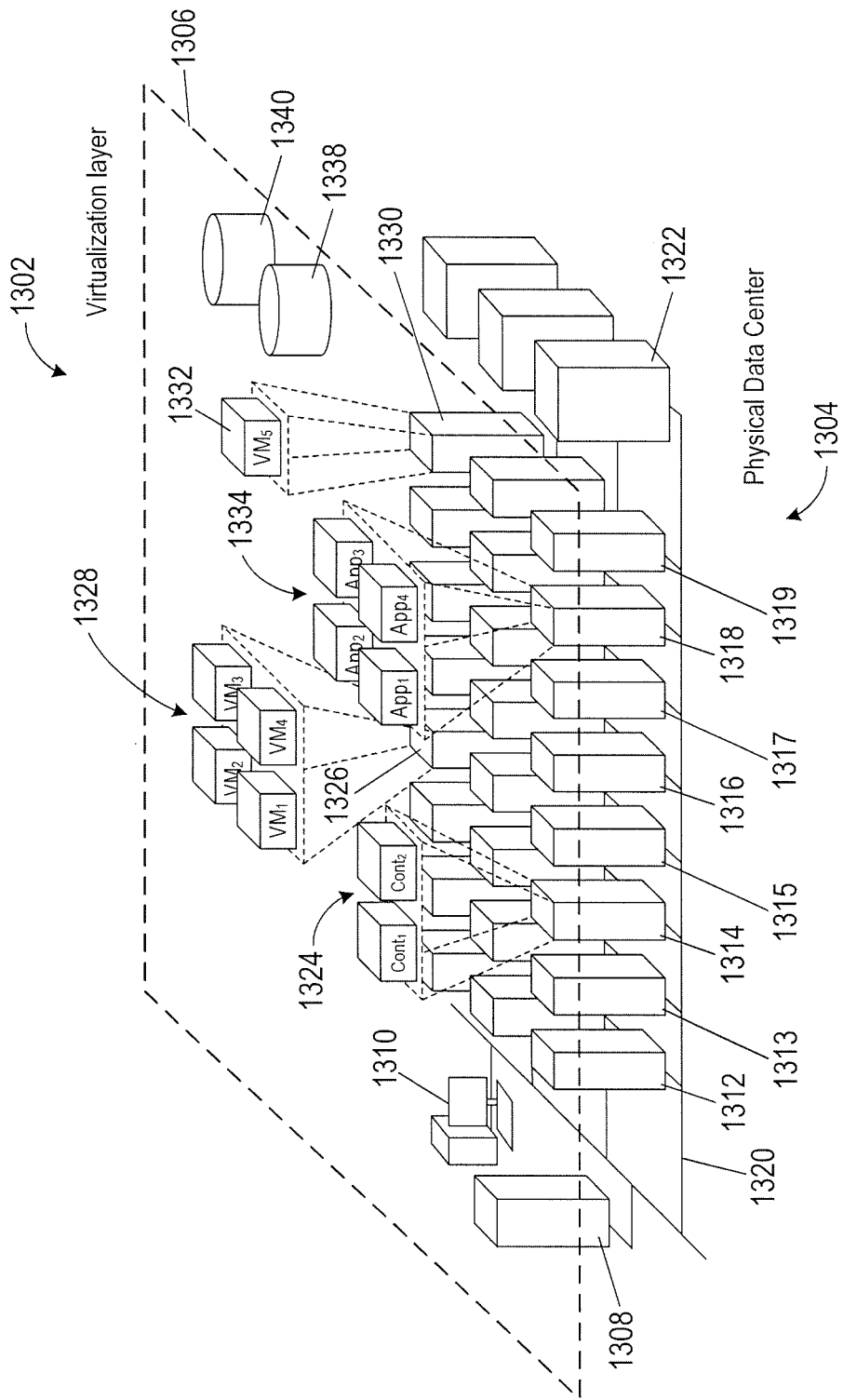
FIG. 13 shows an example of a virtualization layer located above a physical data center.

Methods and Systems to Detect Anomalous Behavior in a Distributed Computing System FIG. 13 shows an example of a virtualization layer 1302 located above a physical data center 1304. For the sake of illustration, the virtualization layer 1302 is separated from the physical data center 1304 by a virtual-interface plane 1306. The physical data center 1304 is an example of a distributed computing system. The physical data center 1304 comprises physical objects, including a management server computer 1308, any of various computers, such as PC 1310, on which a virtual-data-center ("VDC") management interface may be displayed to system administrators and other users, server computers, such as server computers 1312-1319, data-storage devices, and network devices. The server computers may be networked together to form networks within the data center 1904. The example physical data center 1304 includes three networks that each directly interconnects a bank of eight server computers and a mass-storage array. For example, network 1320 interconnects server computers 1312-1319 and a mass-storage array 1322. Different physical data centers may include many different types of computers, networks, data-storage systems and devices connected according to many different types of connection topologies. The virtualization layer 1302 includes virtual objects, such as VMs, applications, and containers, hosted by the server computers in the physical data center 1304. The virtualization layer 1302 may also include a virtual network (not illustrated) of virtual switches, routers, load balancers, and network interface cards formed from the physical switches, routers, and network interface cards of the physical data center 1304. Certain server computers host VMs and containers as described above. For example, server computer 1314 hosts two containers 1324, server computer 1326 hosts four VMs 1328, and server computer 1330 hosts a VM 1332. Other server computers may host applications as described above with reference to FIG. 4. For example, server computer 1318 hosts four applications 1334. The virtual-interface plane 1306 abstracts the resources of the physical data center 1304 to one or more VDCs comprising the virtual objects and one or more virtual data stores, such as virtual data stores 1338 and 1340. For example, one VDC may comprise VMs 1328 and virtual data store 1338.

In the following discussion, the term "object" refers to a physical object or a virtual object which generates streams of metric data that are collected to detect abnormal (i.e., anomalous) or normal behavior of components of a distributed computing system. A physical object may be a server computer, network device, a workstation, or a PC of a distributed computed system. A virtual object may be an application, a VM, a virtual network device, or a container of a distributed computing system. The term "resource" refers to a physical resource of a distributed computing system, such as, but are not limited to, a processor, a core, memory, a network connection, network interface, data-storage device, a mass-storage device, a switch, a router, and other any other component of the physical data center 1304. Resources of a server computer and clusters of server computers may form a resource pool for creating virtual resources of a virtual infrastructure used to run virtual objects. The term "resource" may also refer to a virtual resource, which may have been formed from physical resources used by a virtual object. For example, a resource may be a virtual processor formed from one or more cores of a multicore processor, virtual memory formed from a portion of physical memory, virtual storage formed from a sector or image of a hard disk drive, a virtual switch, and a virtual router.

Automated processes and systems described herein are implemented in a management system that monitors performance of resources and objects of a distributed computing system by collecting numerous streams of time-dependent metric data associated with numerous resources. Each stream of metric data is time series data generated by a metric source. The metric source may be an operating system of an object, a guest operating system, an object, an application, or a resource. A stream of metric data comprises a sequence of time-ordered metric values that are recorded at spaced points in time called "time stamps." A stream of metric data is also be called a sequence of metric data or simply a "metric" and is denoted by a sequence $$(x_i)_{i=1}^N (x(t_i))_{i=1}^N \quad (1)$$

where
$x_i = x(t_i)$ is a metric value;
N is the number of metric values in the sequence;
$t_i$ is a time stamp indicating when the metric value was recorded in a data-storage device; and
subscript i is a time stamp index i=1, ..., N.

The streams of metric data include, but are not limited to, CPU usage, amount of memory, network throughput, network traffic, and amount of storage. CPU usage is a measure of CPU time used to process instructions of an application program or operating system as a percentage of CPU capacity. High CPU usage may be an indication of unusually large demand for processing power, such as when an application program enters an infinite loop. Amount of memory is the amount of memory (e.g., GBs) a computer system or other device uses at a given time. Network throughput is the number of bits of data transmitted to and from a server computer or data-storage device and is often recorded in megabits, kilobits or simply bits per second. Network traffic at a server computer or mass-storage array is a count of the number of data packets received and sent at a given time. The streams of metric data include virtual object metrics, such as error rates, application calls, and response times.

Figure 14A:
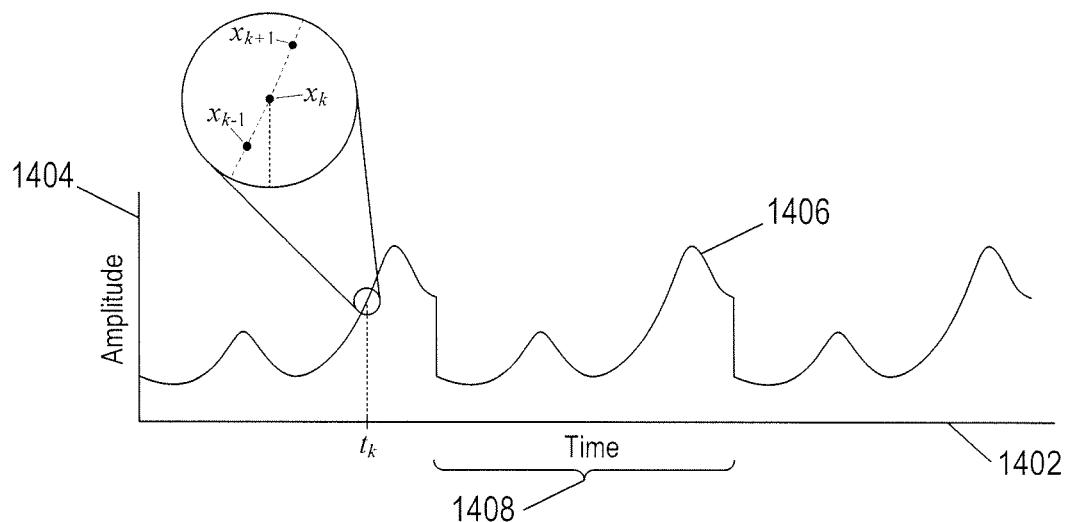
FIGS. 14A-14D show plots of four different example streams of metric data.
Figure 14B:
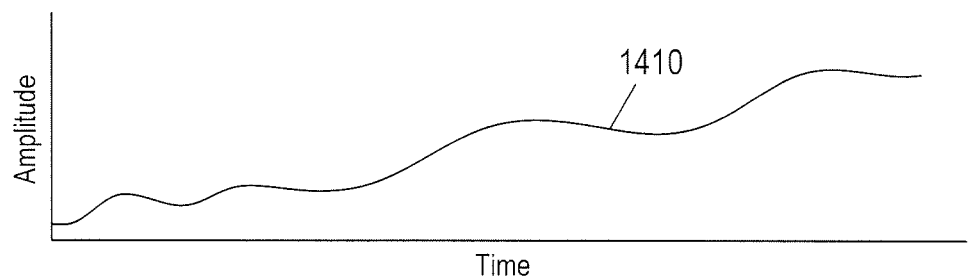
Figure 14C:
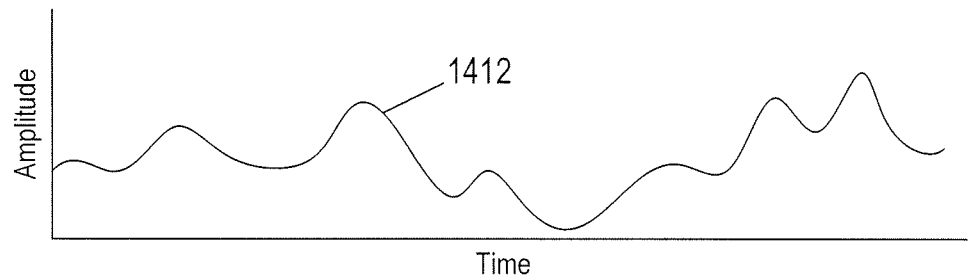
Figure 14D:
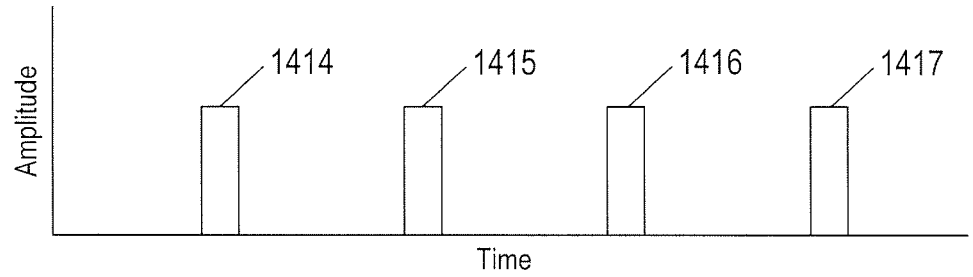

FIGS. 14A-14D show plots of four different example metrics. Horizontal axes, such as axis 1402, represents time. Vertical axes, such as vertical axis 1404, represents a range of metric data amplitudes. In FIGS. 14A-14C, curves represent four examples of different patterns of metric data streams. For example, in FIG. 14A, curve 1406 represents a periodic stream of metric data in which the pattern of metric data in time interval 1408 is repeated. In FIG. 14B, curve 1410 represents a trendy stream of metric data in which the amplitude of the metric data generally increases with increasing time. In FIG. 14C, curve 1412 represents a non-trendy, non-periodic stream of metric data. In FIG. 14D, rectangles 1414-1417 represent pulse waves of a pulsed stream of metric data generated by a resource that is utilized periodically and only for the duration of each pulse. The example streams of time series metric data shown in FIGS. 14A-14D represent usage of different resources or application metrics. For example, the metric data in FIG. 14A may represent CPU usage of a core in a multicore processor of a server computer over time. The metric data in FIG. 14B may represent the amount of virtual memory a VM uses over time. The metric data in FIG. 14C may represent network throughput for a cluster of server computers or distributed applications.

In FIGS. 14A-14D, the streams of metric data are represented by continuous curves. In practice, a stream of metric data comprises a sequence of discrete metric values (see e.g., Equation (1)) in which each numerical value is recorded in a data-storage device with a time stamp. FIG. 14A includes a magnified view 1418 of three consecutive metric values represented by points 1420-1422. Points represent amplitudes of metric values at corresponding time stamps. For example, the points 1420-1422 represent consecutive metric values (i.e., amplitudes) $x_{k-1}$, $x_k$, and $x_{k+1}$ recorded in a data-storage device at corresponding time stamps $t_{k-1}$, $t_k$, and $t_{k+1}$, where subscript k is an integer time index of the k-th metric value in the stream of metric data.

Figure 15A:
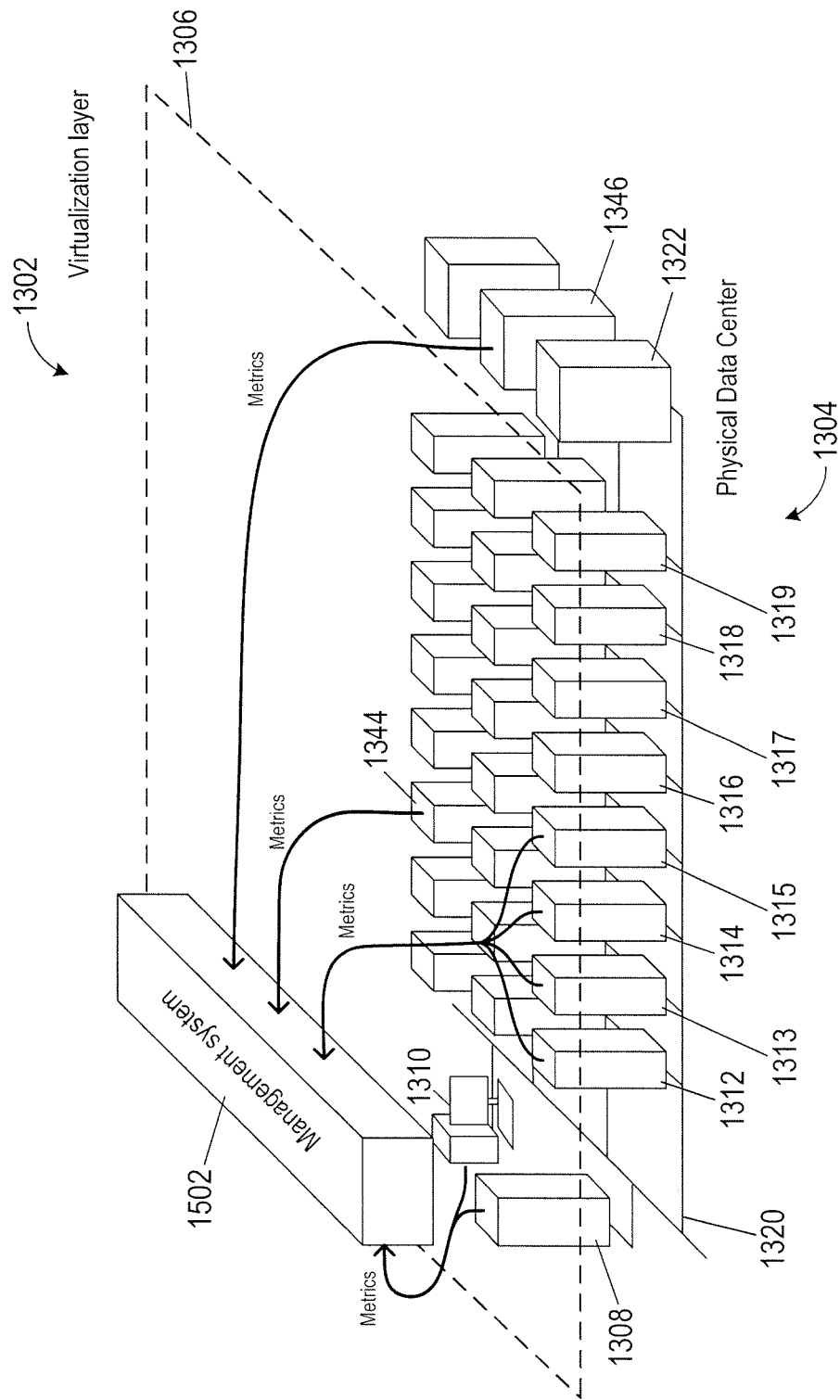
FIGS. 15A-15B show an example of a management system that receives numerous metrics from metric sources.
Figure 15B:
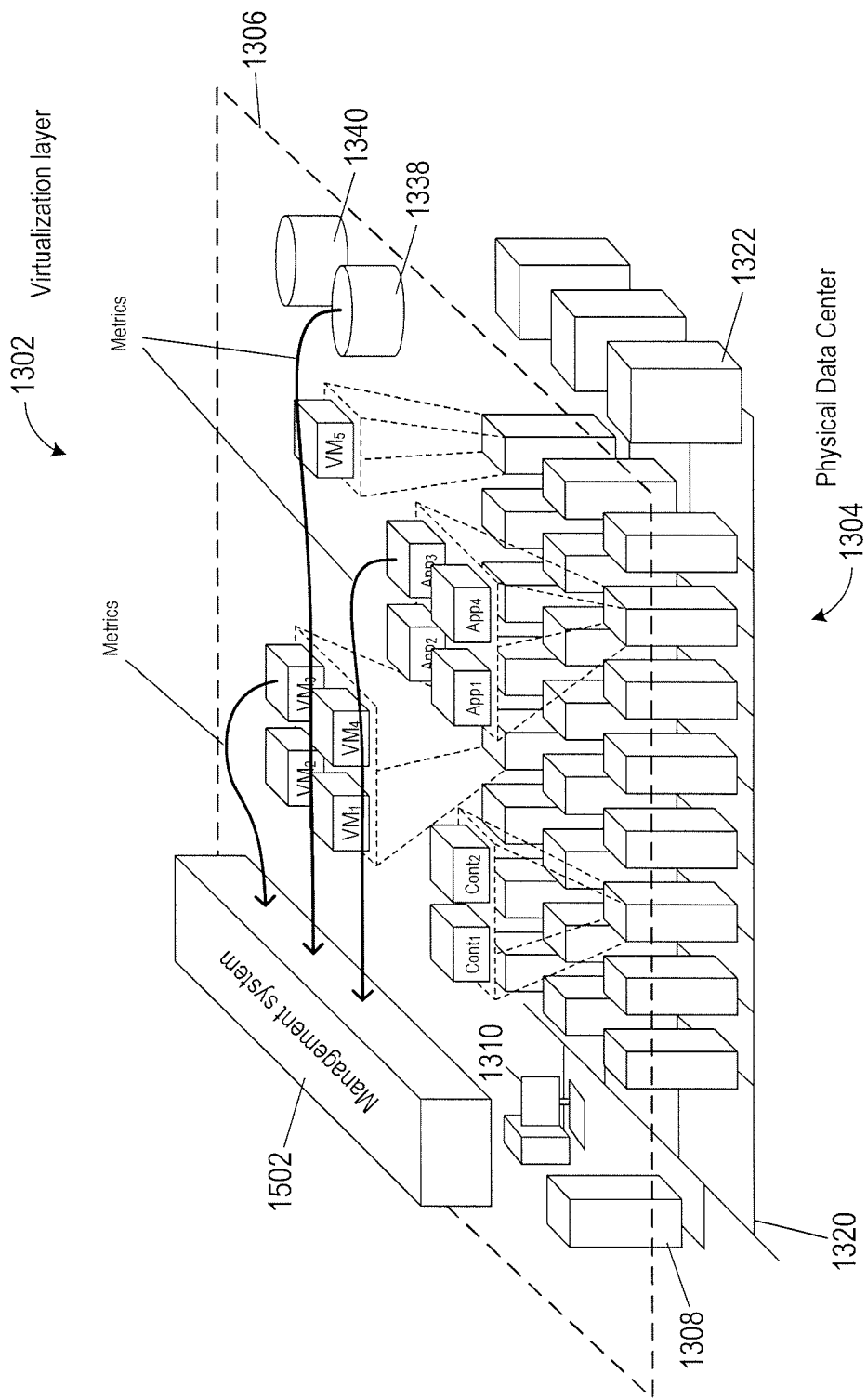

FIGS. 15A-15B show an example of a management system 1502 that receives numerous metrics from metric sources. The management system 1502 is located in the virtualization layer 1302 and may be implemented in one or more VMs to receive and process the metrics as described below. As shown in FIGS. 15A-15B, directional arrows represent metrics sent from metric sources to the management system 1502. In FIG. 15A, PC 1310, server computers 1308 and 1344, and mass-storage array 1346 send metrics to the management system 1502. Clusters of server computers may also send metrics to the management system 1502. For example, a cluster of server computers 1312-1315 sends metrics to the management system 1502. In FIG. 15B, the operating systems, VMs, containers, applications, and virtual storage may independently send metrics to the management system 1502, depending on when the metrics are generated. For example, certain metric sources may send metric values as the metric values are generated while other metric sources may only send metric values at certain times or in response to a request from the management system 1502.

Management System

Figure 16A:
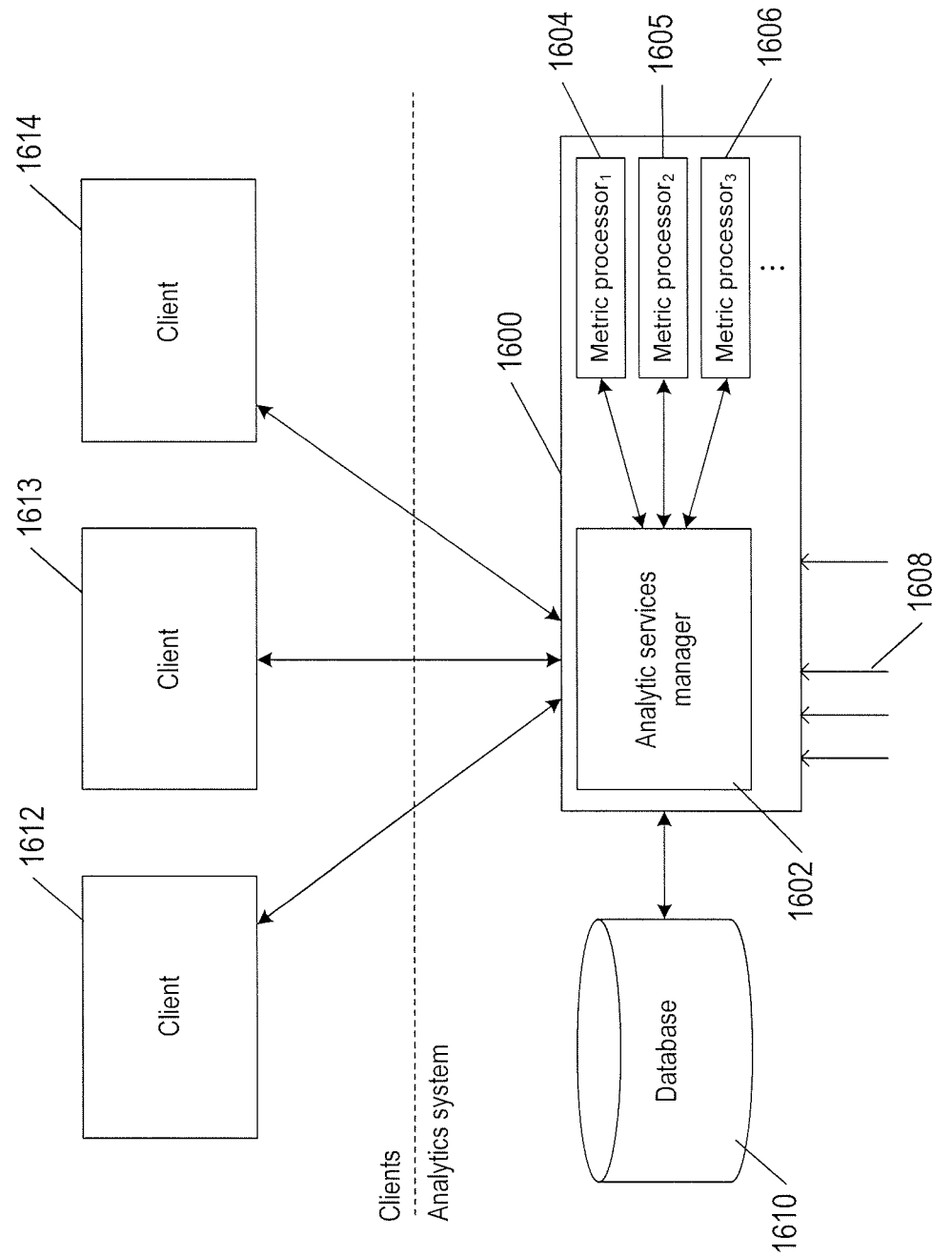
FIG. 16A shows an architecture of an example management system.

FIG. 16A shows an architecture of an example management system 1600. The management system 1600 comprises an analytics services manager 1602 and multiple metric processors 1604-1606. The management system 1600 receives streams of metric data represented by directional arrows, such as directional arrow 1608. The management system 1600 enables a user to create one or more metric processors from configurable performance models described below and assigns to each metric processor one or more streams of metric data. Each metric processor is registered with a registration key that the analytics services manager 1602 uses to route one or more streams of metric data to a corresponding metric processor. The management system 1600 copies each stream of metric data to a database 1608 to create a history for each metric. Each metric processor generates forecast metric data, detects anomalous behavior, and notifies a user, such as a data center tenant, application owner, or an IT administrator, of the anomalous behavior. Remedial measures may then be executed by the user or automatically performed by the management system 1600 in response to a notification that anomalous behavior has been detected.

Figure 16B:
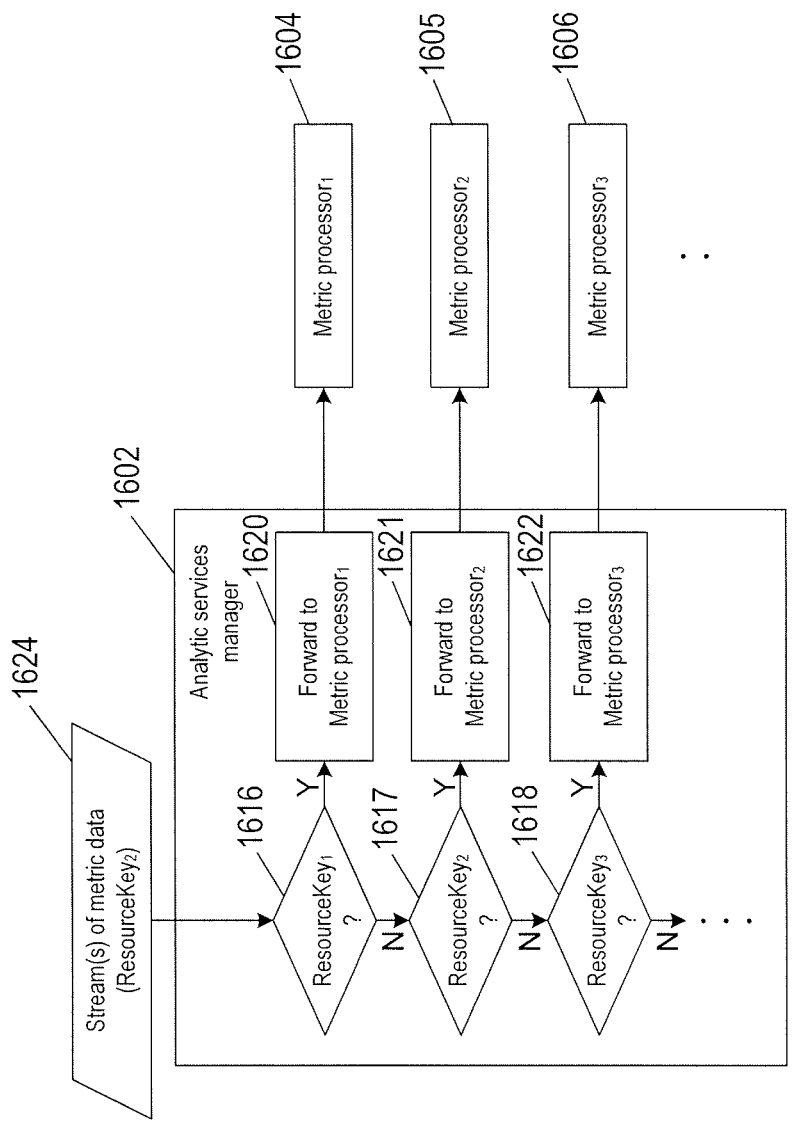
FIG. 16B shows an example implementation of an analytics services manager.

FIG. 16B shows an example implementation of the analytics services manager 1602. Each metric processor is registered with a resource key. The analytics services manager 1602 utilizes the resource key to route the one or more metrics to the metric processor associated with the resource key. In the example of FIG. 16B, a series of decision blocks 1616-1618 represent operations in which the resource key of each metric received by the analytics services manager 1602 is checked against the resource keys of registered metric processors. Blocks 1620-1622 represent forwarding operations that correspond to the decision blocks 1616-1618 in which one or more metrics with a resource key that matches one of the registration keys is forwarded to one of the corresponding metric processors 1604-1606. For example, FIG. 16B shows an example of one or more streams of metric data 1624 with a resource key denoted by "ResourceKey$_2$" input to the analytics services manager 1602. The resource key is checked against the registered resource keys maintained by the analytics services manager 1602. Because the resource key "ResourceKey$_2$" matches the registered resource key represented by decision block 1617, control flows to block 1621 in which the one or more streams of metric data are forwarded to metric processor 1605. The metrics may also be copied to the database 1610.

The analytics services manager 1602 manages the life cycle of each metric processor. The analytics service manager 1602 may, for example, tear down a metric processor when requested by a user and may reconstruct a metric processor when instructed by a user by resetting and replaying historical metrics stored in the database 1610. Each metric processor may update and construct models of metric data that are used to forecast metric data when a request for a forecast is requested by a user. Each metric processor also constructs performance models that are used to detect anomalous behavior in the distributed computing system.

An anomaly is a pattern of behavior that does not conform to or deviates from a defined notion of normal behavior. There are three typical types of anomalies that are typically exhibited by resources and objects and are detected by metric processors described herein:

1. Point anomalies: A metric value is anomalous with respect to the rest of the metric values in a stream of metric data (e.g. when a VM exhibits a spike in CPU usage);

2. Contextual anomalies: Metric values are anomalous in a specific context, but not in other contexts (e.g. a VM exhibits a spike in CPU usage when the VM should be idle, such as in the middle of night); and 3. Collective anomalies: A collection of metric values of related metrics that exhibit anomalous behavior with respect to the collection of metrics, but individual metric values of the metrics do not exhibit anomalous behavior.

An anomaly is a critical piece of information regarding important events in time. Processes and systems described herein construct and update in real time performance models that are used to detect point, contextual, and collective anomalies, and thereby provide identification of anomalous behaving resources and objects. The anomalies may be reported to users whose applications, VMs, or containers are affected by the anomalous behavior, enabling users to execute remedial measures to correct the anomalous behavior. Alternatively, when certain types of anomalous behavior are exhibited, the management system may automatically execute preprogrammed remedial measures to remedy the anomalous behavior. The remedial measures that may be automatically or manually executed when anomalous behavior is detected include increasing capacity of a resource used by a virtual object, assigning additional resources to a virtual object, migrating a virtual object to a server computer with larger capacity resources than the resources currently used by the virtual object, and creating one or more additional virtual objects from a template of a virtual object affected by anomalous behavior, the additional virtual objects sharing the workload of the virtual object.

The performance models that are constructed to detect anomalous behavior of resources and objects are constructed with the assumption that normal metric values occur with a high probability and anomalous metric values occur with a low probability. The performance models can be used to detect anomalous metric values belonging to the low probability occurrences. The performance models may be run efficiently together, are predicated on different assumptions about the metrics, and are complementary with respect to detecting anomalous patterns in the streams of metric data and different types of anomalies. Processes and system use the following three types of performance models:

Parametric performance models. Parametric performance models are predicated on the assumption that normal metric values fit a predictable probability density function. To determine whether a new metric value is anomalous, a parametric performance model may be calculated based on the probability density function of the associated stream of metric data and compared to a threshold to detect anomalous behavior. For example, metric values of normally behaving related streams of metric data are distributed according to a normal distribution. The parametric performance model is computed for each new metric value of the related streams of metric data. Each parametric performance model value indicates how far the metric value is from the mean of the other metric values of the streams of metric data. A parametric performance model value that exceeds a threshold is an indication of an anomalous behavior.

Regression-based performance models. With regression-based techniques, forecast models are fit to observed metric data. The forecast models are generated for stochastic data, pulse data, and seasonal data. A residual error is maintained between the observed data and a forecast value produced by the forecast model. Confidence intervals are determined for the forecast metric data. The confidence intervals are used as thresholds for detecting anomalous behavior. New metric values located within the confidence intervals are normal, while new metric values that are located outside the confidence intervals are an indication of anomalous behavior.

Signal processing-based performance models. Signal processing-based techniques transform each stream of metric data from the space-time domain to that space-frequency domain. A change in the oscillating frequency (i.e., period) of the metric are an indication of anomalous behavior.

The performance models described below provide the following advantages: 1) The metric processor updates parameters of the performance models as new metric values arrive. As a result, the performance models are up to date at any point in time. 2) The performance models receive streaming updates and do not have to be recomputed from historical metric data. As a result, each metric processor maintains an efficient bounded memory footprint with anomaly detection and forecast operations at low computational cost. 3) The performance models provide explainable anomalies to users, enabling users to avoid bogged down with more information than is necessary to understand the anomalous behavior.

The management system maintains a general-purpose, high-performance library of the performance models. Each performance model provides reliable real-time anomaly detection. The library of performance models is available for multiple products that have need for anomaly detection. The metric processors support forecasting and anomaly detection on multivariate streams of metric data.

Figure 17A:
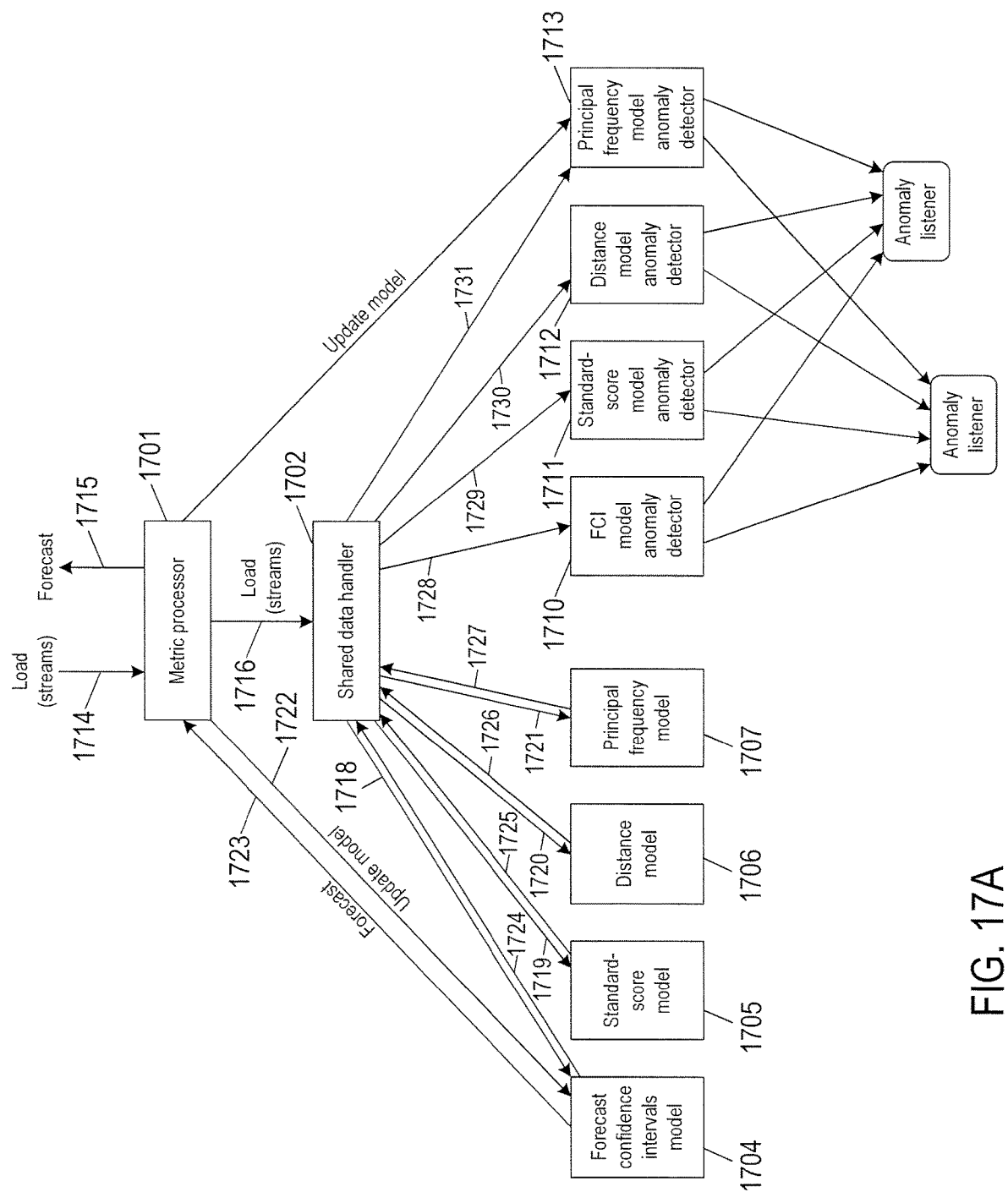
FIG. 17A shows a diagram of example classes and function calls performed by a metric processor.
Figure 17B:
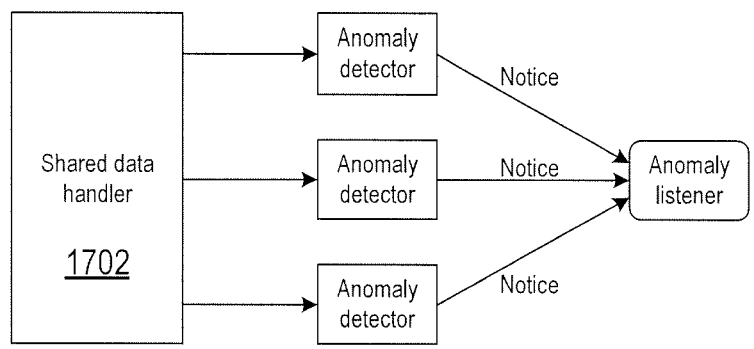
FIG. 17B shows an example of anomaly detectors that notify a single anomaly lister of anomalous behavior.
Figure 17C:
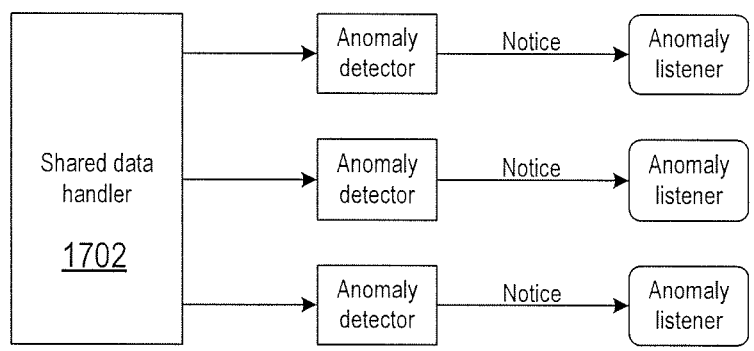
FIG. 17C shows an example of anomaly detectors and corresponding anomaly detectors.

FIG. 17A shows a diagram of example classes and function calls performed by a metric processor. Blocks 1701, 1702, 1704-1707, and 1710-1713 represent logical classes, such as Java classes, and directional arrows represent function calls performed by the classes. Directional arrow 1714 represents a function call that loads multiple streams of metric data to a metric processor 1701. Directional arrow 1715 represents a function call that outputs a forecast from the metric processor 1701 as described below with reference to FIGS. 18 and 19. The function calls that load the streams of metric data and output the forecast may be performed by the analytics services manager 1602. Directional arrow 1716 represents a function call that loads the streams of metric data to a shared data handler 1702. Directional arrows 1718-1721 represent function calls that load the streams of metric data to a forecast confidence intervals model 1704, a standard-score model 1705, a distance model 1706, and a principal-frequency model 1707. The forecast confidence intervals, standard-score, distance, and principal-frequency models 1704-1707 are examples of performance models that enable identification of different types of anomalies in the loaded streams of metric data. Each of the performance models 1704-1707 is describe below. Directional arrow 1722 represents a function call that updates the performance models based on the most recently received metric values of the streams of metric data. Directional arrow 1715 represents a function call that returns a requested forecast from the forecast confidence intervals model 1704. Directional arrows 1724-1727 represent function calls that return one or more of the performance models to the shared data handler 1702. As shown in FIG. 17A, the metric processor supports anomaly detectors 1710-1713 that correspond to the performance models 1704-1707. Directional arrow 1728 represents a function call that sends the forecast confidence intervals model obtained in block 1704 to a forecast confidence intervals model anomaly detector 1710 that performs forecast confidence intervals model anomaly detection described below. Directional arrow 1729 represents a function call that sends the standard-score model obtained in block 1705 to a standard-score model anomaly detector 1711 that performs standard-score model anomaly detection described below. Directional arrow 1730 represents a function call that sends the distance model obtained in block 1706 to a distance model anomaly detector 1712 that performs distance model anomaly detection described below. Directional arrow 1731 represents a function call that sends the principal-frequency model obtained in block 1707 to a principal-frequency model anomaly detector 1713 that performs principal-frequency model anomaly detection described below. Each anomaly detector comprises machine-readable instructions executed on one or more processors of a computer system that evaluates the corresponding performance model to detect anomalous behavior in real time. When an anomaly is detected by an anomaly detector, the anomaly detectors report the anomaly to an anomaly listener. The anomaly listener may a user console that enables a user, whose virtual objects running in the distributed computing system are adversely affected by the anomalous behavior, to be aware of the anomalous behavior. The anomaly listener may be an IT administrator console that enables an administrator of the distributed computing system to be made aware of the anomaly. The anomaly detectors may notify a single anomaly lister of anomalous behavior detected by two or more anomaly detectors as shown in FIG. 17B. Alternatively, each anomaly detector sends a notice to of anomalous behavior a corresponding anomaly detector as shown in FIG. 17C.

Forecasting Metric Data

A metric processor maintains a limited history of each stream of metric data in order to forecast metric data. The duration of a sequence of metric values comprising a limited history for a metric may vary, depending on the resource. For example, when the resource is a CPU of a server computer, the limited history may be comprised of a sequence of CPU usage collected over an hour, day, or a week. On the other hand, when the resource is CPU usage for a cluster of server computers that run a data center tenant's applications, the limited history of metric may comprise sequences of metric data collected over days, weeks, or months. Because each metric processor updates the performance models when new metric values received and maintains a limited history of each metric for forecasting, each metric processor uses a bounded memory footprint, uses a relatively small computational load, and computes a forecast and detects anomalous behavior at a low computational cost.

Figure 18:
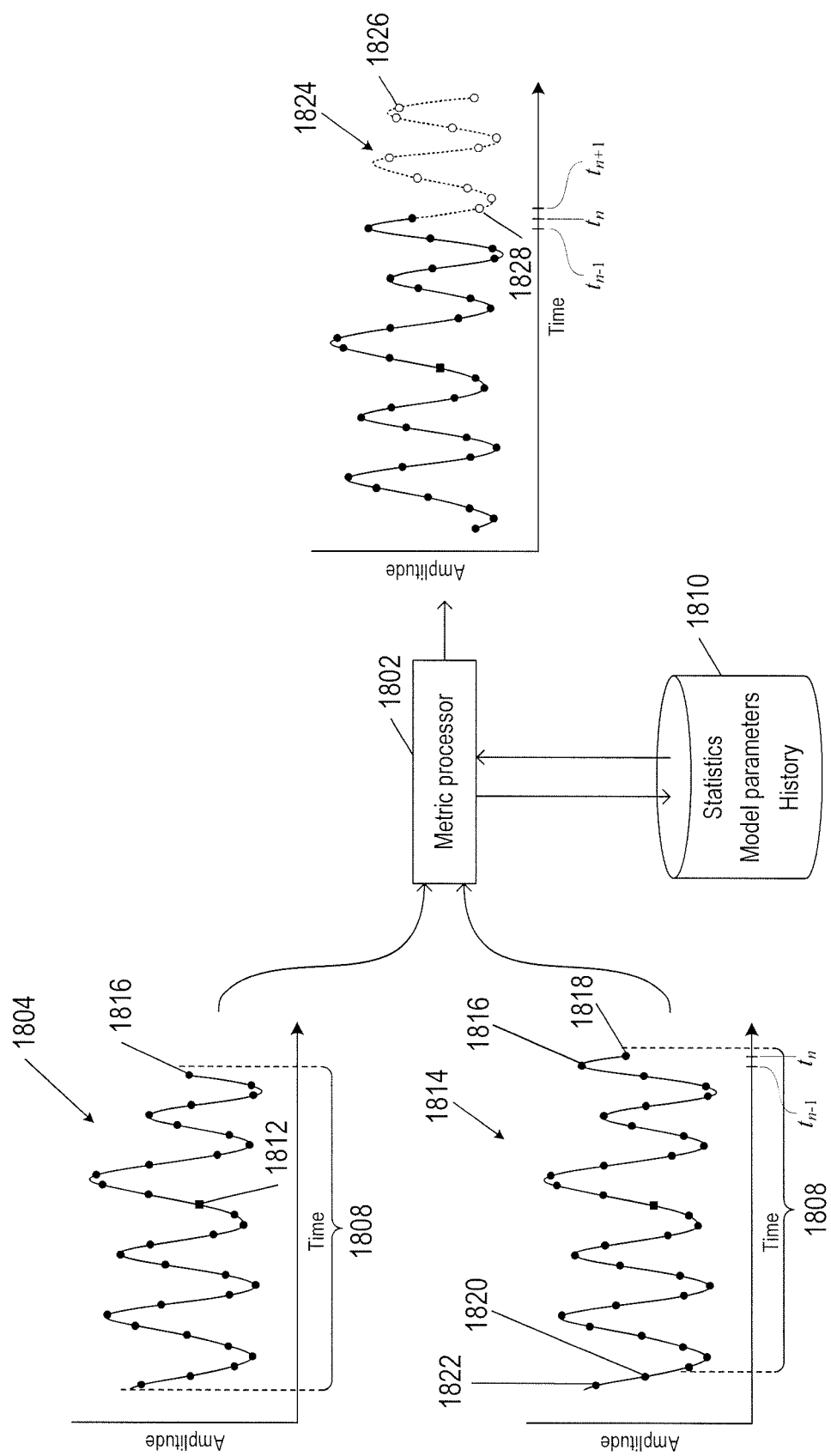
FIG. 18 shows an example of a forecast produced by a metric processor.

When metric values of multiple streams of metric data may arrive at the analytics services manager 1602, each metric processor may be queried to generate a real time metric data forecast for each stream of metric data sent to the metric processor as follows. FIG. 18 shows an example of a limited history of metric data maintained by a metric processor 1802. Plot 1804 displays data points of a limited history of metric data maintained by the metric processor 1802. For example, point 1806 represents a recently forwarded metric value of the limited history of metric data recorded in a data-storage device 1810. The limited history of metric data is contained in a historical window 1808 of duration D. The historical window 1808 contains a sequence of metric data with time stamps in a time interval $[t_n-D, t_n]$, where subscript n is a positive integer time index, and $t_n$ is the time stamp of the most recently received metric value $x_n$ added to the limited history and in the historical window. Ideally, consecutive metric values forwarded to the metric processor 1802 have regularly spaced time stamps with no gaps. Interpolation is used to fill in any gaps or missing metric data in the limited history of metric data. For example, square-shaped metric value 1812 represents an interpolated metric value in the limited history of metric data. Interpolation techniques that may be used to fill in missing metric values include linear interpolation, polynomial interpolation, and spline interpolation. The metric processor 1802 computes statistical information and forecast model parameters based on the limited history of metric data 1804 and records the statistical information and forecast model parameters in the data-storage device 1810. The historical window 1808 advances in time to include the most recently received metric values and discard a corresponding number of the oldest metric values from the limited history of metric data. Plot 1814 displays data points of an updated limited history of metric data. Points 1816 and 1818 represents two recently received metric values added to the limited history of metric data. Points 1820 and 1822 represent older metric values outside the historical window 1808 and are discarded from data storage. The metric data in the historical window 1908 are called "lags" and a time stamp of a lag is called "lag time." For example, metric data 1816 and 1818 are called lags and the corresponding time stamps values $t_{n-1}$ and $t_n$ and called lag times. The metric processor 1802 computes statistical information and updates model parameters stored in the data-storage device 1810 based on the latest limited history of metric data 1814.

When a forecast request is received by the metric processor 1802, the metric processor 1802 computes a metric data forecast. The metric processor 1802 computes forecast metric values in a forecast interval at regularly spaced lead time stamps represented by open points. FIG. 18 shows a plot of forecast metric data 1824 represented by open points, such as open point 1826, appended to the latest limited history of metric data. For example, a first forecast metric value 1828 occurs at lead time stamp $t_{n+1}$.

Each metric value in a stream of metric data may be decomposed as follows:

$$x_i = T_i + A_i + S_i \qquad (2)$$

where
i=1, ..., n;
n is the number of metric values in the historical window;
$T_i$ is the trend component;
$A_i$ is the stochastic component; and
$S_i$ is the seasonal or periodic component.

Note that certain streams of metric data may have only one component (e.g., $A_i \neq 0$ and $T_i = S_i = 0$, for all i). Other streams may have two components (e.g., $A_i \neq 0$, $S_i \neq 0$, and $T_i = 0$, for all i). And still other streams may have all three components.

Figure 19:
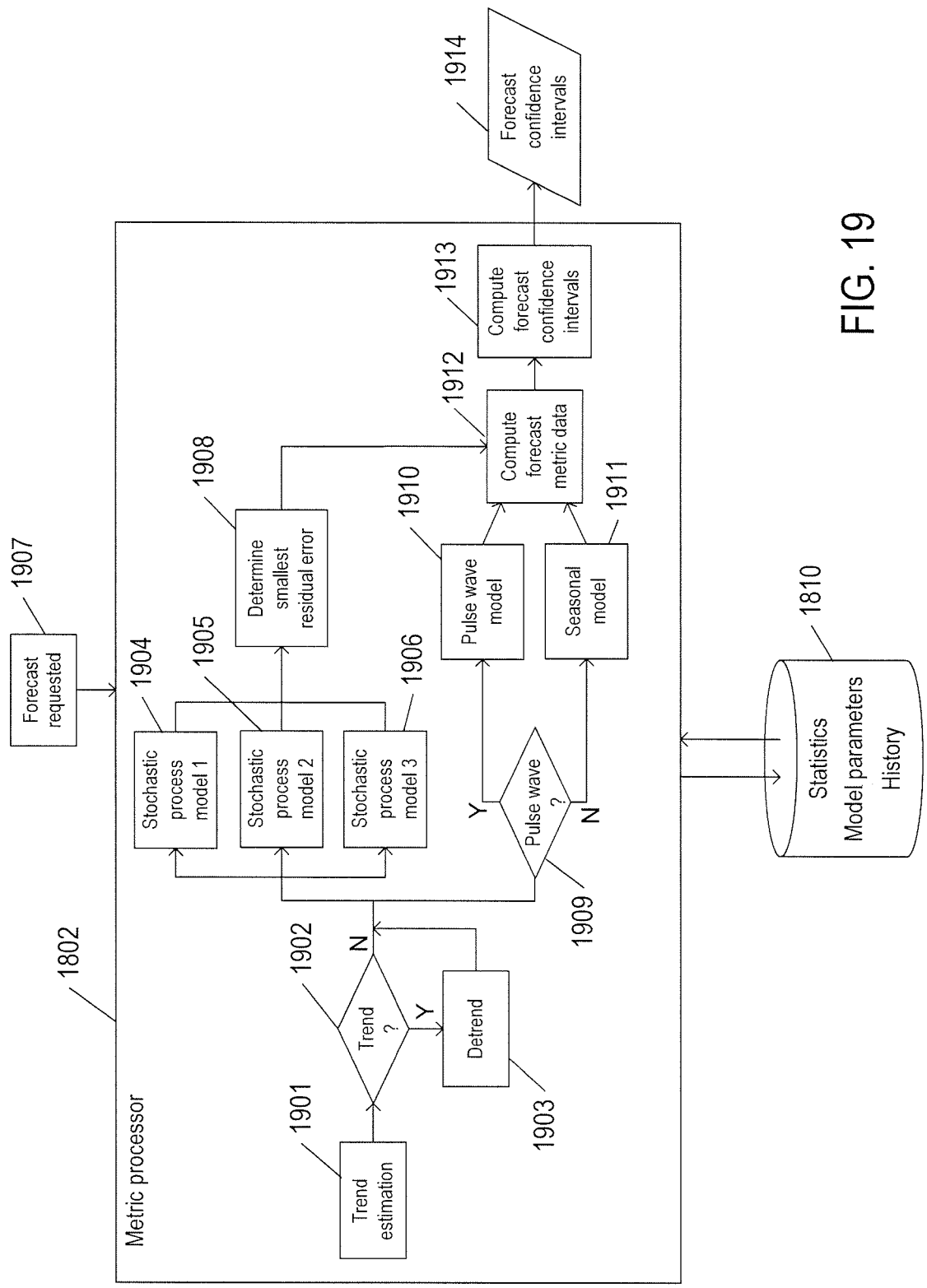
FIG. 19 shows an overview of example processing operations carried out by a metric processor to generate forecast confidence intervals for forecast data.
Figure 20A:
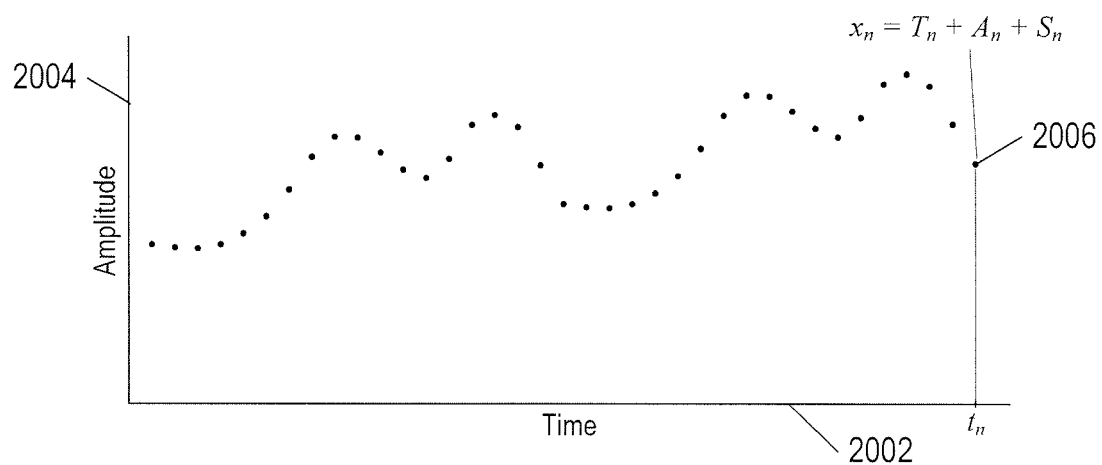
FIGS. 20A-20C show an example of computing a trend estimate and detrending metric data.
Figure 20B:
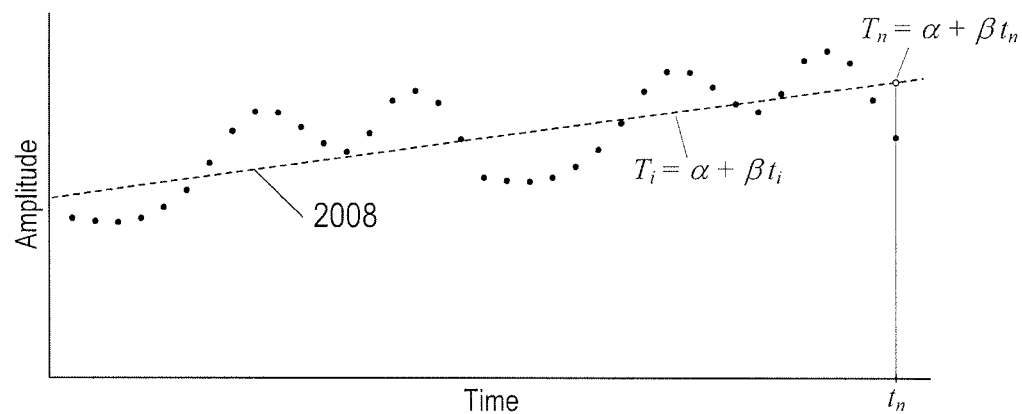
Figure 20C:
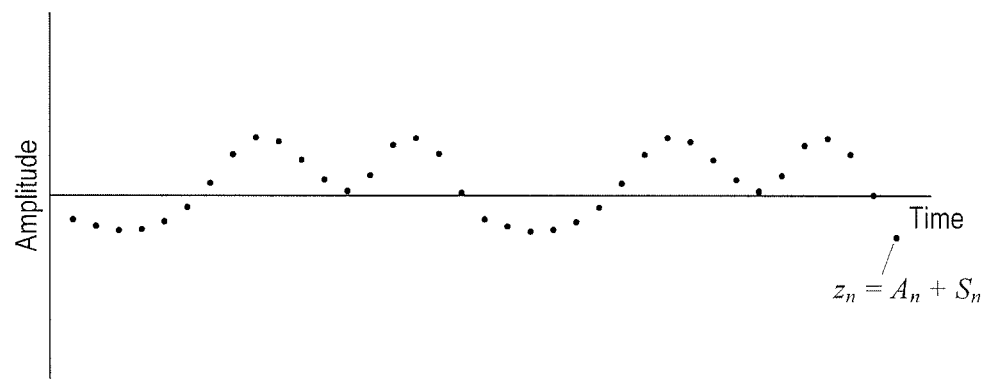

FIG. 19 shows an overview of example processing operations carried out by the metric processor 1802 to generate forecast confidence intervals for the forecast data. FIGS. 20A-20C show an example of computing a trend estimate and detrending metric data within a historical window. The latest metric data 1814 within the historical window 1808 is input to the metric processor 1802. The historical window contains the latest sequence of metric data in the limited history. In block 1901, a trend estimate of the metric data in the historical window is computed. In decision block 1902, if the trend estimate fails to adequately fit the metric data in the historical window, the metric data is non-trendy. On the other hand, if the trend estimate adequately fits the sequence of metric data, the sequence of metric data in the historical window is trendy and control flows to block 1903 where the trend estimate is subtracted from the metric data to obtain a detrended sequence of metric data over the historical window.

FIGS. 20A-20C show an example of computing a trend estimate and detrending metric data within a historical window. In FIGS. 20A-20C, horizontal axes, such as horizontal axis 2002, represent time. Vertical axes, such as vertical axis 2004, represent the amplitude range of the metric data in the historical window. In FIG. 20A, the values of the metric data represented by points, such as point 2006, vary over time, but a trend is recognizable by an overall increase in metric values with increasing time. A linear trend may be estimated over the historical window by a linear equation given by:

$$T_i = \alpha + \beta t_i \qquad (3a)$$

where
$\alpha$ is vertical axis intercept of the estimated trend;
$\beta$ is the slope of the estimated trend;
i=1, ..., n; and
n is the time index of the most recently added metric value to sequence of metric data with a time stamp in the historical window.

The index i is the time index for time stamps in the historical window. The slope $\alpha$ and vertical axis intercept $\beta$ of Equation (3a) may be determined by minimizing a weighted least squares equation given by:

$$L = \sum_{i=1}^{n} w_i (x_i - \alpha - \beta t_i)^2 \qquad (3b)$$

where $w_i$ is a normalized weight function. Normalized weight functions $w_i$ weight recent metric values higher than older metric values within the historical window. Examples of normalized weight functions that give more weight to more recently received metric values within the historical window include $w_i = e^{(i-n)}$ and $w_i = i/n$, for i=1, ..., n. The slope parameter of Equation (3a) is computed as follows:

$$\beta = \frac{\sum_{i=1}^{n} w_i (t_i - t_w)(x_i - x_w)}{\sum_{i=1}^{n} w_i (t_i - t_w)^2} \qquad (3c)$$

where $$t_w = \frac{\sum_{i=1}^{n} w_i t_i}{\sum_{i=1}^{n} w_i}$$

$$x_w = \frac{\sum_{i=1}^{n} w_i x_i}{\sum_{i=1}^{n} w_i}$$

The vertical axis intercept parameter of Equation (3a) is computed as follows:

$$\alpha = x_w - \beta t_w \qquad (3d)$$

In other implementations, the weight function may be defined as $w_i \equiv 1$.

A goodness-of-fit parameter is computed as a measure of how well the trend estimate given by Equation (3a) fits the metric values in the historical window:

$$R^2 = \frac{\sum_{i=1}^{n} (T_i - x_w)^2}{\sum_{i=1}^{n} (x_i - x_w)^2} \qquad (4)$$

The goodness-of-fit $R^2$ ranges between 0 and 1. The closer $R^2$ is to 1, the closer linear Equation (3a) is to an accurate estimate of a linear trend in the metric data of the historical window. In decision block 1802 of FIG. 18, when $R^2 \leq Th_{trend}$, where $Th_{trend}$ is a user defined trend threshold less than 1, the estimated trend of Equation (3a) is not a good fit to the sequence of metric values and the sequence of metric data in the historical window is regarded as non-trendy metric data. On the other hand, when $R^2 > Th_{trend}$, the estimated trend of Equation (3a) is recognized as a good fit to the sequence of metric data in the historical window and the trend estimate is subtracted from the metric values. In other words, when $R^2 > Th_{trend}$, for i=1, ..., n, the trend estimate of Equation (3a) is subtracted from the sequence of metric data in the historical window to obtain detrended metric values:

$$z_i = x_i - T_i \qquad (5)$$

where "z" denotes non-trendy or detrended metric values.

In FIG. 20B, dashed line 2008 represents an estimated trend of the sequence of metric data. The estimated trend is subtracted from the metric values according to Equation (5) to obtain a detrended sequence of metric data shown in FIG. 20C. Although metric values may vary stochastically within the historical window, with the trend removed as shown in FIG. 20C, the metric data is neither generally increasing nor decreasing for the duration of the historical window.

Returning to FIG. 19, as recently forwarded metric values are input to the metric processor 1802 and a corresponding number of oldest metric values are discarded from the historical window, as described above with reference to FIG. 18, the metric processor 1802 updates the slope and vertical axis intercepts according to Equations (3b) and (3c), computes a goodness-of-fit parameter according to Equation (4), and, if a trend is present, subtracts the trend estimate according to Equation (5) to obtain a detrended sequence of metric data in the historical window. If no trend is present in the metric data of the historical window as determined by the goodness-of-fit in Equation (4), the sequence of metric data in the historical window is non-trendy. In either case, the sequence of metric data output from the computational operations represented by blocks 1901-1903 is called a sequence of non-trendy metric data and each non-trendy metric value is represented by $$z_i = A_i + S_i \tag{6}$$

where i=1, ..., n.

The mean of the non-trendy metric data in the historical window is given by:

$$\mu_z = \frac{1}{n}\sum_{i=1}^{n} z_i$$

When the metric data in the historical window has been detrended according to Equation (5) and $R^2 > Th_{trend}$, the mean $\mu_z = 0$. On the other hand, when the metric data in the historical satisfies the condition $R^2 \leq Th_{trend}$, then it may be the case that the mean $\mu_z \neq 0$.

In alternative implementations, computation of the goodness-of-fit $R^2$ is omitted and the trend is computed according to Equations (3a)-(3d) followed by subtraction of the trend from metric data in the historical window according to Equation (5). In this case, the mean of the metric data $\mu_z$ equals zero in the discussion below.

The sequence of detrended or non-trendy metric data may be either stationary or non-stationary metric data. Stationary non-trendy metric data varies over time in a stable manner about a fixed mean. Non-stationary non-trendy metric data, on the other hand, the mean is not fixed and varies over time. For a stationary sequence of non-trendy metric data, the stochastic process models 1904-1906 in FIG. 19 may be autoregressive moving-average ("ARMA") models 1906-1908 computed separately for the stationary sequence of metric data in the historical window. An ARMA model is represented, in general, by $$\phi(B)z_n = \theta(B)a_n \tag{7a}$$

where

B is a backward shift operator;

$$\phi(B) = 1 - \sum_{i=1}^{p} \phi_i B^i$$

-continued $$\theta(B) = 1 - \sum_{i=1}^{q} \theta_i B^i$$

$a_n$ is white noise;
$\phi_i$ is an i-th autoregressive weight parameter;
$\theta_i$ is an i-th moving-average weight parameter;
p is the number of autoregressive terms called the "autoregressive order;" and
q is the number of moving-average terms called the "moving-average order;"

The backward shift operator is defined as $Bz_n = z_{n-1}$ and $B^i z_n = z_{n-i}$. In expanded notation, the ARMA model is represented by $$z_n = \sum_{i=1}^{p} \phi_i z_{n-i} + a_n + \mu_z \Phi + \sum_{i=1}^{q} \theta_i a_{n-i} \tag{7b}$$

where $\Phi = 1 - \phi_1 - \ldots - \phi_P$.

The white noise parameters $a_n$ may be determined at each time stamp by randomly selecting a value from a fixed normal distribution with mean zero and non-zero variance. The autoregressive weight parameters are computed from the matrix equation:

$$\vec{\phi} = P^{-1} \vec{\rho} \tag{8}$$

where $$\vec{\phi} = \begin{bmatrix} \phi_1 \\ \vdots \\ \phi_p \end{bmatrix};$$

$$\vec{\rho} = \begin{bmatrix} \rho_1 \\ \vdots \\ \rho_p \end{bmatrix}; \text{ and}$$

$$P^{-1} = \begin{bmatrix} 1 & \rho_1 & \cdots & \rho_{p-1} \\ \rho_1 & 1 & \cdots & \rho_{p-2} \\ \vdots & \vdots & \ddots & \vdots \\ \rho_{p-1} & \rho_{p-2} & \cdots & 1 \end{bmatrix}^{-1}$$

The matrix elements are computed from the autocorrelation function given by:

$$\rho_k = \frac{\gamma_k}{\gamma_0} \tag{9}$$

where $$\gamma_k = \frac{1}{n}\sum_{i=1}^{n-k}(z_i - \mu_z)(z_{i+k} - \mu_z)$$

$$\gamma_0 = \frac{1}{n}\sum_{i=1}^{n}(z_i - \mu_z)^2$$

The moving-average weight parameters may be computed using gradient descent. In the Example of FIG. 19, the metric processor 1802 computes three separate stochastic process models 1904-1906 for stationary sequence of non-trendy metric data in the latest historical window. For example, when the historical window of the sequence of non-trendy metric data is updated with recently received non-trendy metric values, three sets of autoregressive and moving average weight parameters are computed for each the three ARMA models denoted by ARMA($p_1$, $q_1$), ARMA($p_2$, $q_2$), and ARMA($p_3$, $q_3$).

Figure 21:
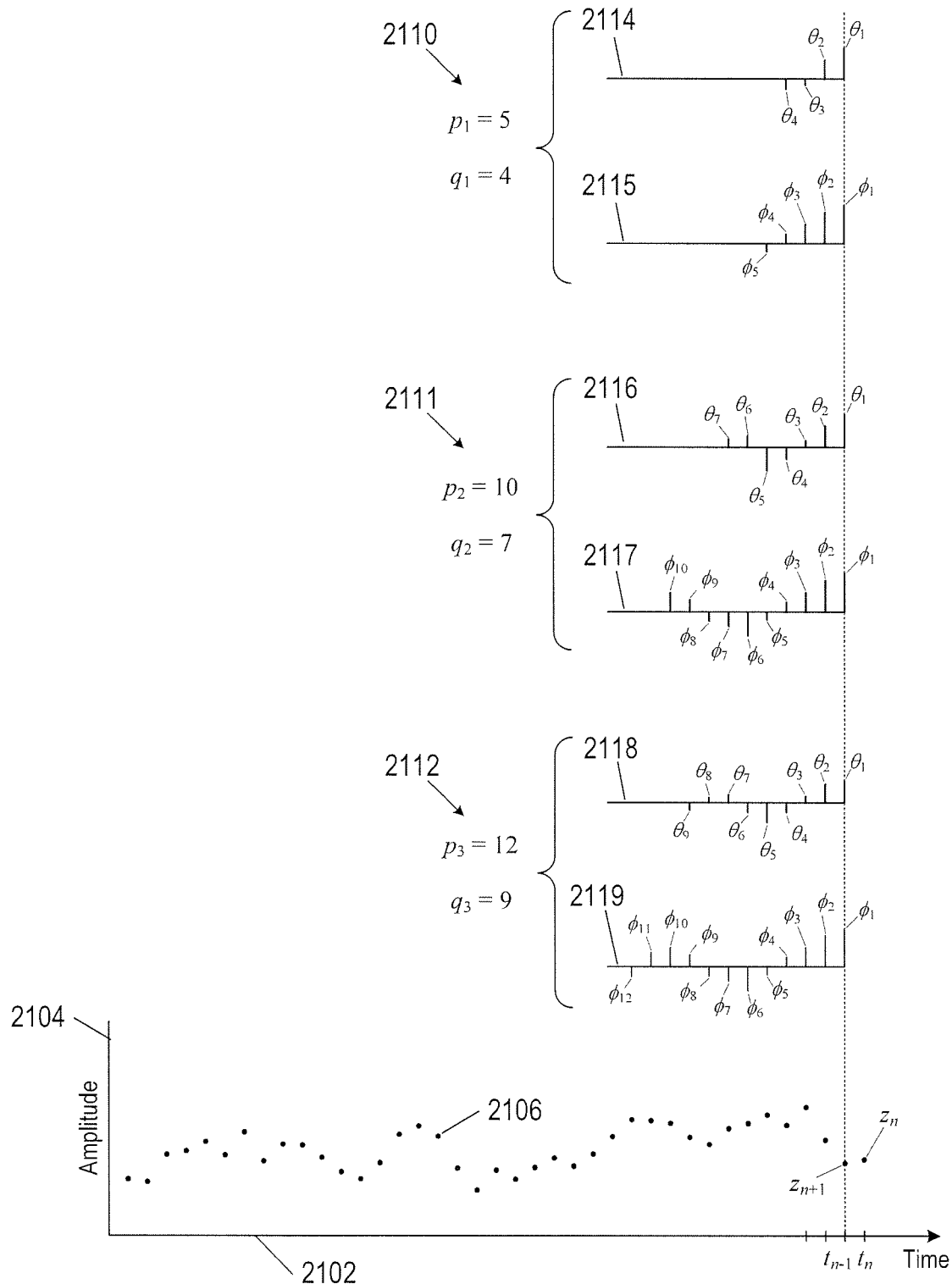
FIG. 21 shows example weight parameters for three autoregressive models.

FIG. 21 shows example weight parameters for three ARMA models ARMA($p_1$, $q_1$), ARMA($p_2$, $q_2$), and ARMA($p_3$, $q_3$). Horizontal axis 2102 represents time. Vertical axis 2104 represents a range of amplitudes of a stationary sequence of non-trendy metric data. Points, such as point 2106, represent metric values in a historical window. FIG. 21 includes plots of three example sets of autoregressive and moving average weight parameters 2110-2112 for three different autoregressive and moving-average models. For example, ARMA model ARMA($p_3$, $q_3$) 2112 comprises twelve autoregressive weight parameters and nine moving-average weight parameters. The values of the autoregressive weight parameters and moving-average weight parameters are computed for the stationary sequence of non-trendy metric data in the historical window. Positive and negative values of the autoregressive weight parameters and moving-average weight parameters are represented by line segments that extend above and below corresponding time axes 2114-2119 and are aligned in time with time stamps of the non-trendy metric data.

Prior to updating the stochastic process models, when a new metric value $x_{n+1}$ is received by the metric processor 1802, the new metric value is detrended according to Equation (5) to obtained detrended metric value $z_{n+1}$ and a corresponding estimated non-trendy metric value $z_{n+1}^{(m)}$ is computed using each of the stochastic process models 1904-1906, where superscript (m) denotes a forecast metric value for the m-th stochastic process. For example, the estimated non-trendy metric value $z_{n+1}^{(m)}$ may be computed using each of the ARMA models ARMA($p_m$, $q_m$) as follows:

$$z_{n+1}^{(m)} = \sum_{i=1}^{p_m} \phi_i z_n + a_{n+1} + \mu_z \Phi + \sum_{i=1}^{q_m} \theta_i a_n \tag{10}$$

where m equals 1, 2, and 3.

Separate accumulated residual errors are computed for each stochastic model as new metric values are received by the metric processor 1702 as follows:

$$\text{Error}(p_m, q_m) = \sum_{i=1}^{n} \left(z_{n+1}^{(m)} - z_{n+1}\right)^2 \tag{11}$$

where $z_{n+1}$ is a latest non-trendy metric value received by the metric processor 1902 at time stamp $t_{n+1}$;

$z_{n+1}^{(m)}$ is an estimated non-trendy metric value computed using the ARMA model ARMA($p_m$, $q_m$) at the time stamp $t_{n+1}$; and $(z_{n+1}^{(m)} - z_{n+1})^2$ is a residual error at the time stamp $t_{n+1}$.

After the accumulated residual error is computed, the limited history of metric data is updated as described above with reference to FIG. 18 and the parameters of the stochastic process models 1904-1906 are updated.

Figure 22:
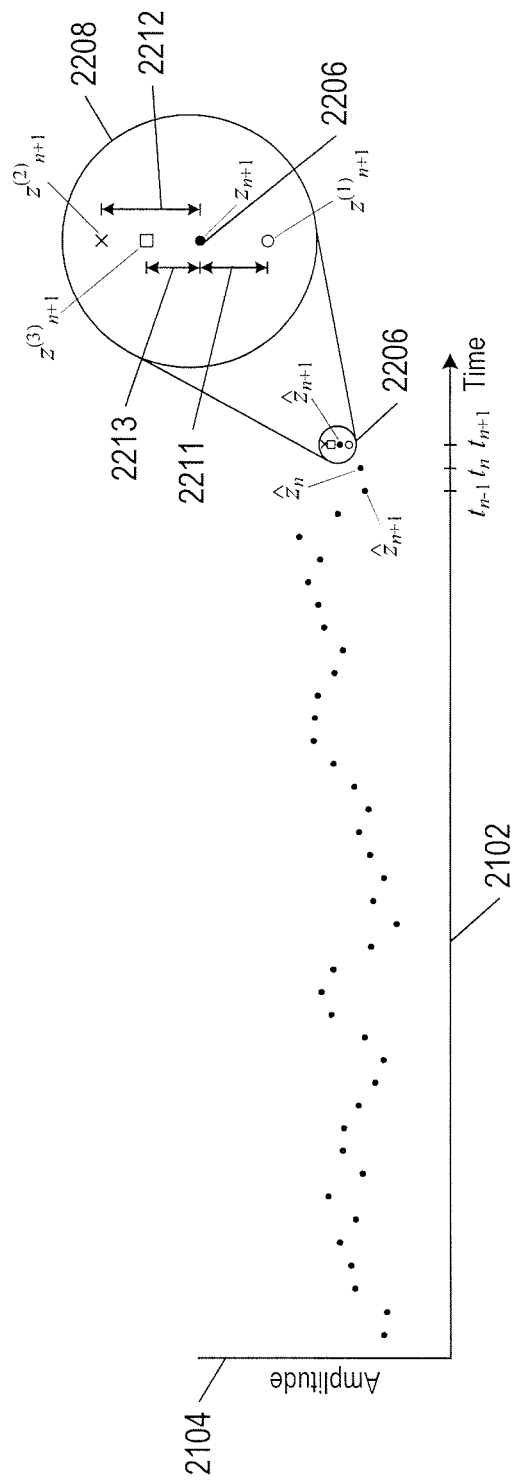
FIG. 22 shows an example of a computing three forecast metric values at the same time stamp for three autoregressive models.

FIG. 22 shows an example of a latest non-trendy metric value $z_{n+1}$ received by the metric processor 1802 as represented by point 2206. Three candidate metric values are separately computed using the three ARMA models ARMA($p_1$, $q_1$), ARMA($p_2$, $q_2$), and ARMA($p_3$, $q_3$) as follows:

$$z_{n+1}^{(1)} = \sum_{i=1}^{p_1} \phi_i z_n + a_{n+1} + \mu_z \Phi + \sum_{i=1}^{q_1} \theta_i a_n$$

$$z_{n+1}^{(2)} = \sum_{i=1}^{p_2} \phi_i z_n + a_{n+1} + \mu_z \Phi + \sum_{i=1}^{q_2} \theta_i a_n$$

and $$z_{n+1}^{(3)} = \sum_{i=1}^{p_3} \phi_i z_n + a_{n+1} + \mu_z \Phi + \sum_{i=1}^{q_3} \theta_i a_n$$

where the white noise $a_{n+1}$ is randomly selecting from the fixed normal distribution. FIG. 22 includes a magnified view 2208 of the latest non-trendy metric value $z_{n+1}$ 2206 received by the metric processor 1802 and three estimated non-trendy metric values $z_{n+1}^{(1)}$, $z_{n+1}^{(2)}$ and $z_{n+1}^{(3)}$ computed separately from the three ARMA models at the time stamp $t_{n+1}$. Directional arrows 2211-2213 represent differences in amplitudes between the latest non-trendy metric value $z_{n+1}$ 2206 and the three estimated non-trendy metric values $z_{n+1}^{(1)}$, $z_{n+1}^{(2)}$ and $z_{n+1}^{(3)}$. Accumulated residual errors are maintained for each of the ARMA models as follows:

$$\text{Error}(p_1, q_1) = \sum_{i=1}^{n} \left(z_{n+1}^{(1)} - z_{n+1}\right)^2$$

$$\text{Error}(p_2, q_2) = \sum_{i=1}^{n} \left(z_{n+1}^{(2)} - z_{n+1}\right)^2$$

and $$\text{Error}(p_3, q_3) = \sum_{i=1}^{n} \left(z_{n+1}^{(3)} - z_{n+1}\right)^2$$

Returning to FIG. 19, when a forecast is requested 1907 in block 1908, the accumulated residual errors of the stochastic models are compared and the stochastic process model with the smallest accumulated residual error is selected for forecasting. For example, the ARMA model ARMA($p_m$, $q_m$) may be used to compute forecast metric values as follows:

$$z_{n+l}^{(m)} = \sum_{i=1}^{l-1} \phi_i z_{n+i-1}^{(m)} + \sum_{i=l}^{p_m} \phi_i z_{n+l-i} + a_{n+l} + \mu_z \Phi + \sum_{t=1}^{q_m} \theta_i a_{n+l-i} \tag{12}$$

where l=1, . . . , L is a lead time index with L the number of lead time stamps in the forecast interval;

$z_n^{(m)}$ is zero; and $a_{n+1}$ is the white noise for the lead time stamp $t_{n+1}$.

Figure 23:
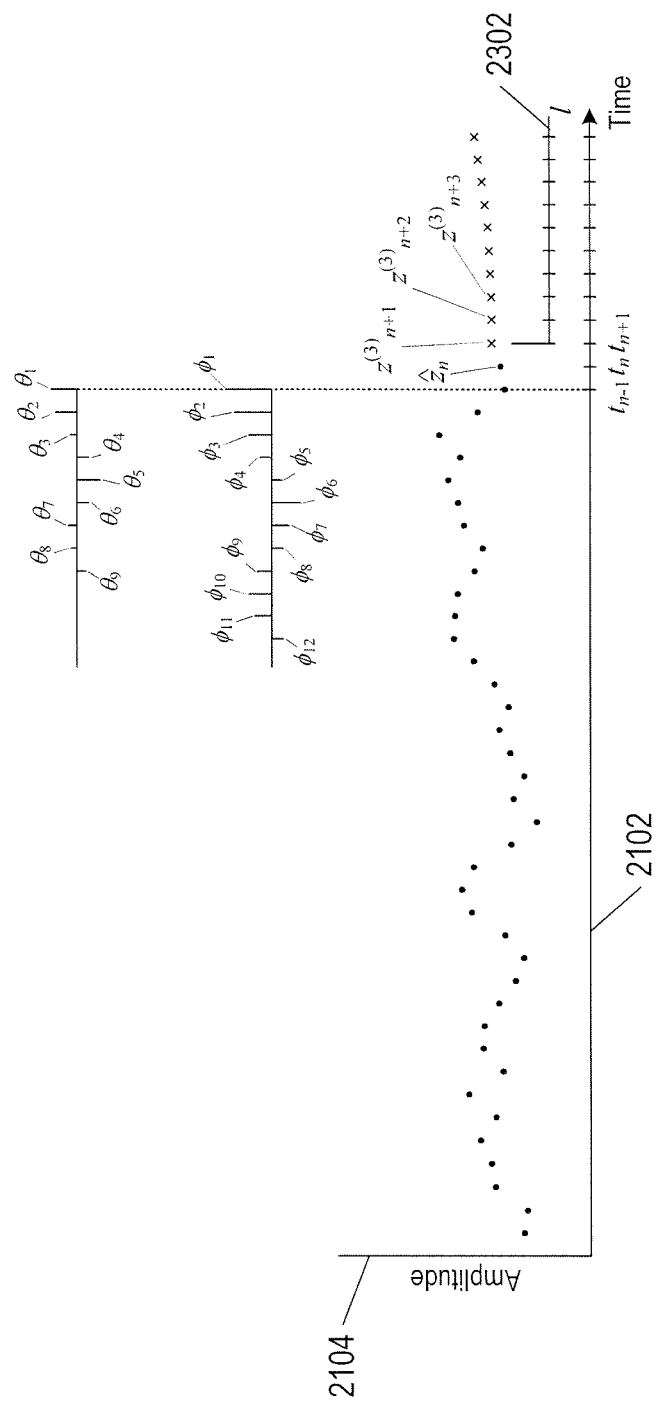
FIG. 23 shows forecast metric values.

FIG. 23 shows forecast metric values computed using weight parameters of the ARMA model 2012 ARMA($p_3$, $q_3$) in FIG. 22. In the example of FIG. 22, horizontal axis 2302 is a time axis for positive integer lead time indices denoted by 1 in Equation (12). The first three forecast metric values, denoted by "x's" in FIG. 22, are computed using ARMA($p_3$, $q_3$) as follows:

$$z_{n+1}^{(3)} = \sum_{i=1}^{p_3} \phi_i z_{n+1-i} + a_{n+1} + \mu_z \Phi + \sum_{i=1}^{q_3} \theta_i a_{n+1-i}$$

$$z_{n+2}^{(3)} = \phi_1 z_{n+1}^{(3)} + \sum_{i=1}^{p_3} \phi_i z_{n+2-i} + a_{n+2} + \mu_z \Phi + \sum_{i=1}^{q_3} \theta_i a_{n+1-i}$$

and $$z_{n+3}^{(3)} = \phi_1 z_{n+2}^{(3)} + \phi_2 z_{n+1}^{(3)} + \sum_{i=3}^{p_3} \phi_i z_{n+3-i} + a_{n+3} + \mu_z \Phi + \sum_{i=1}^{q_3} \theta_i a_{n+1-i}$$

In still other implementations, the stochastic process models 1904-1906 in FIG. 19 may be implemented as autoregressive ("AR") models given by:

$$z_n = \sum_{i=1}^{p} \phi_i z_{n-i} + a_n + \mu_z \Phi \quad (13)$$

The AR model is obtained by omitting the moving-average weight parameters form the ARMA model. By omitting the moving-average model, computation of the autoregressive weight parameters of the AR model is less computationally expensive than computing the autoregressive and moving-average weight parameters of the ARMA models. When the historical window of the sequence of non-trendy metric data is updated with recently received non-trendy metric values, three sets of autoregressive weight parameters are computed for each the three AR models denoted by AR($p_1$), AR($p_2$), and AR($p_3$). Accumulated residual errors are maintained for each of the AR models. Forecast metric values are computed for lead times using Equation (13) with the moving-average weight parameters equal to zero and the AR model with the smallest accumulated residual error at the time of the forecast request.

Unlike a stationary sequence of non-trendy metric data, a non-stationary sequence of non-trendy metric data does not vary over time in a stable manner about a fixed mean. In other words, a non-stationary sequence of non-trendy metric data behaves as the though the metric values of the sequence have no fixed mean. In these situations, one or more of the stochastic process models 1904-1906 in FIG. 19 may be implemented using an autoregressive integrated moving-average ("ARIMA") model given by:

$$\phi(B) \nabla^d z_n = \theta(B) a_n \quad (14)$$

where $\nabla^d = (1-B)^d$.

The ARIMA autoregressive weight parameters and move-average weight parameters are computed in the same manner as the parameters of the ARMA models described above. The ARIMA model, denoted by ARIMA($p_1$, $q_1$), ARIMA($p_2$, $q_2$), and ARIMA($p_3$, $q_3$), with the smallest accumulated residual error at the time of the forecast request is used to compute forecast metric values $z_{n+1}^{(m)}$ for lead times in the forecast interval.

Returning to FIG. 19, certain streams of metric data may have pulse wave patterns. Other streams of metric data may have a single time varying periodic pattern or a combination of period patterns, such as hourly, daily, weekly or monthly periodic patterns, and are called "seasonal." Other streams of metric data may not be periodic. Because pulse wave metric data is a special type of periodic data, in decision block 1809, edge detection is used to determine if the sequence of non-trendy metric data in the historical window is pulse wave metric data. If edge detection reveals that the metric data is pulse wave metric data, control flows to determining the pulse wave model 1910. Otherwise, control flows to block 1911 to determine if the metric data contains a seasonal pattern. Seasonality in a sequence of non-trendy metric data is a regular periodic pattern of amplitude changes that repeats in time periods. A seasonal period is determined in a seasonal model in block 1911.

Figure 24:
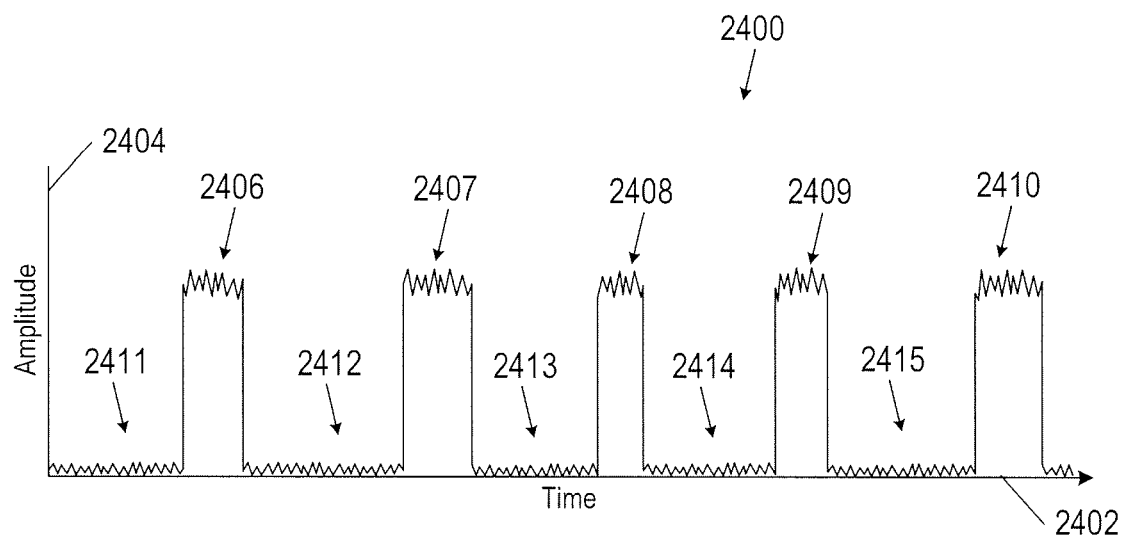
FIG. 24 shows a plot of an example stream of pulse wave metric data.

FIG. 24 shows a plot of an example stream of metric data 2400. Horizontal axis 2402 represents time. Vertical axis 2404 represents a range of amplitudes for metric values. The stream of metric data comprises pulses 2406-2410 separated by low amplitude time intervals 2411-2414. The stream of metric data may represent network traffic, memory usage, or CPU usage for a server computer that runs a periodically executed VM. The low amplitude time intervals 2411-2414 represent time intervals in which the VM is idle. Pulses 2406-2410 represent time intervals when the VM is running. This stream of metric data is an example of metric data modeled using a pulse wave model 1910.

Figure 25:
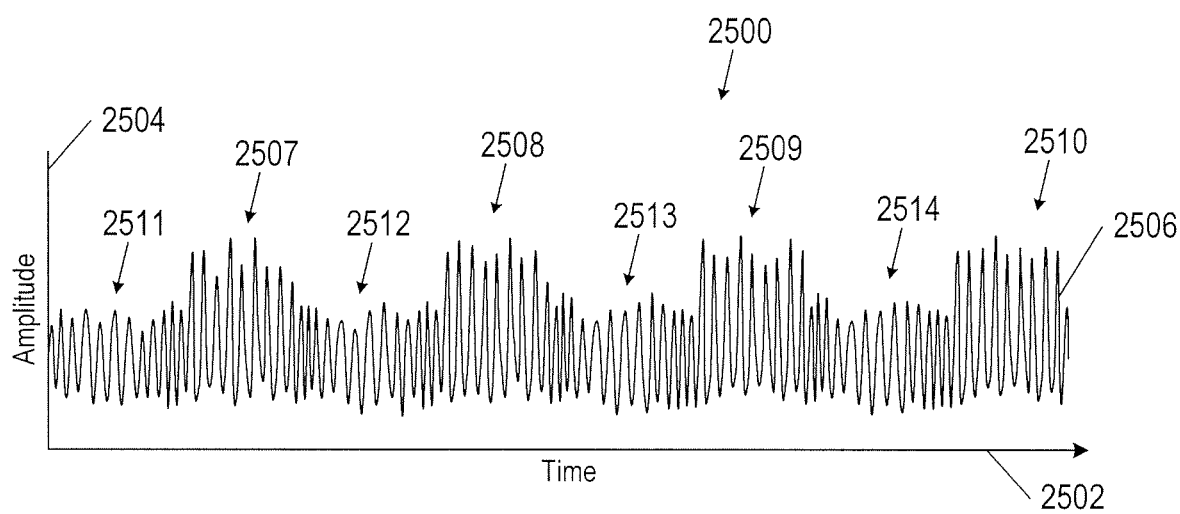
FIG. 25 shows a plot of an example stream of seasonal metric data that exhibits two seasonal periods.

FIG. 25 shows a plot of an example stream of metric data 2500 that exhibits two seasonal periods. Horizontal axis 2502 represents time. Vertical axis 2504 represents a range of amplitudes for metric values. Oscillating curve 2506 represents a stream of metric data with two seasonal periods. A first longer seasonal period appears with regularly spaced larger amplitude oscillations 2506-2509 separated by regularly spaced smaller amplitude oscillations 2510-2513. A second shorter seasonal period exhibits oscillations over much shorter time intervals. This stream of metric data is an example of seasonal metric data modeled using the seasonal model 1911.

In block 1909 of FIG. 19, edge detection is applied to the metric data in the historical window. An exponentially weighted moving average ("EWMA") of absolute differences between two consecutive non-trendy metric values denoted by $\Delta_i = |z_i - z_{i+1}|$ is maintained for i=1, n metric values in the historical window. The EWMA for the latest time stamp $t_n$ in the historical window is computed recursively by:

$$MA_n = \alpha \Delta_n + (1-\alpha) MA_{n-1} \quad (15a)$$

where
$MA_0 = 0$; and
$0 < \alpha < 1$.

For example, the parameter a may be set 0.1, 0.2, or 0.3. For each new non-trendy metric value $z_{n+1}$, the absolute difference $\Delta_{n+1} = |z_{n+1} - z_n|$ is computed. The new non-trendy metric value $z_{n+1}$ is a spike in the magnitude of the stream of metric data, when the absolute difference satisfies the following spike threshold condition:

$$\Delta_{n+1} > Th_{spike} \quad (15b)$$

where $Th_{spike} = C \times MA_N$.

The parameter C is a numerical constant (e.g., C=4.0, 4.5, or 5.0). When the absolute difference $\Delta_{n+1}$ is less than the spike threshold, control flows to seasonal model in block 1911 of FIG. 19. When the new non-trendy metric value $z_{n+1}$ satisfies the condition given by Equation (15b), edge detection is applied to determine if sequence of non-trendy metric data comprises pulse wave edges in a backward time window $[z_{n-X}, z_n]$ and a forward time window $[z_n, z_{n+X}]$, where X is a fixed number of metric values.

Figure 26A:
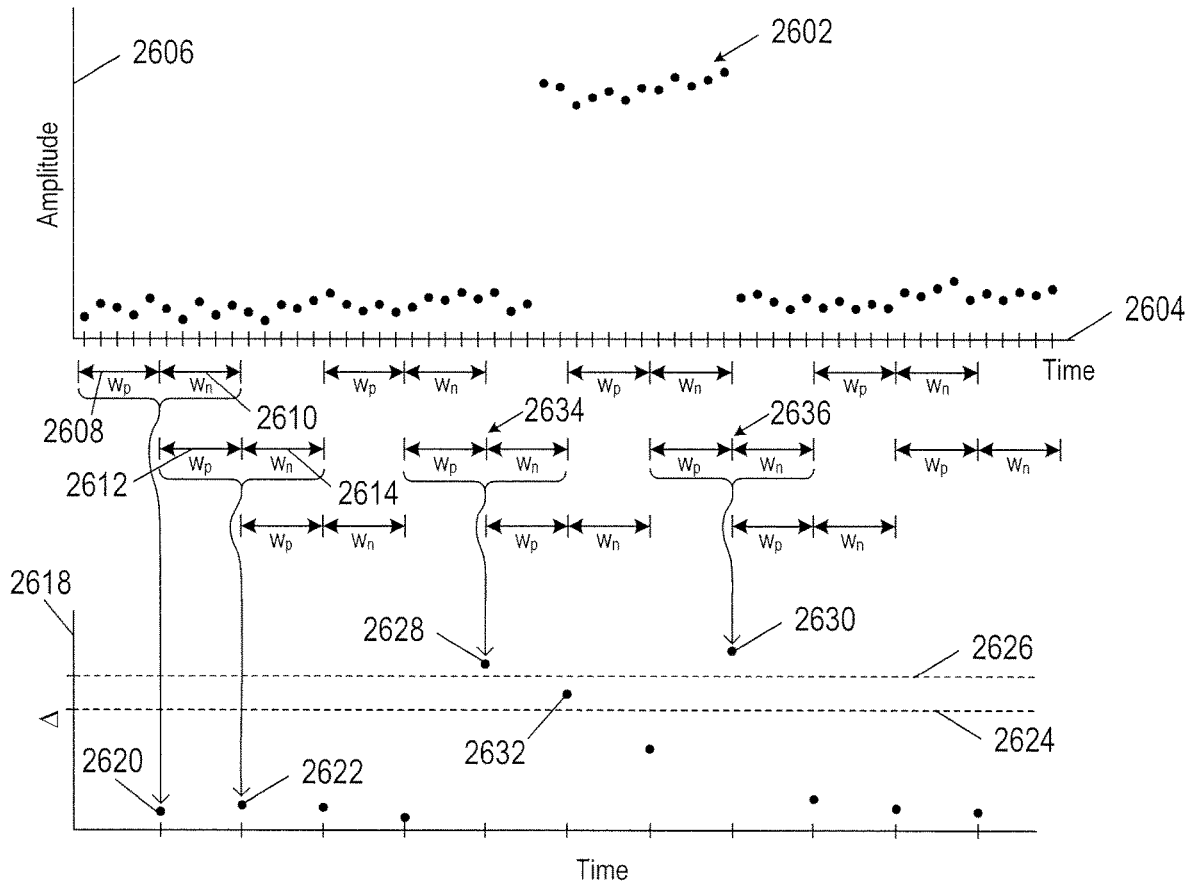
FIGS. 26A-26B show an example of edge detection applied to a sequence of pulse wave metric data.
Figure 26B:
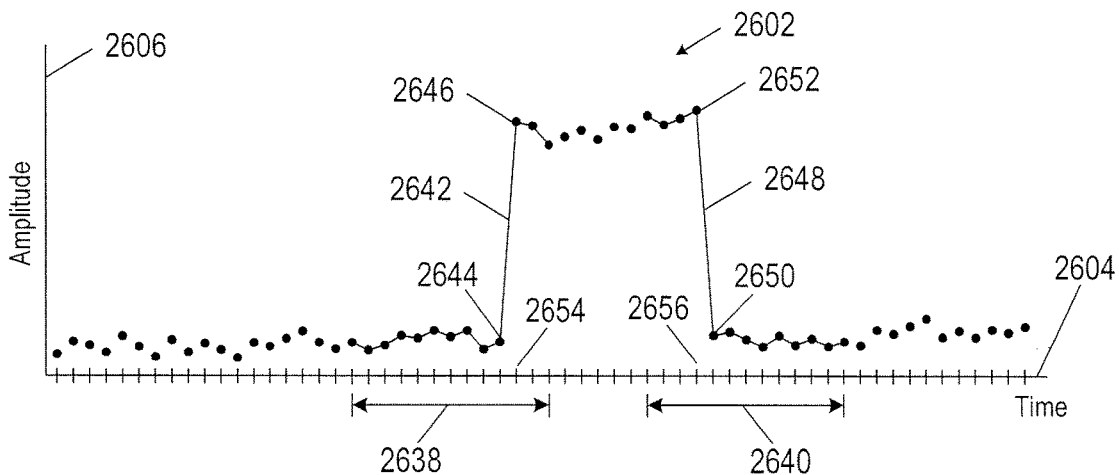

FIGS. 26A-26B show edge detection applied to a sequence of metric data. FIG. 26A shows a plot of a square pulse 2602 in metric data. The metric data may have been smoothed to suppress the noise using a smoothing filter applied to the metric data in the historical window. The smoothing filter may be a moving median filter, a moving average filter, or a Gaussian filter. Horizontal axis 2604 represents a time window of the historical window. For example, the time window may be 20 minutes, 30 minutes, or 40 minutes or a longer time window of the historical window. Vertical axis 2606 represents a range of metric data amplitudes. Metric data are averaged in two adjacent sliding time windows within the larger time window 2604. The two adjacent time windows are referred to as a previous time window, denoted by $w_p$, and a next time window, denoted by $w_n$. FIG. 26A shows examples of adjacent sliding previous and next time windows. For example, directional arrows 2608 and 2610 represent adjacent previous and next time windows, respectively. In the example of FIG. 26A, the previous and next time windows each contain five metric values. In other implementations, the previous and next time windows may contain any number of metric values. FIG. 26A shows the locations of previous and next time windows as the windows move within the larger time window 2604 represented by horizontal time axis 2604. Each next time window becomes a previous time window. For example, next time window 2610 becomes previous time window 2612. For each location of the previous time window, an average of the metric values in the previous time window is computed as follows:

$$\Sigma S(w_p) = \frac{1}{|S(w_p)|} \sum_{z_i \in S(w_p)} z_i \tag{16a}$$

where
$S(w_p)$ is the set of metric data with time stamps in the previous time window $w_p$; and
$|S(w_p)|$ is the number of metric values with time stamps in the previous time window $w_p$.

An average of the metric values in the next time window is computed as follows:

$$\Sigma S(w_n) = \frac{1}{|S(w_n)|} \sum_{z_i \in S(w_n)} z_i \tag{16b}$$

where
$S(w_n)$ is the set of metric data with time stamps in the next time window $w_n$; and
$|S(w_n)|$ is the number of metric values with time stamps in the next time window $w_n$.

The average metric data $\Sigma S(w_p)$ in the previous time window and the average metric data $\Sigma S(w_n)$ in the next time window are moving averages as the previous and next time windows are moved within the larger time window 2604. A change parameter is computed for each location of the previous and next time windows in the larger time window 2604 as follows:

$$\Delta = |\Sigma s(w_p) - \Sigma S(w_n)| \tag{17}$$

FIG. 26A shows a plot of change parameters for each location of the previous and next time windows. Horizontal axis 2616 represents time. Vertical axis 2618 represents a range of change parameter values. For example, solid point 2620 represents the value of a change parameter for the metric values in previous and next time windows 2608 and 2610. Solid point 2622 represents the value of a change parameter for the metric values in previous and next time windows 2612 and 2614.

When the following two conditions are satisfied for a change parameter, the corresponding previous and next time windows are a time interval, denoted by $w_p \cup w_n$, that contains an edge of a square pulse of metric data. The first condition is given by $$\Delta > Th_1 \times (\max\{z_i\} - \min\{z_i\}) \tag{18a}$$

where
$0 < Th_1 < 1$ (e.g., $Th_1 = 0.05$);
$\max\{z_i\}$ is the maximum metric value in set of metric values in the historical window;
$\min\{z_i\}$ is the minimum metric value in the set of metric values in the historical window; and
$\max\{z_i\} - \min\{z_i\}$ is the maximum amplitude range of metric values in the historical window.

The quantity $Th_1 \times (\max\{z_i\} - \min\{z_i\})$ is the maximum amplitude range of metric values threshold. The second condition is given by $$\Delta > Th_2 \times MA(\Delta) \tag{18b}$$

where
$0 < Th_2 < 1$ (e.g., $Th_2 = 0.25$); and
$MA(\Delta)$ is the EWMA.

The quantity $Th_2 \times MA(\Delta)$ is a change parameter EWMA threshold. The EWMA of the change parameters is a weighted average that assigns weight to the most recently generated change parameter relative to change parameters generated in the past and is given by:

$$MA(\Delta_i) = \lambda \Delta_i + (1-\lambda) MA(\Delta_{i-1})$$

where
$MA(\Delta_0)$ is the mean of historical change parameters;
$\Delta_i$ is the change parameter of the i-th most recent previous and next time window; and
$0 < \lambda < 1$ is a constant that determines the weight at which older change parameters enter into calculation of the EWMA (i.e., a large value of $\lambda$ gives more weight to recent change parameters and less weight to older change parameters).

In FIG. 26A, dashed lines 2624 and 2626 represent thresholds in Equations (17a) and (17b). Change parameters 2628 and 2630 satisfy the two conditions. Change parameter 2630 satisfies one condition but not the other. Change parameters with values less than dashed line 2624 do not satisfy either condition. Because the change parameters 2628 and 2630 satisfy the two conditions, the corresponding previous and next time windows 2634 and 2636 are time intervals that contain edges of the square pulse 2602.

An absolute difference is computed between each pair of consecutive metric values with time stamps in a time interval $w_p \cup w_n$ identified as having an edge. The largest absolute difference between consecutive pairs of metric values in the time interval is given by $$|z_{i+1} - z_i| = \max\{|z_{j+1} - z_j|\}_{j=1}^{J-1} \tag{19}$$

where
$z_j \in w_p \cup w_n$ for $j = 1, \ldots, J$; and
$J$ is the number of metric values in the time interval $w_p \cup w_n$.

When $z_{i+1} - z_i > 0$, the edge is an upward or increasing edge and time $t_{i+1}$ is the time of the upward edge. When $z_{i+1} -$ $z_i<0$, the edge is a downward or decreasing edge and time $t_i$ is the time of the downward edge.

FIG. 26B shows a plot of the square pulse 2602 of metric values and time intervals 2638 and 2640 that correspond to previous and next time intervals 2634 and 2636, respectively. Line segments between metric values represent absolute differences. Line segment 2642 between metric values 2644 and 2646 is the largest difference between consecutive pairs of metric values in the time interval 2638. Line segment 2648 between metric points 2650 and 2652 is the largest difference between consecutive pairs of metric values in the time interval 2640. Time stamps 2654 and 2656 of the metric values 2646 and 2652 are the edges of the square pulse 2602.

Returning to FIG. 19, the pulse wave model 1910 estimates the pulse width and period for the pulse wave stream of metric data. The pulse width can be estimated as a difference in time between consecutive upward and downward edges. The period can be estimated as a difference in time between two adjacent upward (or downward) edges.

Figure 27A:
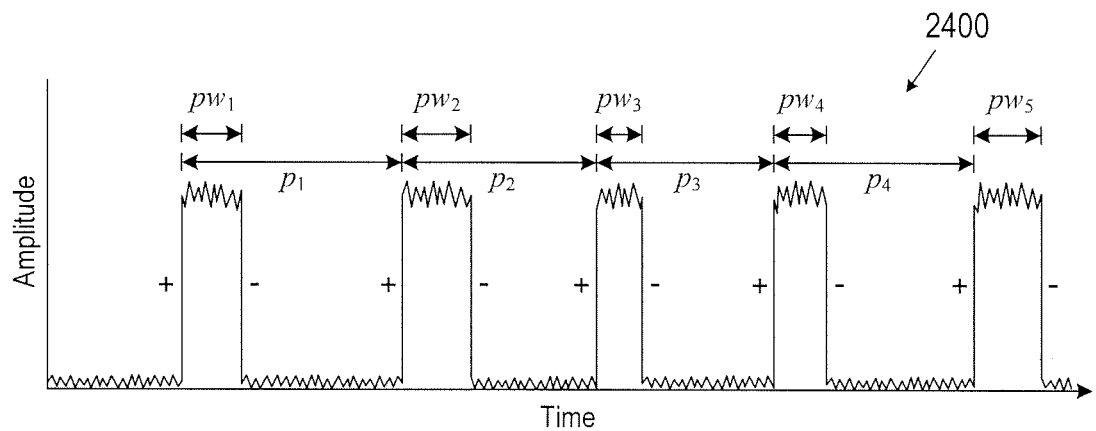
FIG. 27A shows pulse widths and periods of a stream of pulse wave metric data.

FIG. 27A shows pulse widths and periods of the stream of metric data 2400. Each edge has a corresponding 3-tuple ($t_s$, A, sign), where $t_s$ represents the time stamp of the pulse edge, A is the amplitude of the pulse edge, and "sign" indicates whether pulse is upward denoted by "+" or downward denoted by "−". Pulse widths denoted by $pw_1$, $pw_2$, $pw_3$, $pw_4$, and $pw_5$ are computed as a difference between time stamps of consecutive upward and downward edges. Periods denoted by $p_1$, $p_2$, $p_3$, $p_4$, and $p_5$ are computed as a difference between time stamps of two consecutive upward (or downward) edges. The latest pulse widths and periods are recorded in corresponding circular buffer back-sliding histograms described below with reference to FIG. 27B.

Recent mode tracking may be used to determine robust periodic model parameter estimates. Recent mode tracking is implemented with a circular buffer back-sliding histogram to track recent distributions. The periodic parameters are stored in a circular buffer. When a latest periodic parameter is determined, the periodic parameter is input to the circular buffer to overwrite the oldest periodic parameter stored in the buffer. The back-sliding histogram is updated by incrementing the count of the histogram bin the latest periodic parameter belongs to and by decrementing the count of the histogram bin the oldest periodic parameter belongs to. The mode tracker outputs the histogram bin with the largest count when the count is greater than a histogram threshold defined as $Th_{hist}=C \times total\_count$, where $0<C<1$ (e.g., C equals 0.2, 0.3, 0.4, or 0.5) and total_count is the total count of periodic parameters recorded in the histogram. For each histogram bin, the count of periodic parameters in the histogram bin, denoted by Count(bin), is compared with the histogram threshold. When the following condition is satisfied $$Count(bin) > Th_{hist} \qquad (20)$$

the latest periodic parameter with a count added to the bin with Count(bin) that satisfies Equation (26) is used to forecast periodic metric data. On the other hand, if none of the counts of the histogram bins are greater than the histogram threshold, then forecasting of the metric data is not carried out with any of the periodic parameters of the histogram bins and the metric data in the historical window does not have a periodic pattern.

Figure 27B:
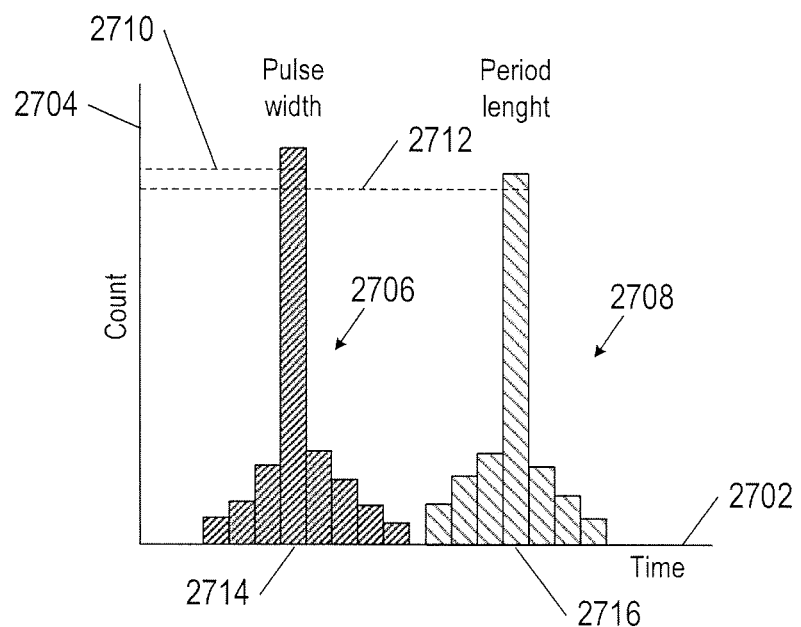
FIG. 27B shows a plot of an example histogram of periodic parameters for a pulse wave model.

FIG. 27B shows a plot of an example histogram of periodic parameters for the pulse wave model. Horizontal axis 2702 represents a time bin axis. Vertical axis 2704 represents counts. Histogram 2706 represents a back-sliding histogram of pulse widths and histogram 2708 represents a back-sliding histogram of periods for pulse-wave metric data for seasonal model. Dashed line 2710 represents a histogram threshold for pulse widths. Dashed line 2712 represents a histogram of threshold for periods. In the example of FIG. 27B, the count of pulse widths in histogram bin 2714 is greater than the histogram threshold 2710 and the count of periods in histogram bin 2716 is greater than the histogram threshold 2712. In this case, the most recent pulse width and period counted in corresponding historical bins 2714 and 2716 are pulse wave period parameters used to forecast pulse wave metric data.

Returning to FIG. 19, if the sequence of non-trendy metric data is not pulse-wave metric data, the metric data may be seasonal metric data and a seasonal period is determined in seasonal model 1911. The seasonal model 1911, begins by applying a short-time discrete Fourier transform ("DFT") given by:

$$Z(m, k/N) = \sum_{i=1}^{N} z_i w(i-m) \exp(-j2\pi k i/N) \qquad (21)$$

where
m is an integer time shift of a short-time window;
j is the imaginary constant $\sqrt{-1}$;
k=0, . . . , N−1 is a frequency spectrum sample;
N is the number of data points in a subset of the historical window (i.e., N≤n); and
w(i−m) is a window function.

The window function w(i−m) is function that tapers toward both ends of the short-time window. For example, the window function can be a Hann function, a Hamming function, or Gaussian function. The spectrum Z(m, k/N) is a complex valued function of m and k. The power spectral density ("PSD") is given by:

$$PSD(m, k/N) = |Z(m, k/N)|^2 \qquad (22)$$

where $k = 0, \ldots, N/2$;

$f_k = \dfrac{2k}{N} f_c$; and $f_c$ is the Nyquist frequency.

The PSD is the power of the frequency spectrum at N/2+1 frequencies. The PSD values PSD(m,k/N) form a periodogram over a domain of frequency samples k (i.e., $f_k$) for each time shift in.

The short-time DFT may be executed with a fast Fourier transform ("FFT"). Ideally, a high-resolution FFT comprising a large window size and high sampling rate would be used to compute a PSD in each historical window of the FFT to provide complete frequency spectrum information in the historical window. By finding a maximum PSD point at each time shift m and curve fitting, various seasonal patterns and reconstructed metric values can ideally be forecast with an inverse FFT. However, computing a high-resolution FFT and storing the full PSD for a sequence of non-trendy metric data is computationally expensive and time consuming in a resource constrained management system that already receives thousands of different streams of metric data and in which real time forecasts are needed to respond to rapidly to changing demands for computational resources in a distributed computing system.

Methods described herein avoid the slowdown created by a high-resolution FFT by:

1) using an FFT in a short-time window with a small number of metric values (e.g., a short-time window may have N=64, 128 or 256 sequential non-trendy metric values of the limited history) for three different coarse sampling rates, 2) extracting a single principal frequency from each PSD and tracking a most recent mode of the principal frequency, and 3) performing a local auto-correlation function ("ACF") search in the time domain to refine estimation of a principal period that corresponds to the principal frequency of the metric data to compensate for resolution lost with coarse sampling rates and spectral leakage.

The FFT is applied to subsequences of the sequence of non-trendy metric data, each subsequence comprising N metric values sampled from the sequence of non-trendy metric data using a different sampling rate. Each subsequence of metric values is searched for a periodic pattern. For example, the example sequence of non-trendy metric data 2600 shown in FIG. 26 appears to have a short periodic pattern and a longer periodic pattern as described above with reference to FIG. 26. The period determined for the shorter sampling rate has higher priority in forecasting than a period obtained for a longer sampling rate.

Figure 28:
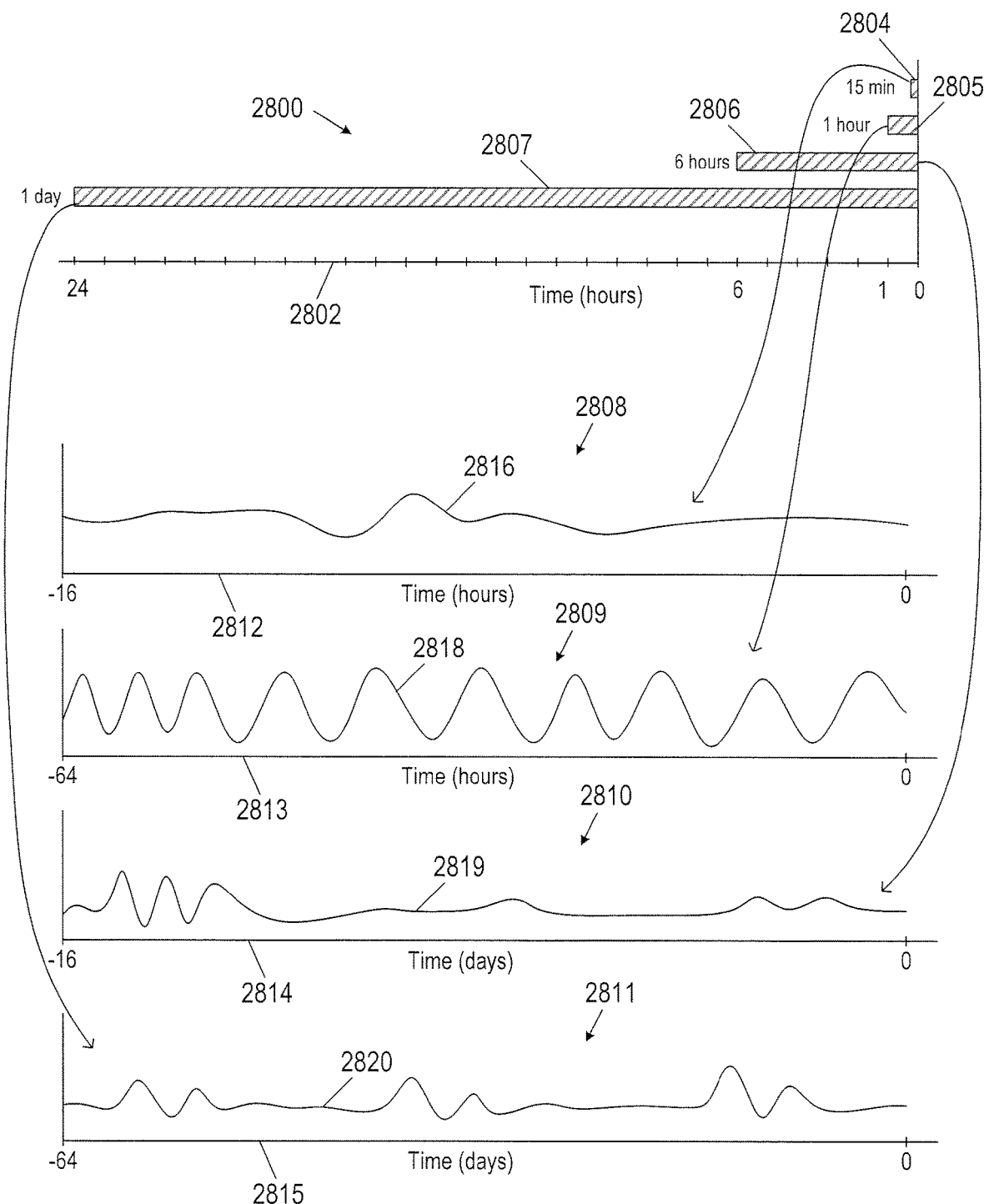
FIG. 28 shows a bar graph of four different examples of sampling rates and associated subsequences of metric data.

FIG. 28 shows a bar graph 2800 of four different examples of sampling rates and associated with different subsequences of samples of the same sequence of non-trendy metric data. Horizontal axis 2802 represent time in hours. Hash-marked bars 2804-2807 represent durations of three different sampling rates applied to the same stream of metric data to collect three different subsequences of non-trendy metric data over three different time intervals. Each subsequence contains N=64 sequential non-trendy metric values of the larger sequences of non-trendy metric data. Plots 2808-2811 are example plots of subsequences of metric data resampled from the sequence of non-trendy metric data over four different time intervals and the four different sampling rates represented by the bar graph 2700. In plots 2808-2811, horizontal axes 2812-2815 represent different time intervals. Time zero along each axis represents the current time. In plot 2808, horizontal axis 2812 represents a time interval of 16 hours. Curve 2816 represents a subsequence of metric data sampled from the sequence of non-trendy metric data over a 16-hour time interval at the sampling rate of 15 minutes. In plot 2808, horizontal axis 2813 represents a time interval of 64 hours. Curve 2818 represents a subsequence of metric data sampled from the sequence of non-trendy metric data over a 64-hour time interval at the sampling rate of 1 hour. In plot 2810, horizontal axis 2814 represents a time interval of 16 days. Curve 2819 represents a sequence of metric data sampled from the sequence of non-trendy metric data over a 16-day time interval at the sampling rate of 6 hours. In plot 2811, horizontal axis 2815 represents a time interval of 64 days. Curve 2820 represents metric data sampled from the sequence of non-trendy metric data over a 64-day time interval at the sampling rate of 24 hours. The different sampling rates applied to the same sequence of non-trendy metric data over different time intervals reveal different frequency patterns or seasonal periods within the sequence of non-trendy metric data. Subsequences of metric data 2818 exhibits a seasonal period. Subsequences of metric data 2816, 2819, and 2820 exhibit no discernible periodic pattern. If it is the case that different periods are present in two or more subsequences of metric data, the period associated with the shorter sampling rate has higher priority in forecasting than the period associated with the longer sampling rate. The principal frequency or period of the subsequence of metric data with shortest associated sampling rate is determined. Methods for determining the principal frequency or period of a sequence of non-trendy metric data are described below with reference to FIGS. 29-30.

Figure 29:
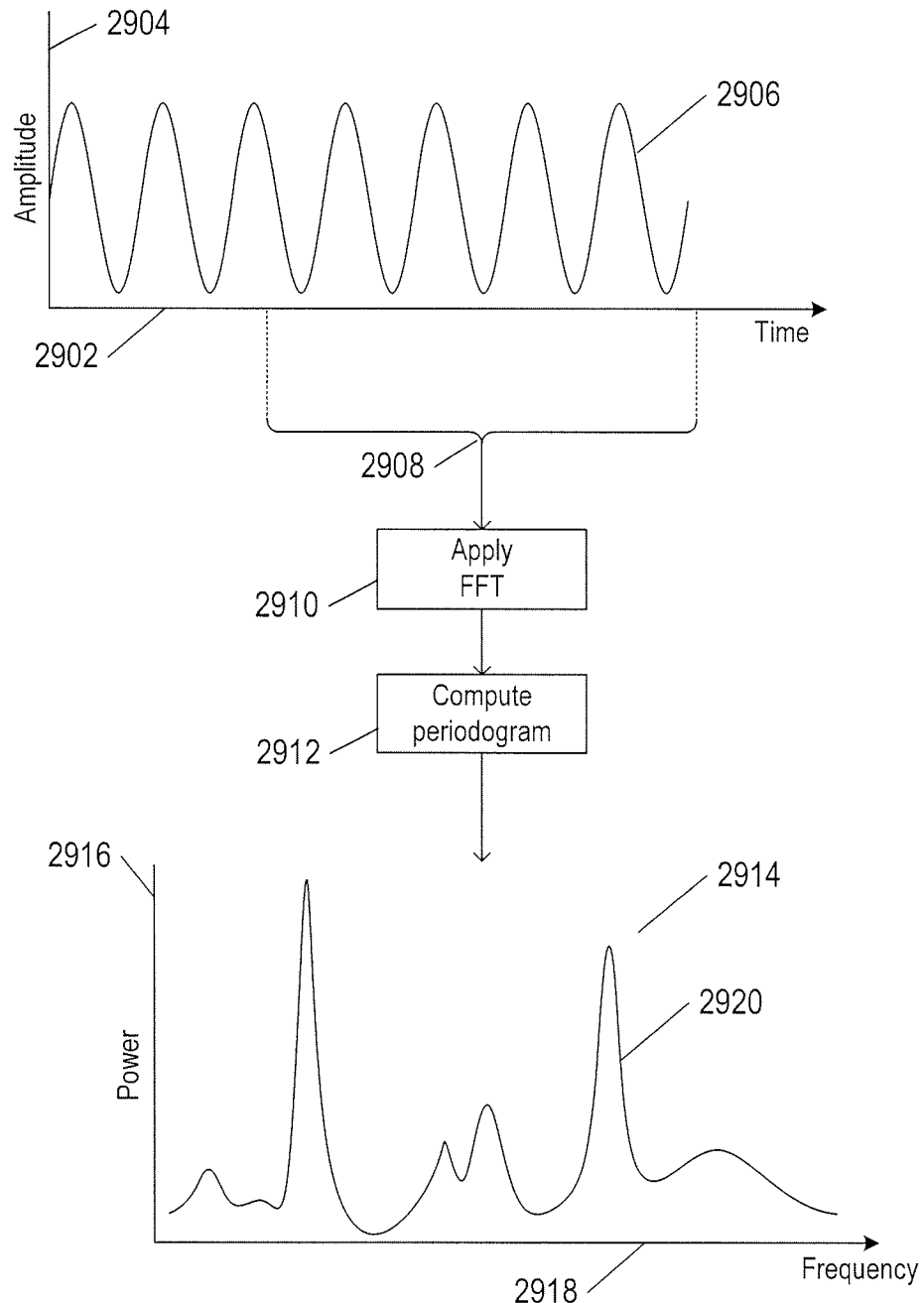
FIG. 29 shows an example of a periodogram computed for a time window of seasonal metric data.

FIG. 29 shows an example of a periodogram computed for seasonal metric data in a time window. In FIG. 29, horizontal axis 2902 represents time. Vertical axis 2904 represents a range of metric data amplitudes. Curve 2906 represents a sequence of non-trendy metric data. Bracket 2908 represents a moving time window. For each location of the time window 2908, an FFT 2910 is applied to a number N of the latest metric values followed by computation of a periodogram 2912. As more metric data is received and sampled at the sampling rate, the FFT is applied to the subsequence of metric data in a current time window followed by computation of a PSD. FIG. 29 shows example plot of a periodogram 2914. Axis 2916 represents a range of frequencies. Axis 2918 represents a range of power. Curve 2920 represents the power spectrum of the seasonal metric data in the time window 2908.

For each periodogram, an approximate area of the periodogram is computed. For example, the approximate area of a periodogram can be computed using the Trapezoid Rule:

$$PSD_{Area} = \frac{N}{2} \sum_{k=1}^{N/2} \left( PSD\left(\frac{k-1}{N}\right) - PSD\left(\frac{k}{N}\right) \right) \quad (23)$$

Other methods may be used to compute the area of a periodogram, such as Simpson's rule and Romberg's method. Candidate principal frequencies of a periodogram are identified from the approximate area of the periodogram using the following threshold condition:

$$\underset{k}{\operatorname{argmax}}\left\{\left(PSD\left(\frac{k}{N}\right) * K_{trap}\left(\frac{k}{N}\right)\right)\right\} > Th_{princ} * \sum_{k=0}^{N/2} PSD\left(\frac{k}{N}\right) \quad (24)$$

where

"*" means convolution;

$Th_{princ} = PSD_{Area}/Q$; and $$K_{trap}\left(\frac{k}{N}\right) = C_1 PSD\left(\frac{k-1}{N}\right) + C_2 PSD\left(\frac{k}{N}\right) + C_3 PSD\left(\frac{k+1}{N}\right)$$

The parameter Q is a positive integer (e.g., Q=3, 4, or 5) and $K_{trap}(k/N)$ is called a normalized three-point trapezoid window. The parameters $C_1$, $C_2$, and $C_3$ are normalized to 1. For example, $C_1=C_3=0.25$ and $C_2=0.5$. If none of the frequencies of the periodogram satisfies the condition given by Equation (19), the subsequence of the sequence of non-trendy metric data does not have a principal frequency in the time window of the FFT and is identified as non-periodic.

Figure 30A:
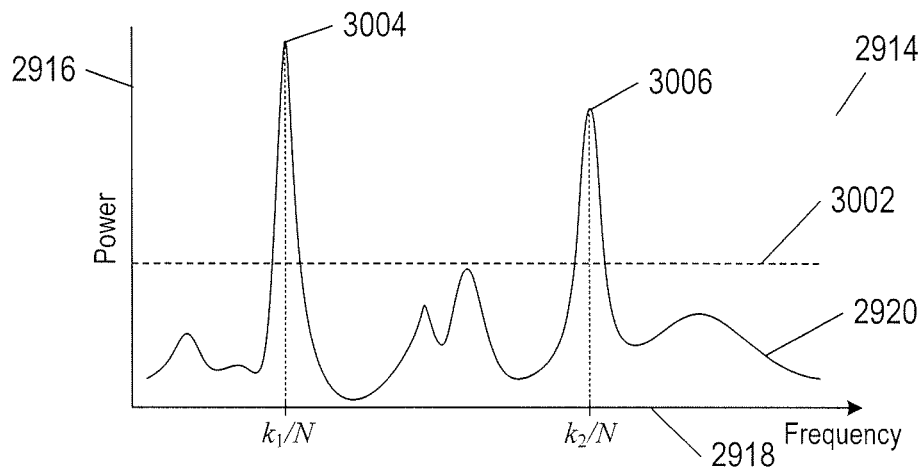
FIG. 30A show a plot of the periodogram shown in FIG. 29.

FIG. 30A show a plot of the periodogram 2914 shown in FIG. 29. Frequencies of the power spectrum 2920 are denoted by k/N. The area under the curve 3106 may be approximated by Equation (21). Dashed line 3002 represents the principal frequency threshold $Th_{princ}$. In this example, the periodogram reveals two strong peaks 3004 and 3006 above the threshold 3008 with corresponding frequencies $k_1/N$ and $k_2/N$. However, which of the two peaks 3004 and 3006 is the principal frequency cannot be determined directly from the periodogram alone.

Each PSD value PSD(k/N) of a periodogram is the power in the spectral domain at a frequency k/N or equivalently at a period N/k in the time domain. Each DFT bin corresponds to a range of frequencies or periods. In particular, Z(k/N) bin corresponds to periods in the time interval $$\left[\frac{N}{k}, \frac{N}{k-1}\right).$$

The accuracy of discovered candidate principal frequencies based on the periodogram deteriorates for large periods because of the increasing width of the DFT bins (N/k). In addition, spectral leakage causes frequencies that are not integer multiples of the DFT bin width to spread over the entire frequency spectrum. As a result, a periodogram may contain false candidate principal frequencies. However, a periodogram may provide a useful indicator of candidate principal frequencies.

In certain implementations, the principal frequency of the periodogram is determined by computing an autocorrelation function ("ACF") within each neighborhood of candidate periods that correspond to candidate principal frequencies of the periodogram. The autocorrelation function over time lags $\tau$ is given by:

$$ACF(\tau) = \frac{1}{N} \sum_{i=1}^{N} z_i z_{i+\tau} \qquad (25)$$

The ACF is time-domain convolution of the subsequence of non-trendy metric values $\hat{z}_i$ in the short-time window of the FFT. Given the candidate principal frequencies of the periodogram that satisfy the threshold requirements of the condition in Equation (24), the ACF is used to determine which of the corresponding candidate periods in the time domain is a valid principal period. A candidate period with an ACF value located near a local maximum of the ACF (i.e., located within a concave-down region) is a valid period. A candidate period with an ACF value located near a local minimum of the ACF (i.e., located within a concave-up region) is not a valid period and is discarded. For a period with an ACF value that lies on a concave-down region of the ACF, the period is refined by determining the period of a local maximum ACF value of the concave-down region. The period of the local maximum is the principal period used to forecast seasonal metric data.

Figure 30B:
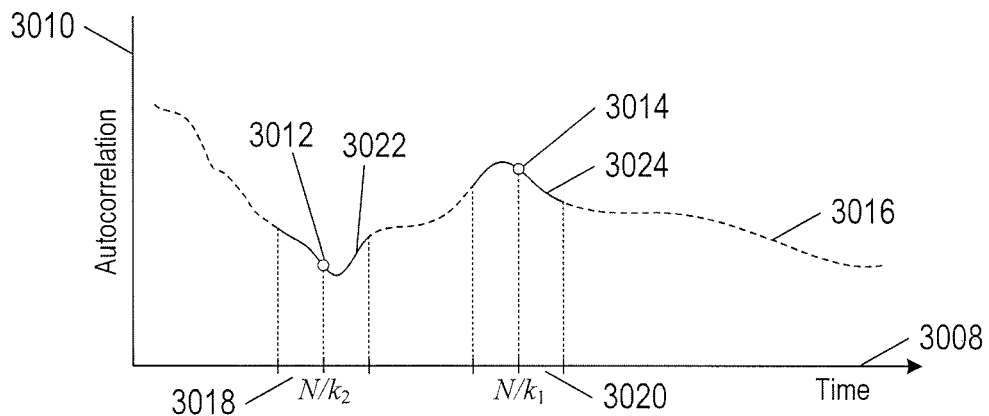
FIG. 30B shows a plot of an example autocorrelation function that corresponds to the periodogram shown in FIG. 30A.

FIG. 30B shows a plot of an example ACF that corresponds to the periodogram shown in FIG. 30A. Horizontal axis 3008 represents time. Vertical axis 3010 represents a range of ACF values. Dashed curve 3012 represents ACF values computed according to Equation (23) over a time interval. Periods $N/k_1$ and $N/k_2$ represent candidate periods that correspond to candidate principal frequencies $k_2/N$ and $k_1/N$ in FIG. 30A. Open points 3012 and 3014 are ACF values at candidate periods $N/k_1$ and $N/k_2$. Rather than computing the full ACF represented by dashed curve 3016 over a large time interval, in practice, the ACF may be computed in smaller neighborhoods 3018 and 3020 of the candidate periods as represented by solid curves 3022 and 3024. The ACF value 3014 is located on a concave-down region of the ACF and corresponds to the largest of the two candidate principal frequencies. The other ACF value 3012 is located on a concave-up region of the ACF and corresponds to the smallest of the two candidate principal frequencies.

A neighborhood centered at the candidate period N/k is represented by:

$$NBH_{N/k} = \left[a, \ldots, \frac{N}{k}, \ldots, b\right] \qquad (26)$$

In certain implementations, the end points for the neighborhoods may be given by:

$$a = \frac{1}{2}\left(\frac{N}{k+1} + \frac{N}{k}\right) - 1$$

and $$b = \frac{1}{2}\left(\frac{N}{k} + \frac{N}{k-1}\right) + 1$$

The upward or downward curvature of the ACF in the neighborhood of a candidate period is determined by computing a linear regression model for a sequence of points t between the endpoints of the neighborhood $NBH_{N/k}$. A split period within the search interval $R_{N/k}$ is obtained by minimizing a local approximation error for two line segments obtained from linear regression as follows:

$$t_{split} = \underset{P}{\operatorname{argmin}}(\text{error}(S(a, t)) + \text{error}(S(t+1, b))) \qquad (27)$$

where
t is point in the neighborhood $NBH_{N/k}$;
S(a, t) is a first line segment fit to points between point a and point t of the search interval $NBH_{N/k}$;
S(t+1, b) is a second line segment fit to points between point t+1 and point b of the search interval $NBH_{N/k}$;
error(S(a, t)) is the error between the S(a, t) and ACF values between point a and point t; and
error(S(t+1, b)) is the error between S(t+1, b) and ACF values between point t+1 and point b.

If the slopes of the first line segment $S(a, t_{split})$ and the second line segment $S(t_{split}+1, b)$ are correspondingly negative and positive, then the ACF value is in a concave-up region of the ACF and the corresponding period is discarded. If the slopes of the first line segment $S(a, t_{split})$ and second line segment $S(t_{split}+1, b)$ are correspondingly positive and negative, then the ACF value is in a concave-down region of the ACF and the corresponding candidate period is kept. Once a candidate period of a concave-down region has been identified, the local maximum ACF may be located at the end point of the first line segment $S(a, t_{split})$ or located at the start point of the second line segment $S(t_{split}+1, b)$. Alternatively, a hill-climbing technique, such as gradient ascent, is applied to determine the local maximum ACF of the concave-down region. The period that corresponds to the ACF local maximum is the principal period and is seasonal parameter used to forecast seasonal metric data over a forecast interval.

Figure 30C:
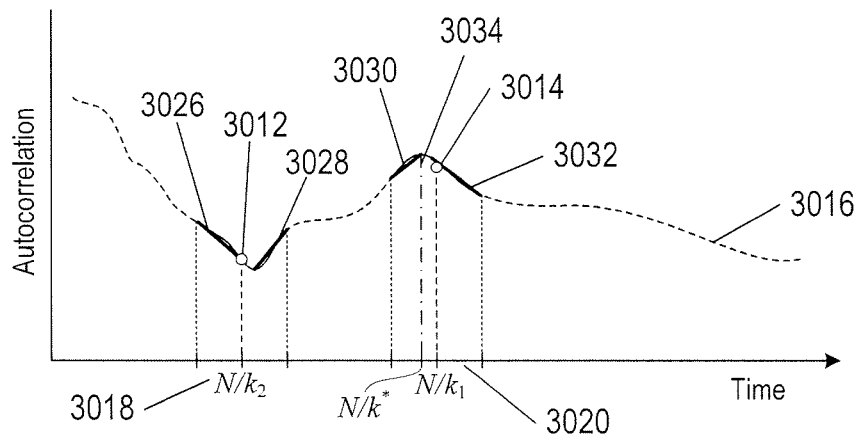
FIG. 30C shows examples of line segments computed from auto-correlation function values.

FIG. 30C shows examples of line segments computed from ACF values in the neighborhoods 3018 and 3020. First and second line segments 3026 and 3028 in the neighborhood 3018 have negative and positive slopes, respectively.

As a result, the candidate period $N/k_2$ is in a concave-up region of the ACF and is discarded. On the other hand, first and second line segments 3030 and 3032 in the neighborhood 3020 have positive and negative slopes, respectively. As a result, the candidate period $N/k_1$ is in a concave-down region of the ACF. The local maximum 3034 with principal period $N/k^*$ may be at the end of the first line segment or beginning of the second line segment or determined by applying a hill-climbing technique. The principal period is a seasonal parameter.

In other implementations, rather than checking each candidate period of the candidate frequencies that satisfy the condition in Equation (24) in neighborhoods of the ACF, only the candidate period that corresponds to the largest candidate frequency is checked using the ACF to determine if the candidate period is a principal period.

The principal frequency computed for each time interval as described above with reference to FIGS. 30B-30C is recorded in a principal frequency back-sliding circular buffer that maintains a fixed number of the most recently generated principal frequencies. A count for each principal frequency, denoted by $\text{Count}(f_i)$, where $f_i$ is the i-th principal frequency (i.e., $f_i=k_i/N$), is maintained. When a new principal frequency is computed for a most recent time window and added to the principal frequency circular buffer, the oldest principal frequency stored in the buffer is deleted. The count of the new principal frequency is incremented and the count of the principal frequency of the oldest principal frequency is decremented. The counts of the principal frequencies are rank ordered from largest to smallest. The principal frequency with the largest count that satisfies the following condition is the principal frequency and the corresponding principal period is used to forecast seasonal data:

$$\text{Count}_1(f_i) > N_f \times \text{Count}_2(f_j) \quad (28)$$

where $\text{Count}_1(f_i)$ is the largest count;

$\text{Count}_2(f_j)$ is the second largest count; and $N_f$ is threshold count factor (e.g., $N_f$ equals 2, 3, or 4).

The quantity $N_f \times \text{Count}_2(f_j)$ is called a principal frequency threshold. If the condition given by Equation (28) is not satisfied, then there is no seasonal pattern (i.e., no principal period) in the metric data.

Returning to FIG. 19, in block 1912 represents determining an appropriate performance model for forecasting metric data and detecting anomalous behavior in new metric data over a forecast interval. Let $\tilde{z}_{n+l}$ represent forecast metric values for lead times $t_{n+l}$ in a forecast interval with $l=1, \ldots, L$. The following three conditions are considered in computing a forecast model in block 1912. Depending on the stream of metric data, the forecast model may be a stochastic process model, pulse wave model, or a seasonal model:

(1) When the stream of metric data in the historical window is neither a pulse wave nor a seasonal stream, the stream is regarded as stochastic. In this case, metric data are forecast in block 1912 based on the stochastic process model with the smallest accumulated residual error as follows:

$$\tilde{z}_{n+l} = T_{n+l} + z_{n+l}^{(m)} \quad (29)$$

Figure 31A:
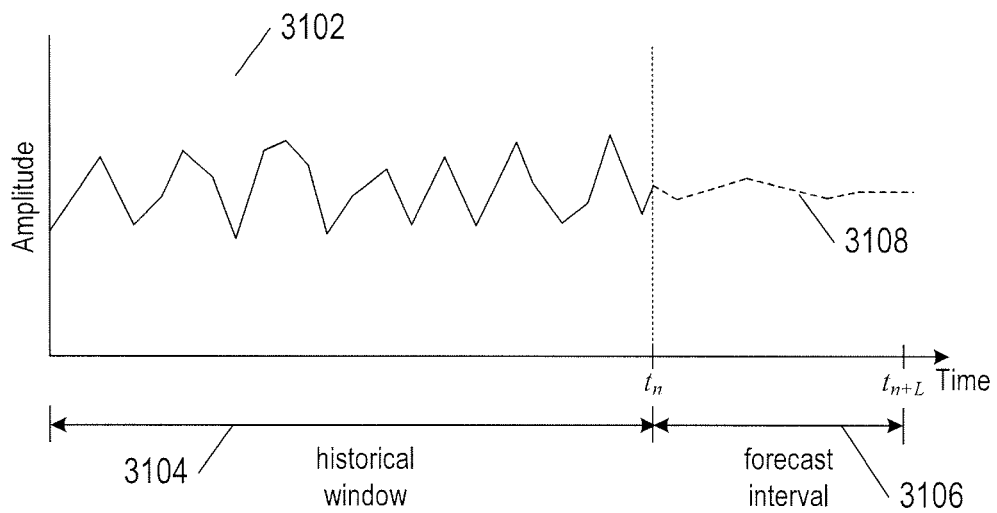
FIG. 31A shows a plot of example stochastic metric data and forecast metric data over a forecast interval.

FIG. 31A shows a plot of example stochastic metric data and forecast metric data over a forecast interval. Jagged curve 3102 represents a non-seasonal, non-pulse-wave sequence of metric data over historical window 3104. At time stamp $t_n$, a forecast is requested for a forecast interval 3106. The parameters of the stochastic process models are computed from the sequence of metric data in the historical window 3106 as described above. Jagged dashed-line curve 3108 represents forecast metric data computed using Equation (29) at lead times in the forecast interval 3106.

(2) When the stream of metric data in the historical window is characterized by a pulse wave, the pulse wave pattern is forecast in block 1912 using parameters of a back-sliding histogram determined as described above with reference to FIGS. 27A-27B:

$$\tilde{z}_{n+l} = T_{n+l} + a_{n+l} + S(A, pw, p) \quad (30)$$

where $$S(A, pw, p) = \begin{cases} A & t_s + mp \le t_{n+l} \le t_s + m(p+pw) \\ 0 & t_{n+l} < t_s + mp \text{ and } t_s + m(p+pw) < t_{n+l} \end{cases}$$

$$m = 1, 2, \ldots \text{ for } t_s + mp \le t_{n+L}.$$

Figure 31B:
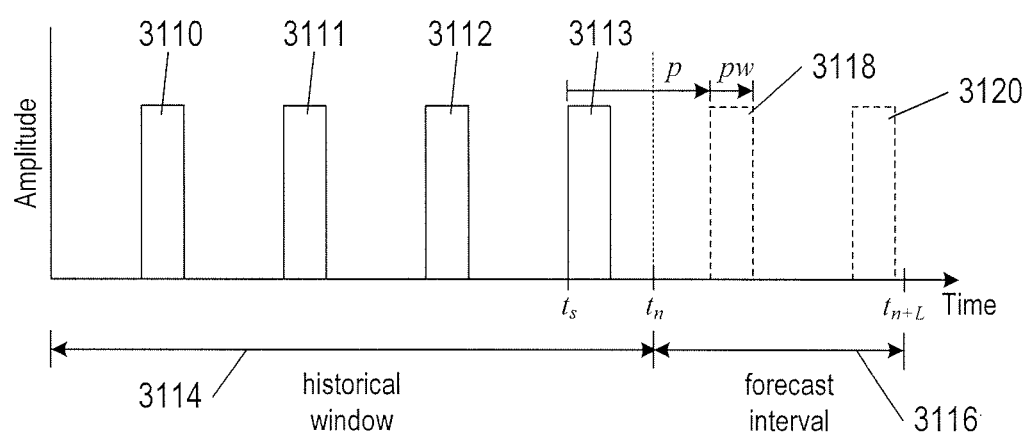
FIG. 31B shows a plot of example pulse-wave metric data and forecast metric data over a forecast interval.

FIG. 31B shows a plot of example trendy, pulse-wave metric data and forecast metric data over a forecast interval. Pulses 3110-3113 represent a sequence of pulse wave metric data over historical window 3114. At time stamp $t_n$, a forecast is requested for a forecast interval 3116. Upward edges of forecast pulses in the forecast interval 3114 are given by $(t_s+mp, A+T_{n+1}+a_{n+l})$ and downward edges of forecast pulses in the forecast model are given by $(t_s+m(p+pw), A+T_{n+l}+a_{n+l})$. Dashed-line pulses 3118 and 3120 represent two forecast pulses of metric data computed using Equation (30) over the forecast interval 3116.

(3) When the stream of metric data in the historical window is seasonal, metric data are forecast in block 1912 using a seasonal period model with principal period P as follows:

$$\tilde{z}_{n+l} = T_{n+l} + a_{n+l} + S_{(n+l) \bmod P} \quad (31)$$

where

P is the principal period (i.e., $P=N/k^*$); and $S_{(n+l) \bmod P} = z_{(n-P+l) \bmod P}$.

Figure 31C:
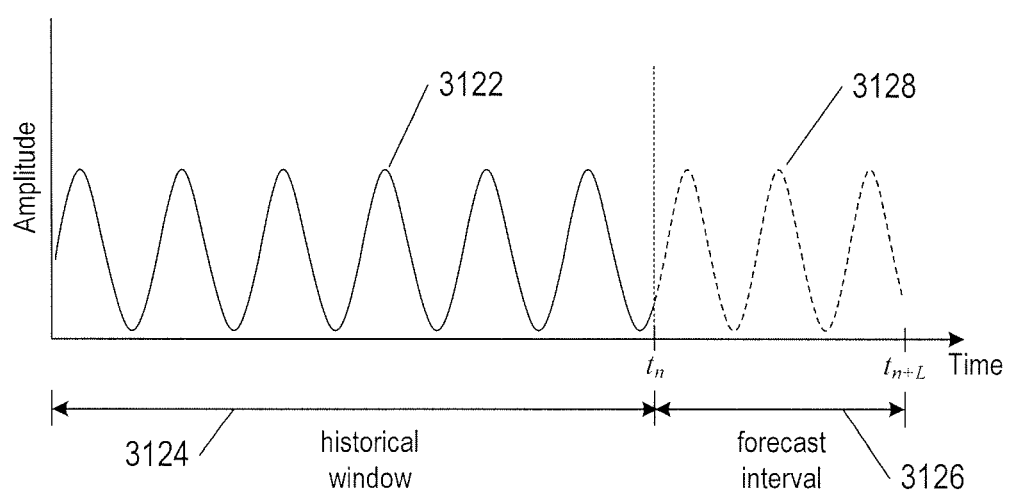
FIG. 31C shows a plot of example seasonal metric data and forecast metric data over a forecast interval.

FIG. 31C shows a plot of example seasonal metric data and forecast metric data over a forecast interval. Sinusoidal curve 3122 represents seasonal metric data over the historical window 3124. At time stamp $t_n$, a forecast is requested for a forecast interval 3126. The principal period of the seasonal periodic model is computed from the sequence of metric data in the historical window 3124 as described above with reference to FIGS. 29-30C. Dashed curve 3128 represents forecast metric data computed using Equation (31) over the forecast interval 3126.

Forecast Confidence Intervals Model

The forecast confidence intervals model 1704 in FIG. 17A is computed in block 1913 of FIG. 19. A forecast confidence intervals model comprises upper and lower confidence bounds centered on forecast metric values in a forecast interval. An upper confidence bound is given by $$uc_{n+l} = \tilde{z}_{n+l} + C\sigma(l) \quad (32a)$$

and a lower confidence bound is given by $$lc_{n+l} = \tilde{z}_{n+l} - C\sigma(l) \quad (32b)$$

where

C is a confidence interval coefficient; and $\sigma(l)$ is an estimated standard deviation of the l-th lead time in the forecast interval.

The upper and lower confidence bounds are limits of a confidence interval denoted by $[lc_{n+l}, uc_{n+l}]$ and centered on a forecast metric value $\tilde{z}_{n+l}$. The confidence interval coefficient C corresponds to a probability that a metric value in the forecast interval will lie in the confidence interval [$lc_{n+l}$, $uc_{n+l}$]. Examples of confidence interval coefficients are provided in the following table:

| Coefficient (C) | Percentage (%) |
|---|---|
| 2.58 | 99 |
| 1.96 | 95 |
| 1.64 | 90 |
| 1.44 | 85 |
| 1.28 | 80 |
| 0.67 | 50 |

For example, a 95% confidence gives a confidence interval [$\tilde{z}_{n+l}-1.96\sigma(l)$, $\tilde{z}_{n+l}+1.96\sigma(l)$]. In other words, there is a 95% chance that the n+l-th metric value will lie within the confidence interval.

When forecasting is executed using one of the stochastic models, as described above with reference to Equation (29), the estimated standard deviation $\sigma(l)$ in Equations (32a)-(32b) is given by:

$$\sigma(l) = \sqrt{\sigma_a^2 \sum_{j=1}^{l-1} \psi_j^2} \tag{33}$$

where the $\psi_j$'s are weights.

The estimated standard deviation of Equation (33) increases parabolically as the lead time index l increases. The weights $\psi_j$ in Equation (33) are recursively computed based on the autoregressive and moving-average weight parameters described above with reference to Equation (7a). When forecasting is executed using an AR model represented by Equation (13), the weights of Equation (33) are computed recursively using:

$$\psi_j = \sum_{i=1}^{p} \phi_i \psi_{j-i} \tag{34a}$$

where $\psi_0=1$.

When forecasting is executed using an ARMA model represented by Equation (7a), the weights of Equation (33) are computed recursively using:

$$\psi_j = \sum_{i=1}^{p} \phi_i \psi_{j-i} - \theta_j \tag{34b}$$

where $\theta_j=0$ for $j>q$.

When forecasting is executed using an ARIMA model represented by Equation (14), the weights of Equation (33) are computed recursively as follows:

$$\psi_j = \sum_{i=1}^{p+d} \phi_i \psi_{j-i} - \theta_j \tag{34c}$$

When forecasting is executed using one of the stochastic models, pulse wave model, or the seasonal period model, as described above with reference to Equations (29)-(31), the estimated standard deviation $\sigma(l)$ may be a residual standard deviation computed as follows:

$$\sigma(l) = \sigma = \sqrt{\frac{1}{n-1} \sum_{i=1}^{n} (\tilde{z}_n - z_n)^2} \tag{35}$$

where $\tilde{z}_n$ are forecast metric values computed using Equation (29) or (31) in the historical window. When a new metric value satisfies the condition $$lc_{n+l} \leq z_{n+l} \leq uc_{n+l} \tag{36}$$

the new metric value is normal. On the other hand, when a new metric value satisfies either of the conditions $$lc_{n+l} > z_{n+l} \tag{37a}$$

$$z_{n+l} > uc_{n+l} \tag{37b}$$

the new metric value is abnormal, which triggers an alert identifying the resource or object associated with the stream of metric data as exhibiting anomalous behavior.

Figure 32A:
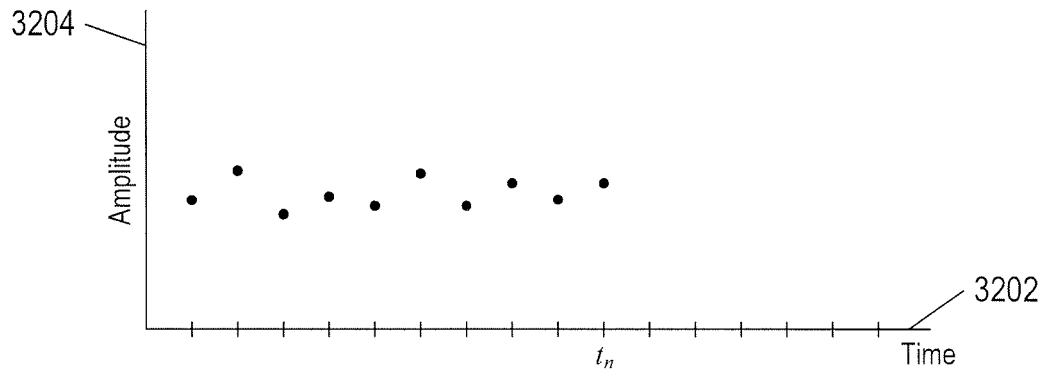
FIGS. 32A-32C show an example of a forecast confidence intervals model constructed for stochastic metric data.
Figure 32B:
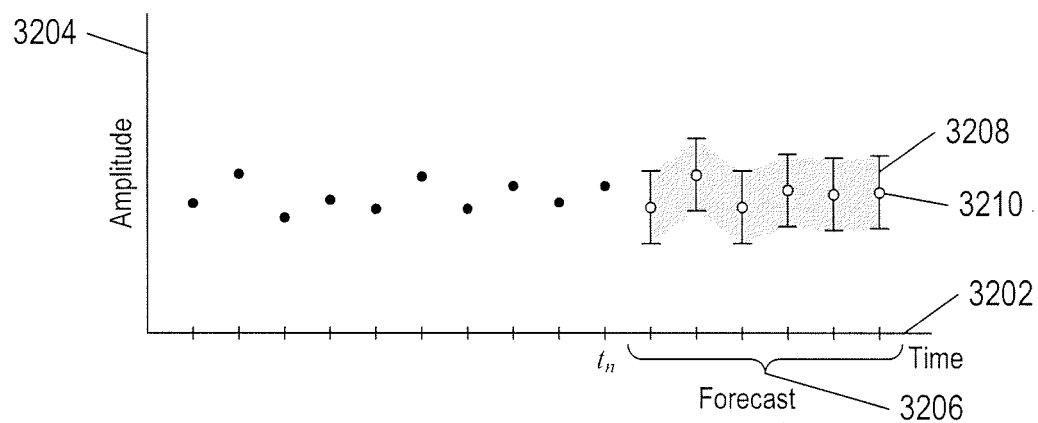
Figure 32C:
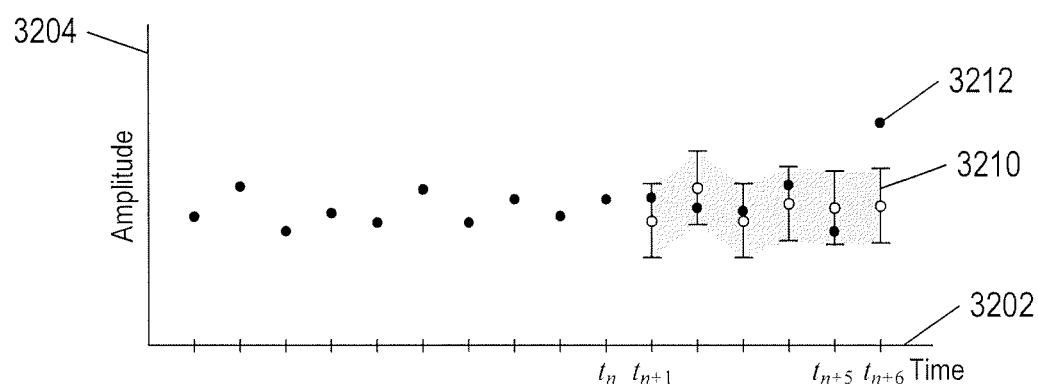

FIGS. 32A-32C show an example of a forecast confidence intervals model constructed for stochastic metric data. In FIGS. 32A-32C, horizontal axis 3202 is a time axis, vertical axis 3204 is a range of metric value, and solid dots represent metric values generated by a metric source. FIG. 32A shows a sequence of metric data in a historical window that ends at time stamp $t_n$. FIG. 32B shows forecast metric values represented by open dots computed in a forecast interval 3206 using one of the stochastic models described above. Confidence intervals are centered at each forecast metric value, such as confidence interval 3208 centered on forecast metric value 3210. In FIG. 32C, as new metric values with time stamps greater than time stamp $t_n$ are received and added to the sequence of metric data, each new metric value is compared to the upper and lower confidence bounds of the confidence interval to detect anomalous metric values. For example, metric values between time stamps $t_{n+1}$ and $t_{n+5}$ are within the confidence interval, but a metric value 3212 at time stamp $t_{n+6}$ is outside the confidence interval 3208, triggering an alert that identifies the resource or object associated with the stream of metric data as exhibiting anomalous behavior. The time stamp $t_{n+6}$ is identified as a point in time when anomalous behavior at the associated resource begins.

Figure 33A:
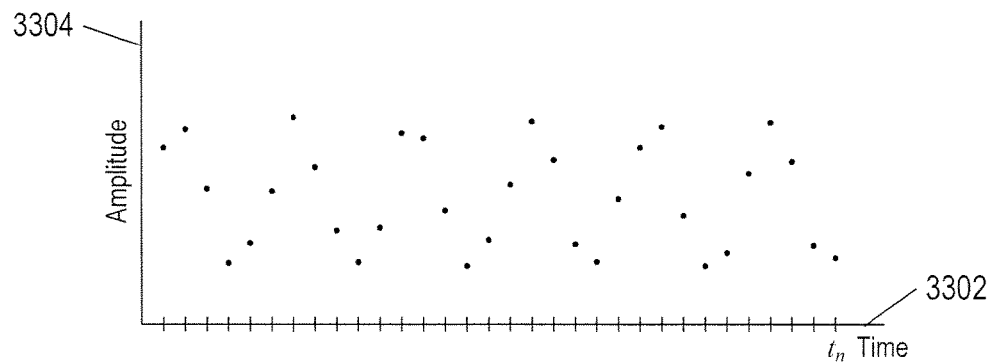
FIGS. 33A-33C show an example of a forecast confidence intervals model constructed for seasonal metric data.
Figure 33B:
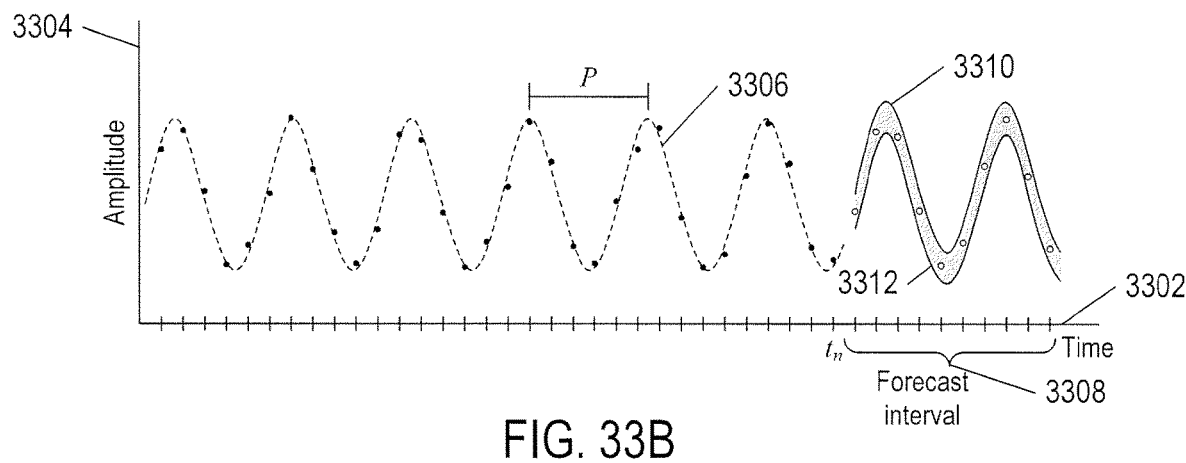
Figure 33C:
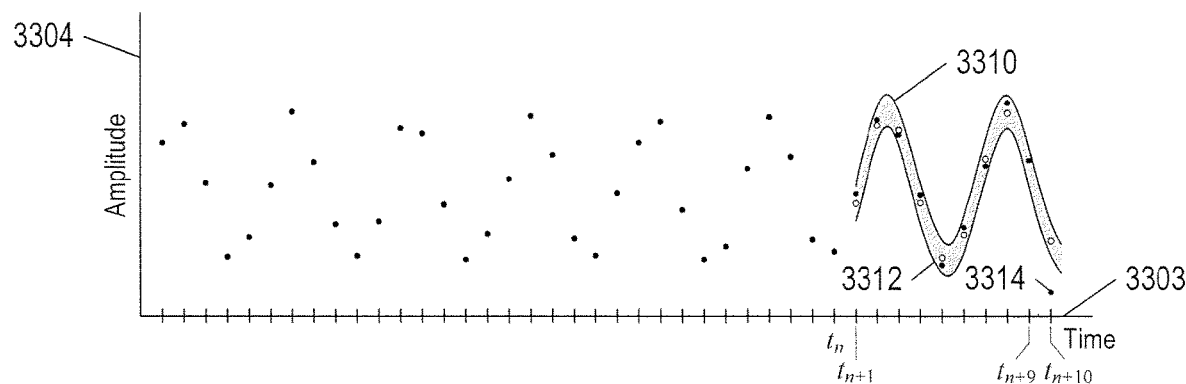

FIGS. 33A-33C show an example of a forecast confidence intervals model constructed for seasonal metric data. In FIGS. 33A-33C, horizontal axis 3302 is a time axis, vertical axis 3304 is a range of metric values, and solid dots represent metric values generated by a metric source. FIG. 33A shows a sequence of metric data in a historical window that ends at time stamp $t_n$. In FIG. 33B, dashed curve 3306 represents the sinusoidal behavior of the metric values with a principal period P. Forecast metric values represented by open dots are computed in a forecast interval 3308 for the seasonal model described above. Confidence intervals are centered at forecast metric values. For example, curves 3310 and 3312 represent upper and lower confidence bounds. In FIG. 33C, as new metric values with time stamps greater than time stamp $t_n$ are received and added to the sequence of metric data, each new metric value is compared with the upper and lower confidence bounds to detect anomalous metric values. For example, metric values between time stamps $t_{n+1}$ and $t_{n+9}$ are within the confidence intervals, but a metric value 3314 at time stamp $t_{n+10}$ is outside the lower bound 3312, triggering an alert that identifies the resource or object associate with the stream of metric data as exhibiting anomalous behavior. The time stamp $t_{n+10}$ is identified as a point in time when anomalous behavior at the associated resource begins.

Standard-Score Model

The standard-score model 1705 in FIG. 17A may be a measure of the number of standard deviations that a metric value of a stream of metric data is away from a mean value of related streams of metric data. The related streams of metric data may be associated with the same type of resource or object being observed or measured. For example, consider a number M of the same type of resource, such as CPU's of a cluster of server computers, memory of all the server computers of the distributed computing system, and the M resources of resource pool used by a VDC. The standard-score model is given by $$Z_{i,m} = \frac{|z_{i,m} - \mu_i|}{s_i} \quad (38a)$$

where $z_{i,m}$ is a metric value of a stream of metric data at time stamp $t_i$ for an m-th resource of the M related resources or objects;

$\mu_i$ is the mean of M metric values of the M streams of metric data at time stamp $t_i$:

$$\mu_i = \frac{1}{M} \sum_{m=1}^{M} z_{i,m}$$

and $s_i$ is the sample standard deviation of the M metric values of the M streams of metric data at the time stamp $t_i$:

$$s_i = \sqrt{\frac{1}{M-1} \sum_{m=1}^{M} (z_{i,m} - \mu_i)^2}$$

In one implementation, the standard-score model anomaly detector in block 1711 of FIG. 17A computes a standard-score threshold for detecting anomalous metric values given by $$Th_G = \frac{(M-1)}{M} \sqrt{\frac{(t_{\alpha/2M,M-2})^2}{M - 2 + (t_{\alpha/2M,M-2})^2}} \quad (38b)$$

where $t_{\alpha/2M,M-2}$ is the critical value of a t-distribution of the metric values of the M streams of metric data at the time stamp $t_i$ with M−2 degrees of freedom and a significance level of $\alpha/2M$.

The critical value of a t-distribution with M−2 degrees of freedom can be computed with a percent point function (i.e., inverse of cumulative distribution function) of the t-distribution. The t-distribution does not exist in closed form and is numerically approximated. When the standard-score model satisfies the condition, $Z_{i,m} > Th_G$, the $z_{i,m}$ metric value indicates anomalous behavior at the resource or object associated with the m-th stream metric data. When the standard-score model satisfies the $Z_{i,m} \leq Th_G$, the $z_{i,m}$ metric value indicates normal behavior at the resource or object. In another implementation, the standard-score model anomaly detector in block 1711 of FIG. 17A may be implemented using upper and lower bounds that are based on the standard-score threshold in Equation (39). An upper bound for each metric value of the M streams of metric data is given by:

$$ub_{i,m} = \mu_i + s_i Th_G \quad (38c)$$

and a lower bound is given by $$ul_{i,m} = \mu_i - s_i Th_G \quad (38d)$$

When the metric value, $z_{i,m}$, satisfies the condition, $ul_{i,m} \leq z_{i,m} \leq ub_{i,m}$, the metric value indicates normal behavior for the associated resource or object. When the metric value, $z_{i,m}$, satisfies $ul_{i,m} > z_{i,m}$ or $z_{i,m} > ub_{i,m}$, the metric value is abnormal, which triggers an alert identifying the resource or object associated with the stream of metric data as exhibiting anomalous behavior. The corresponding time stamp $t_i$ is identified as a point in time when anomalous behavior at the associated resource begins.

Figure 34:
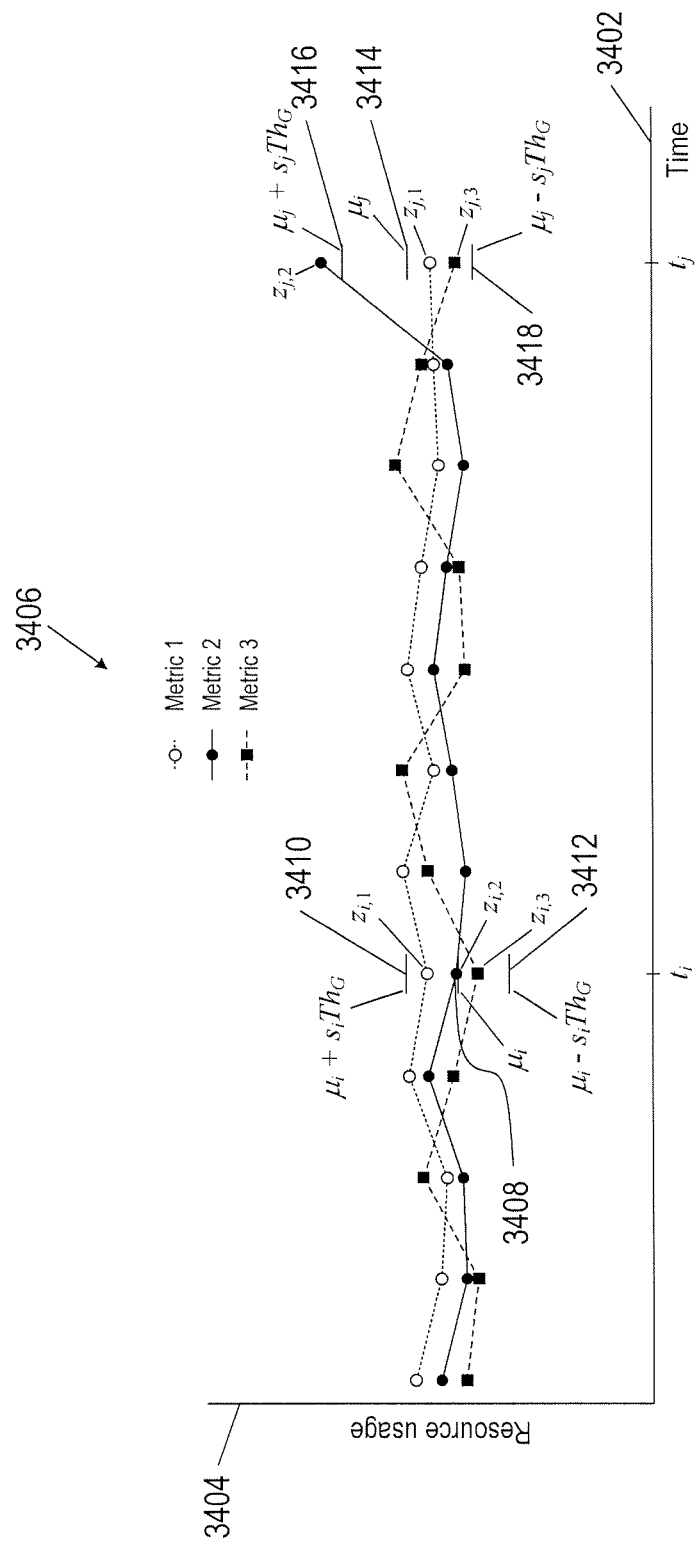
FIG. 34 shows a plot of three example streams of metric data for three related resources or objects.

FIG. 34 shows a plot of three example streams of metric data for three (i.e., M=3) related resources or objects. Horizontal axis 3402 is time. Vertical axis 3404 is a range of resource usage for the three resources. FIG. 34 includes a legend 3606 of line patterns and symbols used to identify the three streams of metric data. At time stamp $t_i$, line 3408 represents the mean $\mu_i$ of the metric values $z_{i,1}$, $z_{i,2}$, and $z_{i,3}$. The metric values $z_{i,1}$, $z_{i,2}$, and $z_{i,3}$ lie between upper and lower bounds represented by lines 3410 and 3412, respectively. At a later time stamp $t_j$, line 3414 represents the mean $\mu_j$ of the metric values $z_{j,1}$, $z_{j,2}$, and $z_{j,3}$. The metric values $z_{j,1}$ and $z_{j,3}$ lie between the upper and lower bounds represented by lines 3416 and 3418, respectively. However, the metric value $z_{j,2}$ is greater than the upper bound 3416, which triggers an alert indicating an anomaly in the stream of metric data and anomalous behavior as the associated resource or object. The corresponding time stamp $t_j$ is identified as a point in time when anomalous behavior at the associated resource associated with the metric 2 begins.

In another implementation, the standard-score model 1705 in FIG. 17A may be a measure of the number of standard deviations that a metric value of a stream of metric data is away from K most recently generated metric values of the stream of metric data. For each stream of metric data, the standard-score model based on the K most recently generated metric values in a stream of metric data is given by $$Z_n = \frac{|z_n - \mu|}{s} \quad (39a)$$

where $z_n$ is a metric value of the stream of metric data at time stamp $t_n$;

$\mu$ is the mean of the K most recently generated metric values in the stream of metric data:

$$\mu = \frac{1}{K} \sum_{i=1}^{K} z_{n-k+i}$$

and $s$ is the sample standard deviation of the K most recently generated metric values in the stream of metric data:

$$s = \sqrt{\frac{1}{K-1} \sum_{i=1}^{K} (z_{n-K+1} - \mu)^2}$$

In one implementation, the standard-score model anomaly detector in block 1711 of FIG. 17A uses a standard-score threshold for detecting anomalous metric values given by $$Th_G = \frac{(K-1)}{K} \sqrt{\frac{(t_{\alpha/2K,K-2})^2}{K-2+(t_{\alpha/2K,K-2})^2}} \qquad (39b)$$

where $t_{\alpha/2K,K-2}$ is the critical value of a t-distribution of the metric values of the stream of metric data at the time stamp $t_n$ with K−2 degrees of freedom and a significance level of α/2K.

The critical value of a t-distribution with K−2 degrees of freedom can be computed with a percent point function (i.e., inverse of cumulative distribution function) of the t-distribution. The t-distribution does not exist in closed form and is numerically approximated. When the standard-score model satisfies the condition, $Z_n > Th_G$, the $z_n$ metric value indicates anomalous behavior at the resource associated with the m-th stream of metric data. The time stamp $t_n$ is identified as a point in time when anomalous behavior at the associated resource begins. When the standard-score model satisfies the $Z_n \leq Th_G$, the $z_n$ metric value indicates normal behavior at the resource. In another implementation, the standard-score model anomaly detector in block 1711 of FIG. 17A may be implemented with using upper and lower bounds that are based on the standard-score threshold in Equation (39b). An upper bound for each metric value of the stream of metric data is given by:

$$ub_n = \mu + sTh_G \qquad (39c)$$

and a lower bound is given by $$ul_n = \mu - sTh_G \qquad (39d)$$

When the metric value, $z_n$, satisfies the condition, $ul_n \leq z_n \leq ub_n$, the metric value indicates normal behavior for the associated resource or object. When the metric value, $z_n$, satisfies $ul_n > z_n$ or $z_n > ub_n$, the metric value is abnormal, which triggers an alert identifying the resource or object as exhibiting anomalous behavior. The corresponding time stamp $t_n$ is identified as a point in time when anomalous behavior at the associated resource begins.

Distance Model

The distance model 1706 in FIG. 17A is a multivariate measure of how many standard deviations a point in a multidimension space is away from the mean of points in the space, where each point represents metric values with the same time stamp. The distance model may be used to detect anomalous behavior that may not necessarily be detectable in a single stream of metric data but appears as anomalous behavior in multiple related streams of metric data. Consider Q objects of a distributed computing system and P different resources of the Q objects. Let indices s1, s2, . . . , sP represent P streams of metric data associated with the P resources. The distance model 1706 is given by $$md(\vec{z}_{q,i}) = (\vec{z}_{q,i} - \vec{\mu}_i)^T S^{-1}(\vec{z}_{q,i} - \vec{\mu}_i) \qquad (40)$$

where $\vec{z}_{q,i} = (z_{q,i}^{s1}, z_{q,i}^{s2}, \ldots, z_{q,i}^{sP})^T$ represents a usage tuple formed from metric values of the P streams at a time stamp $t_i$ and the q-th object;

$\vec{\mu}_i = (\mu_i^{s1}, \mu_i^{s2}, \ldots, \mu_i^{sP})^T$ represents mean usage tuple of the P streams of the at the time stamp $t_i$ for the Q objects;

$S^{-1}$ is the inverse of a covariance matrix formed from the usage tuples; and superscript T denotes the matrix transpose operator.

The usage tuple, $\vec{z}_{q,i}$, and the mean usage tuple, $\vec{\mu}_i$, are points in a P-dimensional resource space of resources used by the Q objects. Each element of the mean usage tuple is computed for each stream (i.e., for p=1, 2, . . . , P) and over the number of objects as follows:

$$\mu_i^{sp} = \frac{1}{Q} \sum_{q=1}^{Q} z_{q,i}^{sp} \qquad (41)$$

For example, the objects may be ten (i.e., Q=10) VMs that form a VDC running in a distributed computing system or a cluster of ten server computers used to run a distributed application. Suppose CPU usage, memory usage, network usage, and data storage are the resources that have been selected for monitoring the behavior of the ten objects over time. Usage of the four resources by each object is represented by a four-tuple, $\vec{z}_{q,i} = (z_{q,i}^{cpu}, z_{q,i}^{mem}, z_{q,i}^{net}, z_{q,i}^{ds})^T$, with q=1, 2, . . . , 10, where $z_{q,i}^{cpu}$ is CPU usage, $z_{q,i}^{mem}$ is memory usage, $z_{q,i}^{net}$ is network usage, and $z_{q,i}^{ds}$ is data storage by the q-th resource at the time stamp $t_i$.

The distance model measures distance from a usage tuple relative to the mean usage tuple in a P-dimensional resource space. The mean usage tuple is a point in the resource space where the mean usage of the metric values at the time stamp $t_i$ intersect. The larger the value of the distance model, md($\vec{z}_{q,i}$), the farther away the usage tuple, $\vec{z}_{q,i}$, is from the mean usage tuple $\vec{\mu}_i$. Anomalous behavior is detected by the distance model anomaly detector 1712 in FIG. 17A when the distance model of Equation (40) is greater than a distance-model threshold as represented by the following condition:

$$md(\vec{z}_{q,i}) \geq Th_D \qquad (42)$$

where $Th_D$ is the distance-model threshold.

The distance-model threshold is a hyper-dimensional parameter that is tuned for different use cases. For streams of metric data with metric values distributed according to a normal distribution, the distance-model threshold may be estimated using a chi-squared distribution with a degree of freedom equal to the number of streams of metric data. However, in many cases, streams of metric data do not follow a normal distribution. The distance-model threshold is a hyper-dimensional parameter that is tuned over time for different use cases. When anomalous behavior is detected by a violation of Equation (42), an alert identifying the resources associated with the q-th object are identified as exhibiting anomalous behavior. The corresponding time stamp $t_i$ is identified as a point in time when anomalous behavior at the associated resources begins.

Figure 35A:
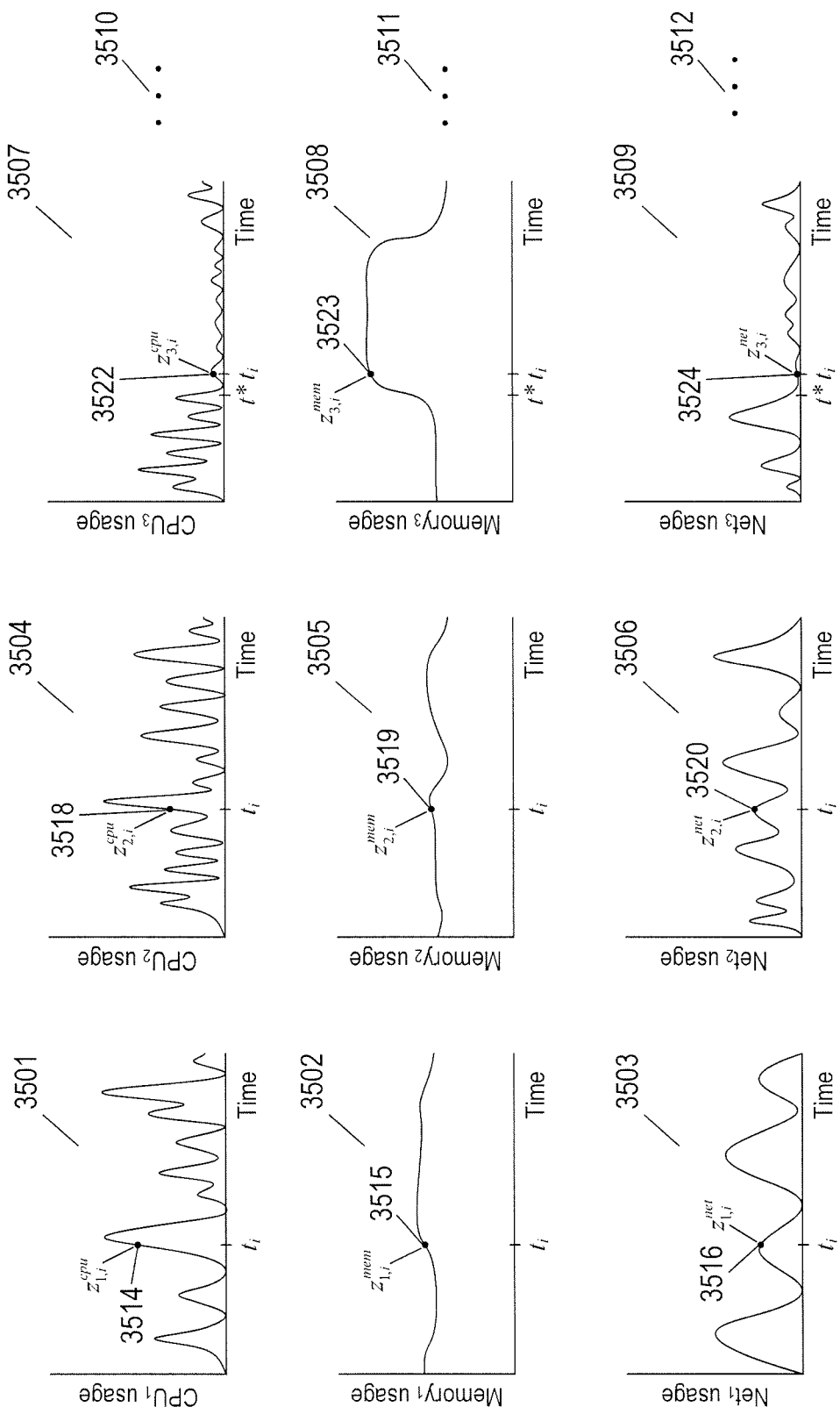
FIG. 35A shows separate plots of CPU usage, memory usage, and network usage.

FIG. 35A shows separate plots of CPU usage, memory usage, and network usage for three of 50 objects of a distributed computing system. Plots 3501-3503 show CPU usage, memory usage, and network usage for a first object. Plots 3504-3506 show CPU usage, memory usage, and network usage for a second object. Plots 3507-3509 show CPU usage, memory usage, and network usage for a third object. Ellipses 3510-3512 represent CPU usage, memory usage, and network usage for the 47 remaining objects not shown. The plots reveal that CPU, memory, and network usage for the first and second objects appear correlated but are not correlated with the CPU, memory, and network usage for the third object. For example, at about time stamp t*, the CPU and network usage in plots 3507 and 3509 decrease to nearly zero while memory usage in plot 3508 increases and remains high for a period of time. This behavior is not exhibited by corresponding plots of the first and second objects. Usage tuples of the distance model are created from points with the same time stamp for each object. For example, points 3514-3516 form elements of a usage tuple, $\vec{z}_{1,i} = (z_{1,i}^{cpu}, z_{1,i}^{mem}, z_{1,i}^{net})^T$, for the first object at the time stamp $t_i$. Points 3518-3520 form elements of a usage tuple, $\vec{z}_{2,i} = (z_{2,i}^{cpu}, z_{2,i}^{mem}, z_{2,i}^{net})^T$, for the second object at the time stamp $t_i$. Points 3522-3524 form elements of a usage tuple, $\vec{z}_{3,i} = (z_{3,i}^{cpu}, z_{3,i}^{mem}, z_{3,i}^{net})^T$, for the third object at the time stamp $t_i$.

Figures 35B, 36:
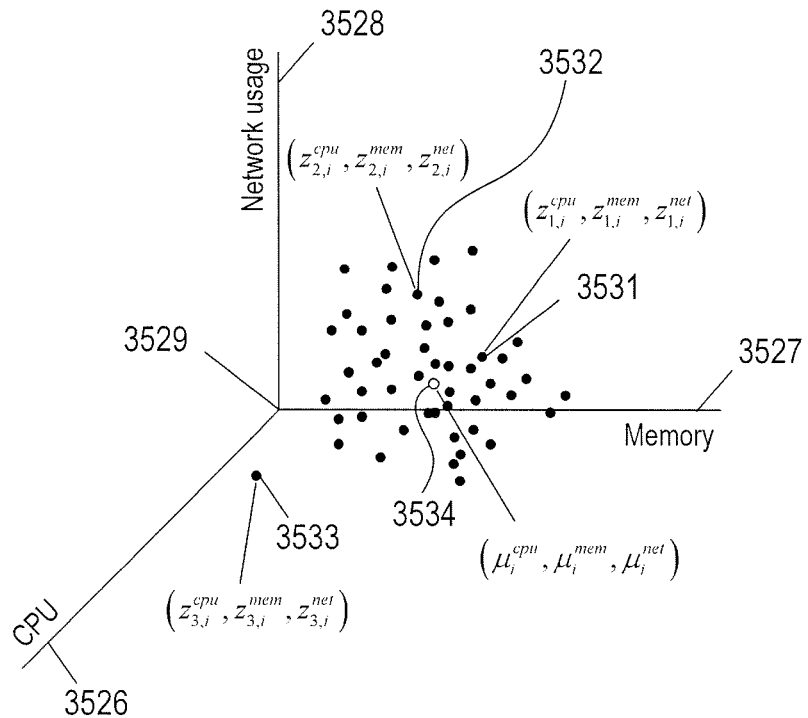
FIG. 35B shows a plot of usage three-tuples for objects at the same time stamp.
FIG. 36 shows an example of a covariance matrix.

FIG. 35B shows a plot of usage tuples for the 50 objects at the same time stamp $t_i$. Axis 3526 represents a range of CPU usage. Axis 3527 represents a range of memory usage. Axis 3528 represents a range of network usage. The axes 3526-3528 intersect at the origin of a three-dimensional resource space for CPU, memory, and network usage. Solid dots represent the CPU, memory, and network usage for the 50 objects at the time stamp $t_i$. For example, points 3531-3533 represent the usage tuples $\vec{z}_{1,i}$, $\vec{z}_{2,i}$, and $\vec{z}_{3,i}$ represented in FIG. 35A. Open dot 3534 represents the mean-usage tuple $\vec{\mu}_i$ at the time stamp $t_i$. Note that 49 usage tuples are clustered around the mean-usage tuple 3534 while the usage tuple $\vec{z}_{3,i}$ is located away from the cluster. When the distance model $md(\vec{z}_{3,i}) \geq Th_D$, the corresponding time stamp $t_i$ is identified as a point in time when the resources associated with the object exhibit anomalous behavior.

The distance model in Equation (40) is in the form of the Mahalanobis distance. The inverse covariance matrix $S^{-1}$ rescales the distance by removing correlation between the usage P-tuples and the mean-usage tuples. In other words, the distance model is unitless and scale invariant.

FIG. 36 shows an example of a covariance matrix S for P streams of metric data. The covariance matrix is a symmetric matrix. For each time stamp $t_i$, elements of the covariance matrix are computed according to:

$$cov(sj, sk) = \frac{1}{Q} \sum_{q=1}^{Q} (x_{q,i}^{sj} - \mu_i^{sj})(x_{q,i}^{sk} - \mu_i^{sk})$$

where j=1, 2, . . . , P and k=1, 2, . . . , P.

The mean-usage tuple $\vec{\mu}_i$ and the inverses covariance matrix $S^{-1}$ may be estimated for streaming metric data. The inverse covariance matrix may be updated by using a running sum of accumulators. The inverse covariance matrix $S^{-1}$ in Equation (40) may be replaced by the Moore-Penrose inverse to obtain an approximate inverse covariance matrix given by:

$$S^+ = S^T(SS^T)^{-1}$$

The Sherman-Morrison formula may be applied to the approximate inverse covariance matrix in order to accommodate real time processing of streaming metric data.

Principal-Frequency Model

The stochastic models, standard-score model, and distance model are used to detect changes that relate to how one or more streams of metric data vary in magnitude over time. However, certain streams oscillate back and forth between high and low metric values over time in a substantially rhythmic manner, which may be an indication of regular predictable and normal behavior or use of a resource or object. However, a sudden increase or decrease in the frequency of oscillation in metric values of a stream of metric data (i.e., change in oscillation frequency) may be an indication of anomalous behavior at a resource or object. The principal-frequency model 1707 in FIG. 17A gives the principal frequency of a seasonal stream of metric data that is being monitored to detect changes in the frequency of oscillation.

Figure 37:
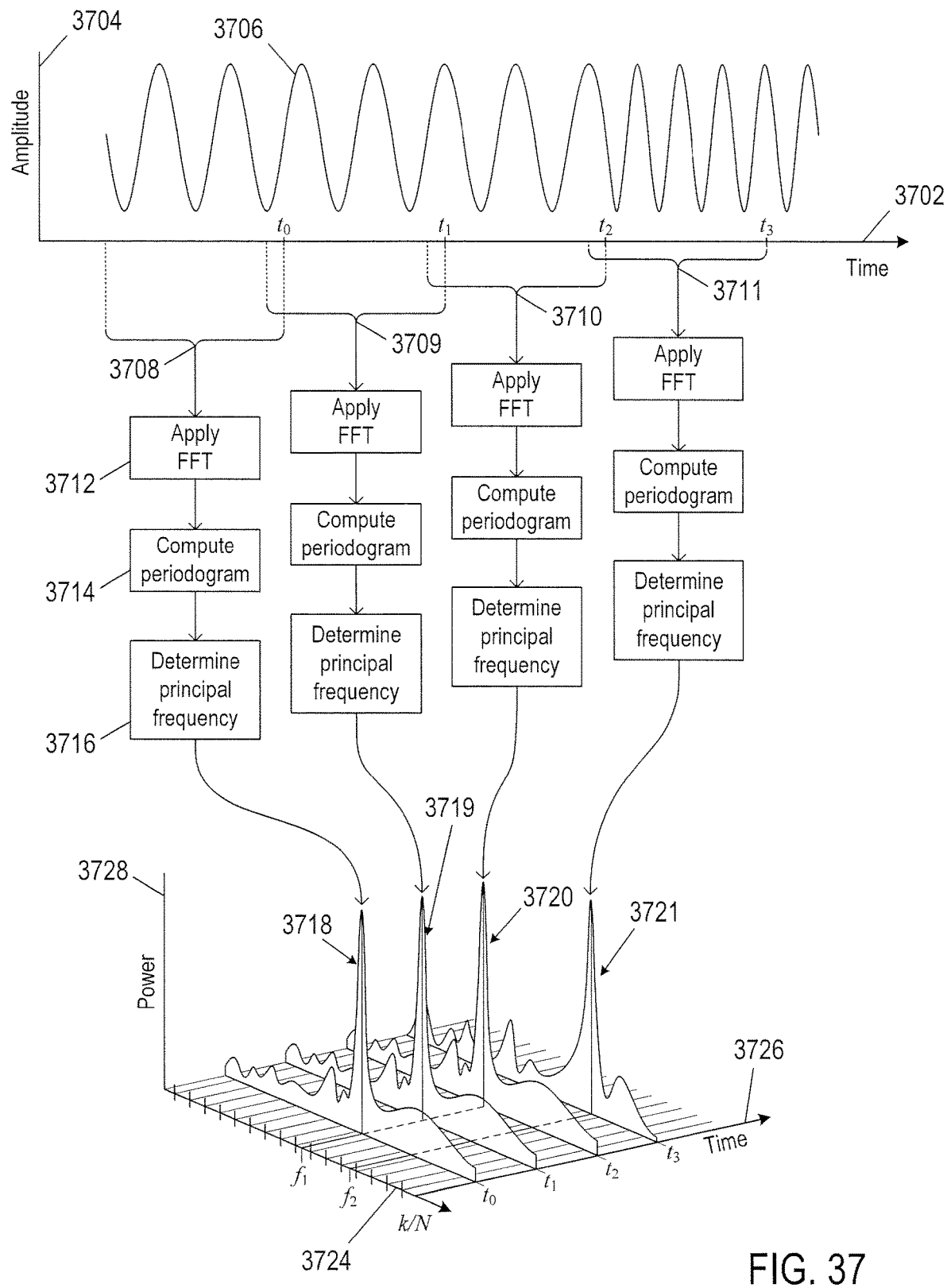
FIG. 37 shows an example of determining a principal frequency in time windows applied to a seasonal stream of metric data.

FIG. 37 shows an example of determining the principal frequency in time windows applied to a seasonal stream of metric data. Horizontal axis 3702 represents time. Vertical axis 3704 represents a range of metric values. Oscillating curve 3706 represents an oscillation in the stream of metric data. Brackets 3708-3711 represent a moving overlapping time window applied to the stream of metric data. For each advance of the time window, an FFT is applied to the new metric values in the latest time window followed by computation of a periodogram and determination of the principal frequency. For example, time window 3708 contains a subsequence of the stream of metric values up to a current time $t_0$. An FFT 3712 is applied to the subsequence followed by computation of a periodogram 3714, as described above with reference to FIG. 29. The principal frequency for metric values in the time window are determined as described above with reference to FIGS. 30A-30C. For new metric values received in subsequent time windows ending at times $t_1$, $t_2$, and $t_3$, the FFT is applied to the metric values in each time window followed by computation of a periodogram and determination of a principal frequency. FIG. 37 shows example plots of periodograms 3718-3721 obtained for each of the corresponding time windows 3708-3711. Axis 3724 represents a range of frequencies. Axis 3726 represents time windows. Axis 3728 represents a range of power. The periodograms 3718-3720 have maximum PSD at a first frequency $f_1$, which is the principal frequency of the stream of metric data in each of the time windows 3708-3710 up to a time $t_2$. However, the stream of metric data 3706 oscillates with a higher frequency after the time $t_2$. As a result, the periodogram 3721 has a maximum PSD at a second frequency $f_2$, which is the principal frequency of the stream of metric data received in the time window 3711 after the time $t_2$.

The principal-frequency model anomaly detector 1713 in FIG. 17a compares the principal frequency of new metric values in a current time window to the principal frequency of metric values in a previous time window. In one implementation, an alert is generated indicating anomalous behavior is observed in the resource or object associated with the stream of metric data, when the following condition is satisfied $$|f_{cur} - f_{prev}| > Th_F \quad (43)$$

where $f_{cur}$ is the principal frequency in a current time window;
$f_{prev}$ is the principal frequency in a previous time window; and
$Th_F$ is a principal frequency threshold.

The corresponding time stamp at the beginning of the current time window is identified as a point in time when anomalous behavior at the associated resources begins.

The methods described below with reference to FIGS. 38-52 are stored in one or more data-storage devices as machine-readable instructions that when executed by one or more processors of the computer system shown in FIG. 1 detect anomalous behavior in a distributed computing system.

Figure 38:
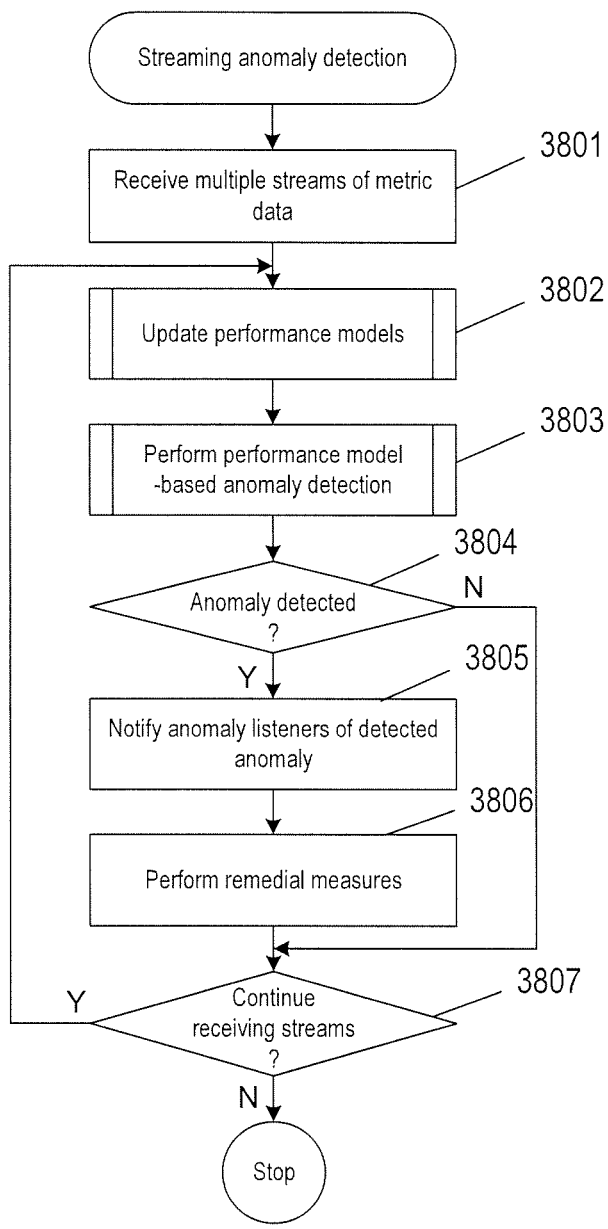
FIG. 38 shows a flow diagram illustrating an example implementation of "streaming metric data anomaly detection."

FIG. 38 shows a flow diagram illustrating an example implementation of "streaming anomaly detection." In block 3801, multiple streams of metric data are received. In block 3802, an "update performance models" procedure is performed. In block 3803, a "perform performance model-based anomaly detection" is performed. In decision block 3804, when anomalous behavior is detected in block 3803, control flows to block 3805. In block 3805, anomaly listeners are notified of the detected anomalous behavior. In block 3806, remedial measures are executed to correct the anomalous behavior. In decision block 3807, the operations represented by blocks 3802-3806 as metric data is received.

Figure 39:
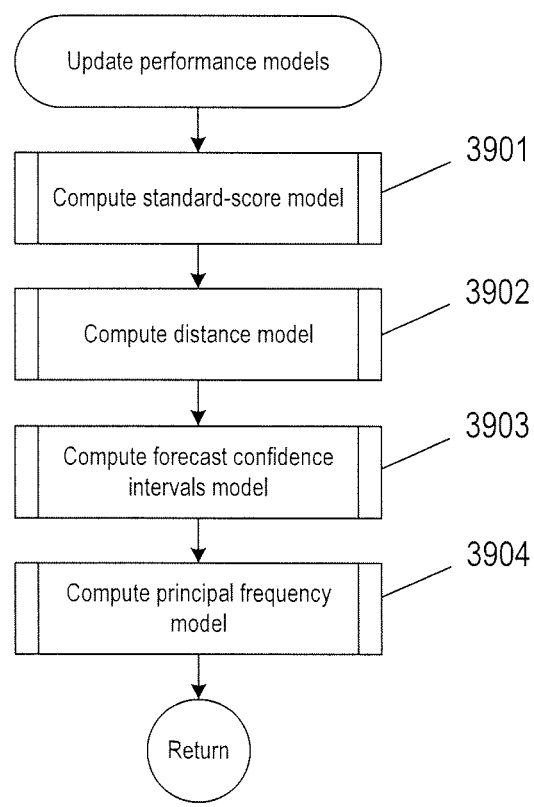
FIG. 39 shows a flow diagram illustrating an example implementation of the "update performance models" step referred to in FIG. 38.

FIG. 39 shows a flow diagram illustrating an example implementation of the "update performance models" step 3802 of FIG. 38. In block 3901, a "compute standard-score model" procedure is performed. In block 3902, a "compute distance model" procedure is performed. In block 3903, a "compute forecast confidence intervals models" procedure is performed. In block 3904, a "compute principal frequency model" procedure is performed.

Figure 40:
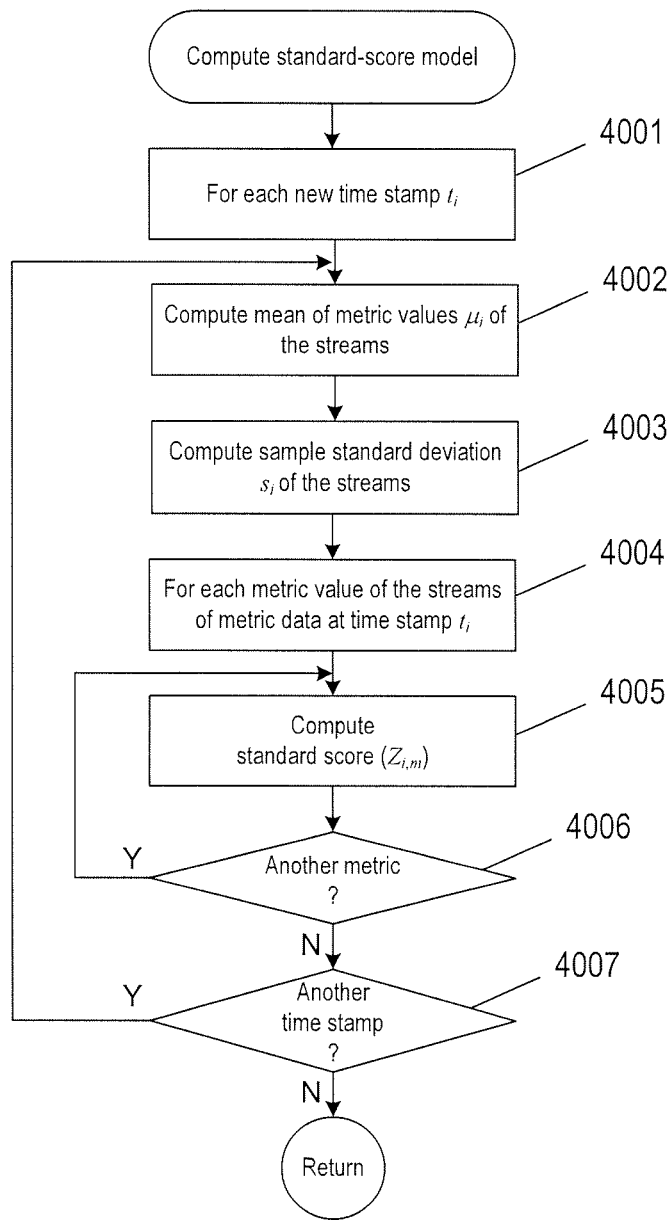
FIG. 40 shows a flow diagram illustrating an example implementation of the "compute standard-score model" step referred to in FIG. 39.

FIG. 40 shows a flow diagram illustrating an example implementation of the "compute standard-score model" step 3901 of FIG. 39. A loop beginning with block 4001 repeats the computational operations represented by blocks 4002-4007 for each new time stamp $t_i$. In block 4002, the mean of metric values at the time stamp $t_i$ is computed for M streams of metric data as described above with reference to Equation (38a). In block 4003, the sample standard deviation of metric values at the time stamp $t_i$ is computed for the M streams of metric data as described above with reference to Equation (38a). A loop beginning with block 4004 repeats the computational operations represented by blocks 4005-4006 for each metric value of the M streams of metric data at the time stamp $t_i$. In block 4005, the standard-score model is computed for the metric value as described above with reference to Equation (38a). In decision block 4006, operations represented by block 4005 are repeated for another metric. In decision block 4007, operations represented by blocks 4002-4009 are repeated for a next new time stamp.

Figure 41:
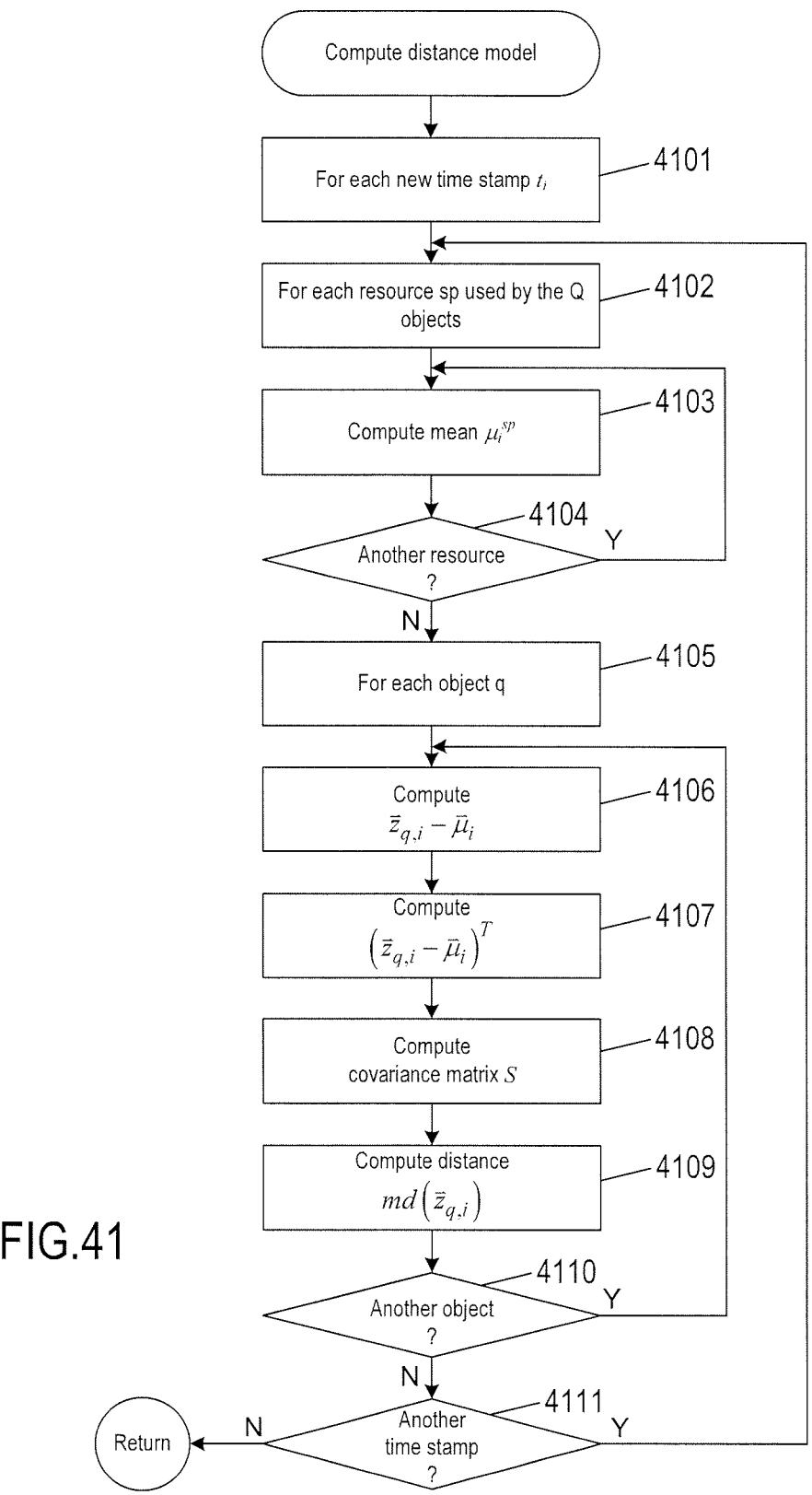
FIG. 41 shows a flow diagram illustrating an example implementation of the "compute distance model" step referred to FIG. 39.

FIG. 41 shows a flow diagram illustrating an example implementation of the "compute distance model" step 3902 of FIG. 39. A loop beginning with block 4101 repeats the computational operations represented by blocks 4102-4113 for each new time stamp $t_i$. A loop beginning with block 4102 repeats the computational operation represented by block 4103 for each stream of metric data associate with a resource. In block 4103, mean usage of a resource is computed for an element of the mean usage P-tuple. In decision block 4104, the computational operation represented by block 4103 is repeated for another resource. A loop beginning with block 4105 repeats the computational operation represented by blocks 4106-4110 for each object. In block 4106, the difference between the usage P-tuple formed from metric values of the P streams and the mean usage P-tuple obtained in blocks 4102-4104 is computed. In block 4107, the difference computed in block 4106 is transposed. In block 4108, a covariance matrix S is computed as described above with reference to FIG. 36. In block 4109, the distance is computed is computed as described above with reference to Equation (40). In decision block 4110, the computational operations represented by blocks 4106-4109 are repeated for another object. In decision block 4111, the computational operations represented by blocks 4102-4110 are repeated for another time stamp.

Figure 42:
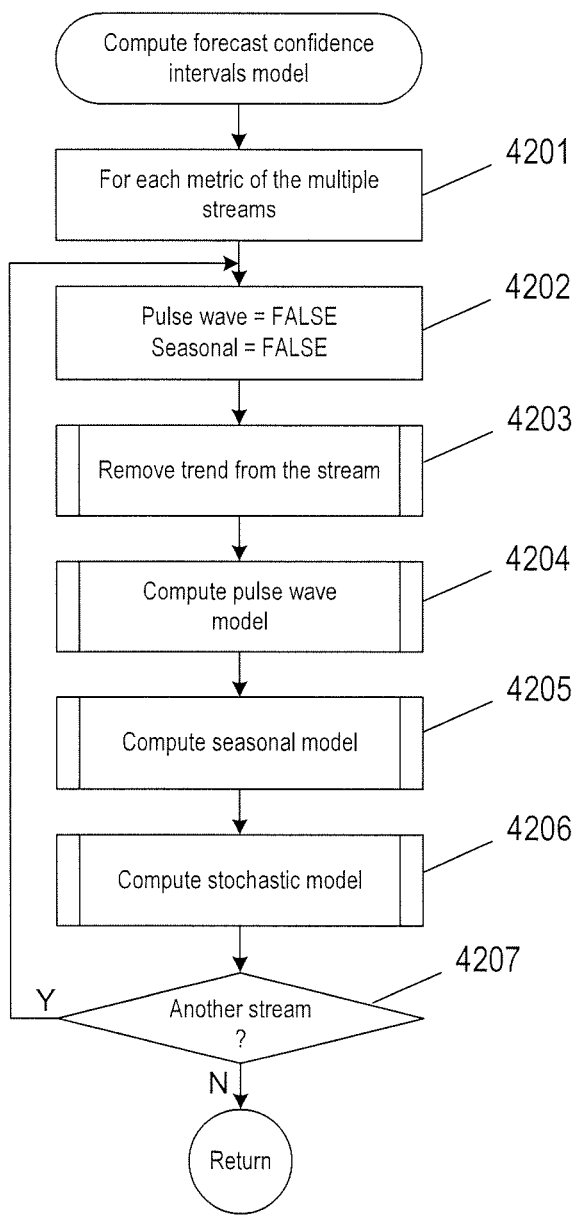
FIG. 42 shows a flow diagram illustrating an example implementation of the "compute forecast confidence intervals model" step referred to in FIG. 39.

FIG. 42 shows a flow diagram illustrating an example implementation of the "compute forecast confidence intervals model" step 3903 of FIG. 39. A loop beginning with block 4201 repeats the computational operations represented by blocks 4202-4208 each metric of the multiple streams of metric data. In block 4202, logical variables "Pulse wave" and "Seasonal" are set to FALSE. In block 4203, a "remove trend from the stream" procedure is performed. In block 4204, a "compute pulse wave model" procedure is performed. In block 4205, a "compute seasonal model" procedure is performed. In block 4206, a "compute stochastic model" procedure is performed. In decision block 4207, the computational operations represented by blocks 4202-4206 are repeated for another stream of metric data.

Figure 43:
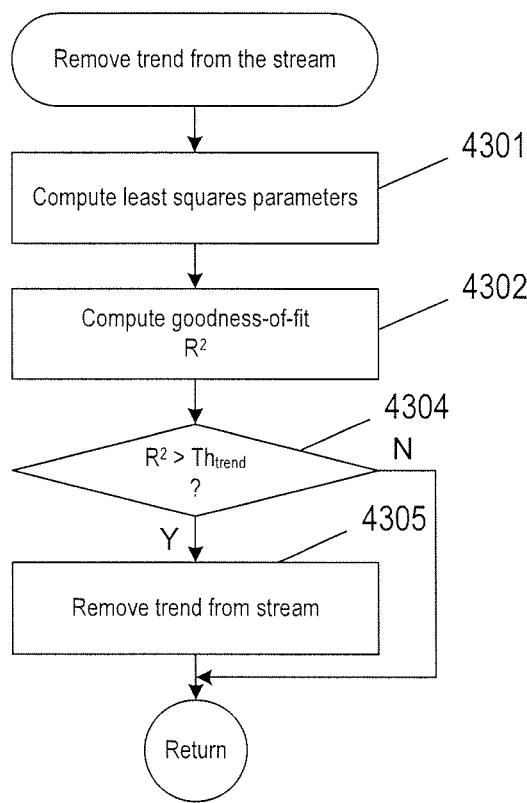
FIG. 43 shows a flow diagram illustrating an example implementation of the "remove trend from the stream" step referred to in FIG. 42.

FIG. 43 shows a flow diagram illustrating an example implementation of the "remove trend from the stream" step 4202 of FIG. 42. In block 4301, least squares parameters for the sequence of metric data in the historical window, as described above with reference to Equations (3c) and (3d). In block 4302, a goodness-of-fit parameter is computed as described above with reference to Equation (4). In decision block 4303, when the goodness-of-parameter is greater than a threshold, control flows to block 4304. In block 4304, a trend computed using the least squares parameters is subtracted from the metric data in the historical window, as described above with reference to Equation (5) and FIGS. 20B and 20C.

Figure 44:
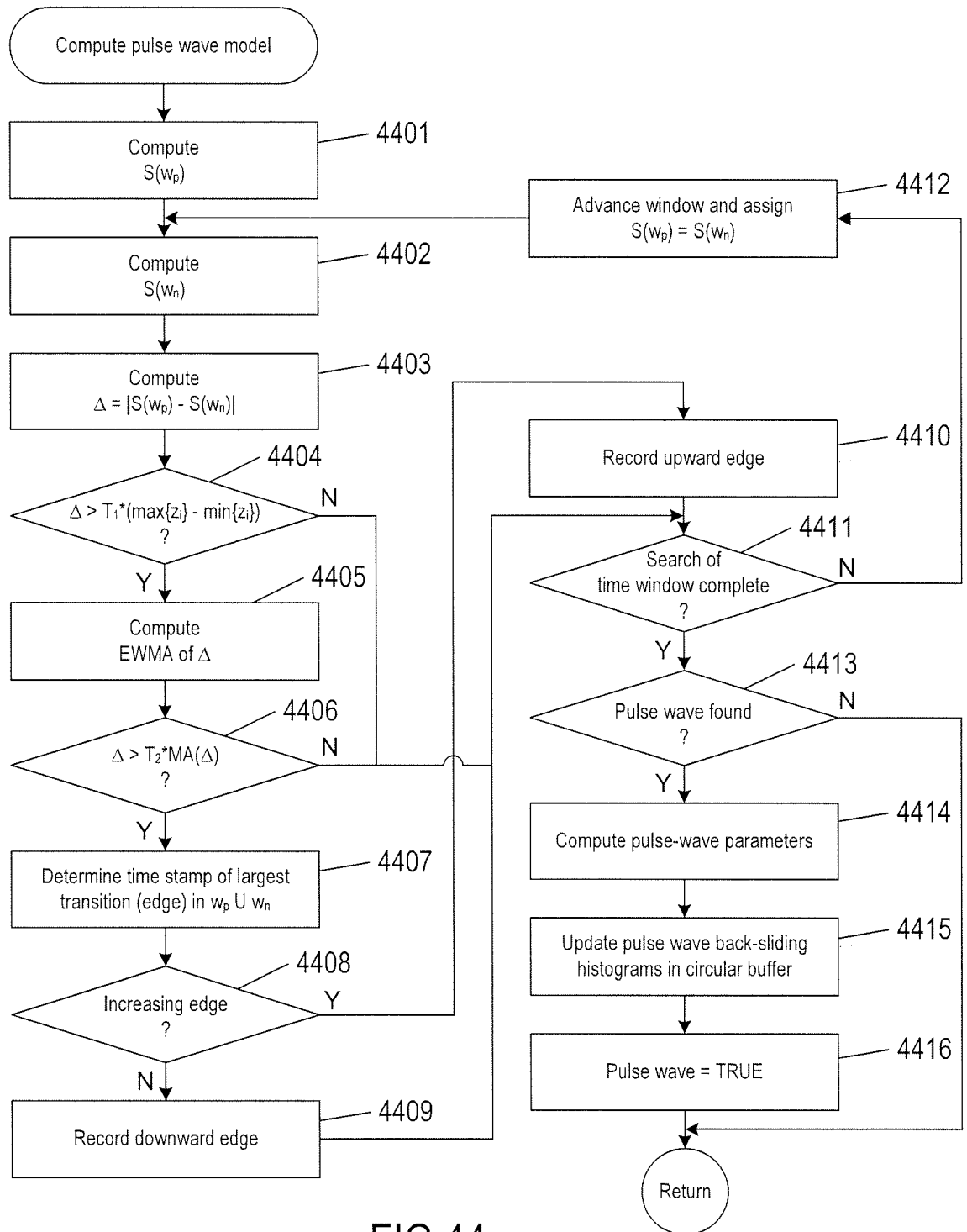
FIG. 44 shows a flow diagram illustrating an example implementation of the "compute pulse wave model" step referred to in FIG. 42.

FIG. 44 shows a flow diagram illustrating an example implementation of the "compute pulse wave model" step 4203 of FIG. 42. In block 4401, an average of metric data values in a previous time window is computed as described above with reference to Equation (16a). In block 4402, an average of metric data values in a previous time window is computed as described above with reference to Equation (16b). In block 4403, a change parameter is computed based on an absolute difference between the averages of metric data values as described above with reference to Equation (17). In decision block 4404, when the change parameter is greater than a maximum amplitude range threshold computed as described above with reference to Equation (18a), control flows to block 4405. Otherwise, control flows to decision block 4411. In block 4405, an EWMA of change parameters is computed with the change parameter computed in block 4403 as the most recent change parameter. In decision block 4406, when the change parameter is greater than an EWMA threshold as described above with reference to Equation (18b), control flows to block 4407. Otherwise, control flows to decision block 4411. In block 4407, a largest absolute difference between consecutive pairs of metric data values is determined for metric data values in a time interval formed from the previous and next time windows as described above with reference to Equation (19). In block 4408, when the metric data values of the largest absolute difference between consecutive metric data values is increasing (i.e., $z_{i+1} - z_i > 0$), the edge is an upward edge and control flows to block 4410. Otherwise, the largest absolute difference between consecutive metric data values is decreasing (i.e., $z_{i+1} - z_i < 0$), control flows to block 4409. In block 4409, a downward edge is recorded for time $t_i$. In block 4410, an upward edge is recorded for time $t_{i+1}$. In decision block 4411, when the duration of the time window of the historical window is complete control flows to decision block 4412. Otherwise, control flows to block 4413. In block 4412, the previous and next time windows are advanced as described above with reference to FIG. 26A and the average of metric data values in the next time window assigned to the average of metric data values of the previous time window. In decision block 4413, when upward and/or downward edges have been identified as described above with reference to blocks 4408-4410, control flows to block 4414. In block 4414, pulse width and period of a pulse wave are computed as described above with reference to FIG. 27A. In block 4415, pulse wave back-sliding histograms of pulse width and period are updated as described above with reference to FIG. 27B. In block 4416, "Pulse wave" is set to TRUE.

Figure 45:
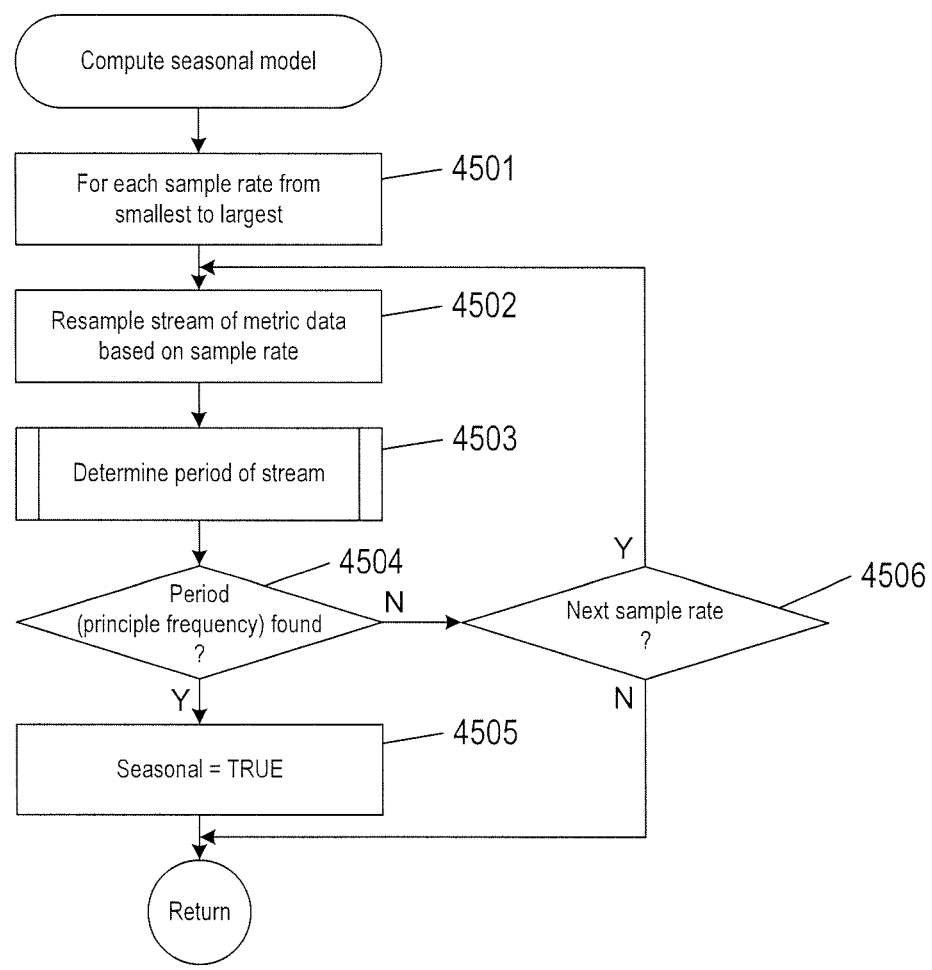
FIG. 45 shows a flow diagram illustrating an example implementation of the "compute seasonal model" step referred to in FIG. 42.

FIG. 45 shows a flow diagram illustrating an example implementation of the "compute seasonal model" step 4205 of FIG. 42. A loop beginning with block 4501 repeats the computational operations represented by blocks 4502-4506 for different sampling rates as described above with reference to FIG. 28. In block 4502, metric data in the historical window is resampled according to the sample rate as described above with reference to FIG. 29. In block 4503, a routine "determine period of stream" is called to determine the period of the metric data in the time window. In decision block 4504, when a period for the metric data has been determined in block 4503, control flows to block 4505. In block 4505, "Seasonal" is set to TRUE. In decision block 4506, the computational operations represented by blocks 4502-4504 are repeated for another sample rate.

Figure 46:
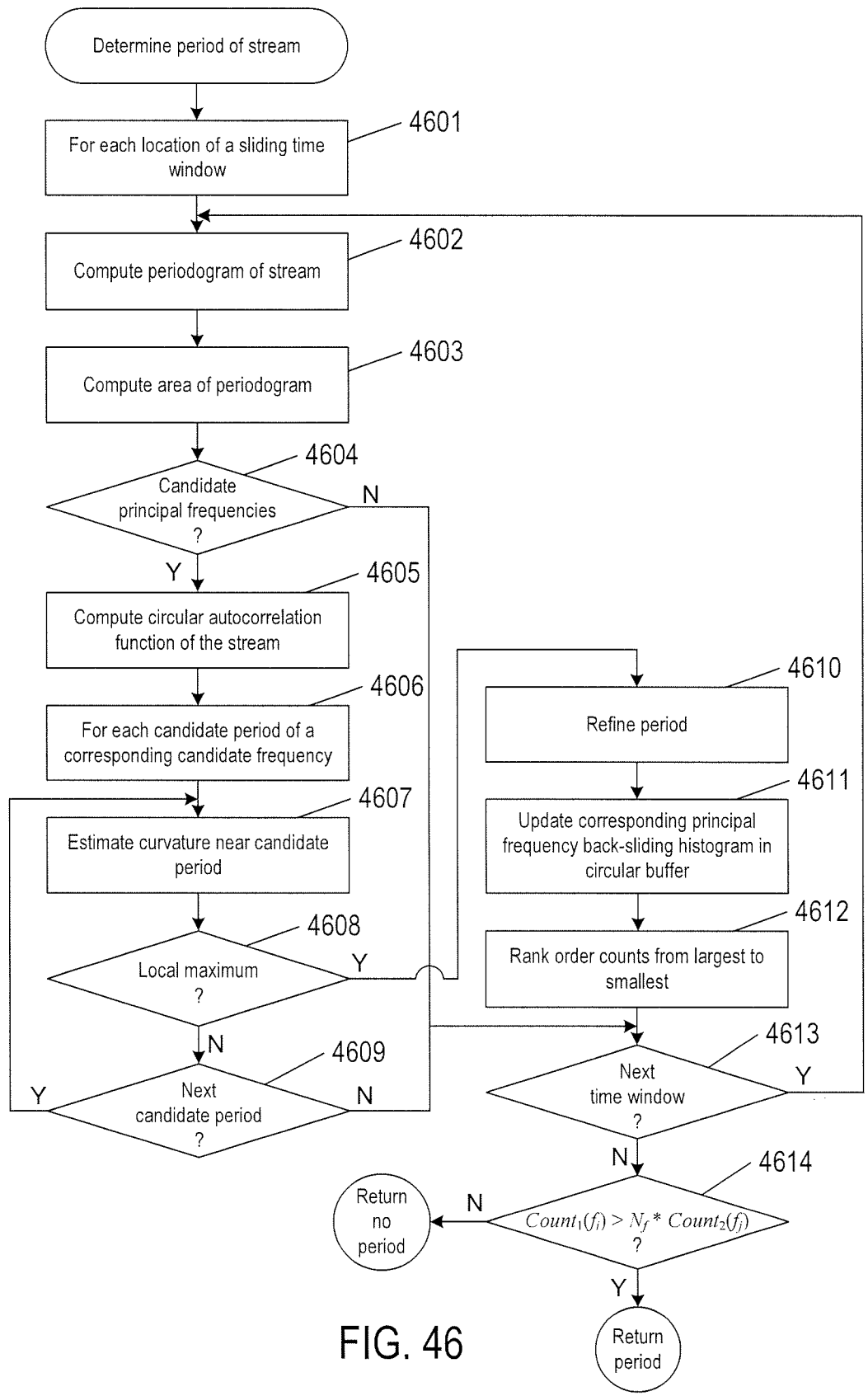
FIG. 46 shows a flow diagram illustrating an example implementation of the "determine period of stream" step referred to in FIG. 45.

FIG. 46 shows a flow diagram illustrating an example implementation of the "determine period of stream" step 4503 of FIG. 45. A loop beginning with block 4601 repeats the computational operations represented by blocks 4602-4613 for each time window as described above with reference to FIG. 29. In block 4602, a periodogram is computed for the time window as described above with reference to Equations (21)-(22) and FIG. 29. In block 4603, the area of the periodogram is computed as described above with reference to Equation (23). In decision block 4604, if no frequencies of the periodogram satisfy the condition of Equation (24), then no candidate principal frequencies exist in the periodogram, the process does not return a seasonal period for the time window, and control flows to block 4613. In block 4605, a circular autocorrelation function is computed in neighborhoods of candidate periods that correspond to the candidate principal frequencies, as described above with reference to Equation (25) and FIG. 30B. A loop beginning with block 4606 repeats the computational operations of blocks 4607-4609 for each candidate period. In block 4607, curvature near a candidate period is estimated as described above with reference to Equation (26). In decision block 4608, when the curvature corresponds to a local maximum, control flows to block 4609. In block 4610, the period is refined to the period that corresponds to the maximum ACF value in the neighborhood and the period is returned as the principal period, as described above with reference to FIG. 30C. In decision block 4609, operations represented by blocks 4607-4609 are repeated for another candidate period. Otherwise, no principal period (i.e., principal frequency) is returned. In block 4611, a principal frequency back-sliding histogram stored in a circular buffer is updated. In block 4612, the frequency counts of the frequencies in the principal frequency back-sliding histogram are rank ordered from largest to smallest. In decision block 4613, computational operations represented by blocks 4602-4612 are repeated for another location of the time window in the historical window of resampled metric data. In decision block 4614, when the condition described above with reference to Equation (28) is satisfied, the principal period that corresponds to principal frequency is returned.

Figure 47:
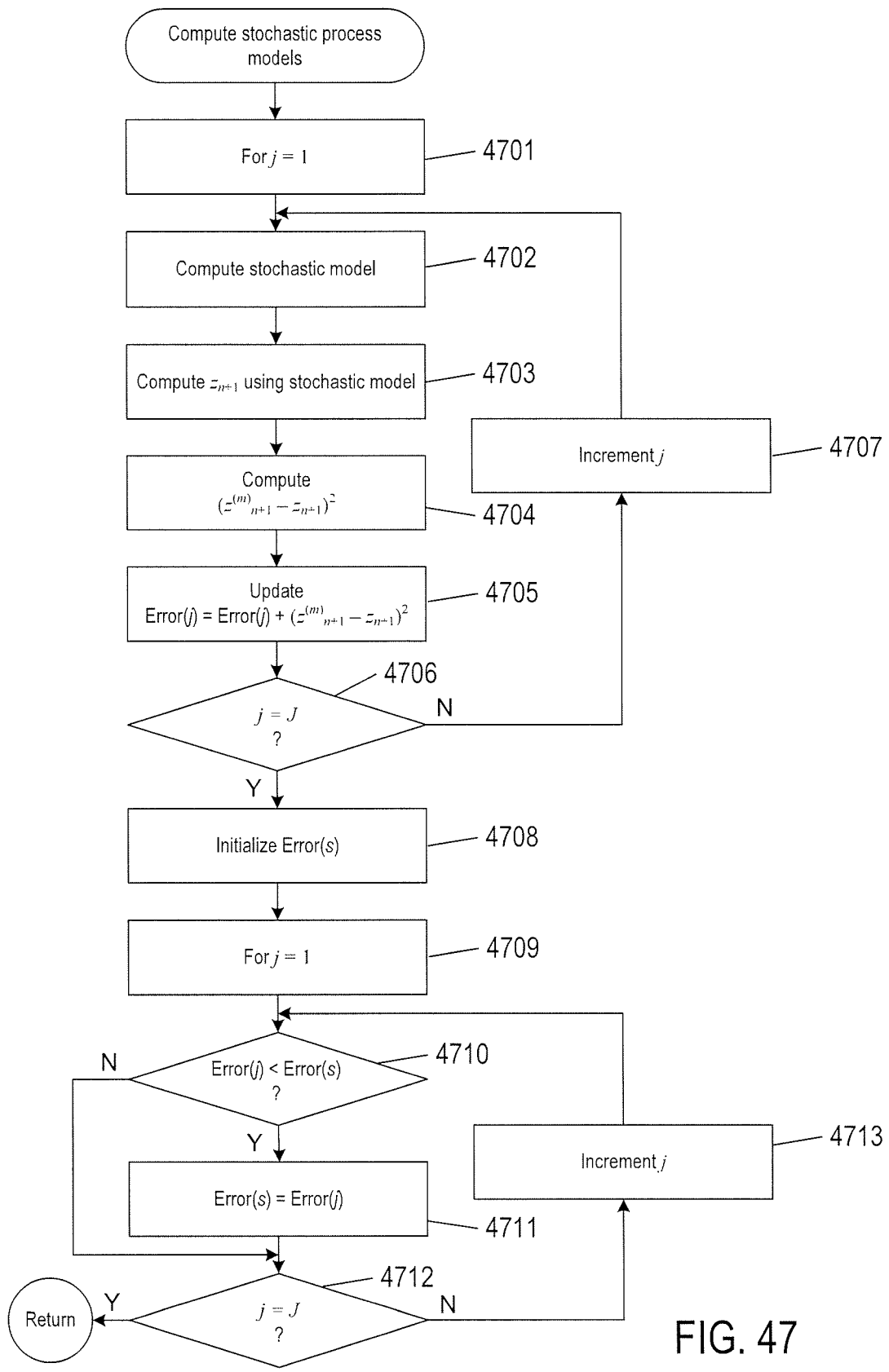
FIG. 47 shows a flow diagram illustrating an example implementation of the "compute stochastic model" step referred to in FIG. 42.

FIG. 47 shows a flow diagram illustrating an example implementation of the "compute stochastic model" step 4207 of FIG. 42. A loop beginning with block 4701 repeats the computational operations represented by blocks 4702-4707 for each j, where J is the number of different stochastic models. In block 4702, weight parameters of a stochastic process model are computed based on previous values of the non-trendy metric data in the historical window, as described above with reference to FIG. 21. In block 4703, when a new non-trendy (e.g., detrended) metric value is received, estimated metric value is computed using each of the stochastic process models as described above with reference to Equation (10) and FIG. 21. In block 4704, a residual error is computed for each of the stochastic process models as described above with reference to Equation (11). In block 4705, an accumulated residual error is computed for the stochastic model as described above with reference to Equation (11). In decision block 4706, when weight parameters and accumulated residual errors have been computed for each of stochastic process models, control flow to block 4708. Otherwise, the parameter j is incremented in block 4907. In block 4708, a minimum residual error is initialized (e.g., Error(s)=100). A loop beginning with block 4709 repeats the computational operations of blocks 4710-4712 for each stochastic process model to identify the stochastic process model with the smallest accumulated residual error. In decision block 4710, when the accumulated residual error of the j-th stochastic process model is less than the minimum residual error, control flows to block 4711. Otherwise, control flows to decision block 4712. In block 4711, the minimum residual error is set equal to the accumulated residual error. In decision block 4712, when accumulated residual errors for all J of the stochastic residual models have been considered control returns to FIG. 38. In block 4713, the parameter j is incremented.

Figure 48:
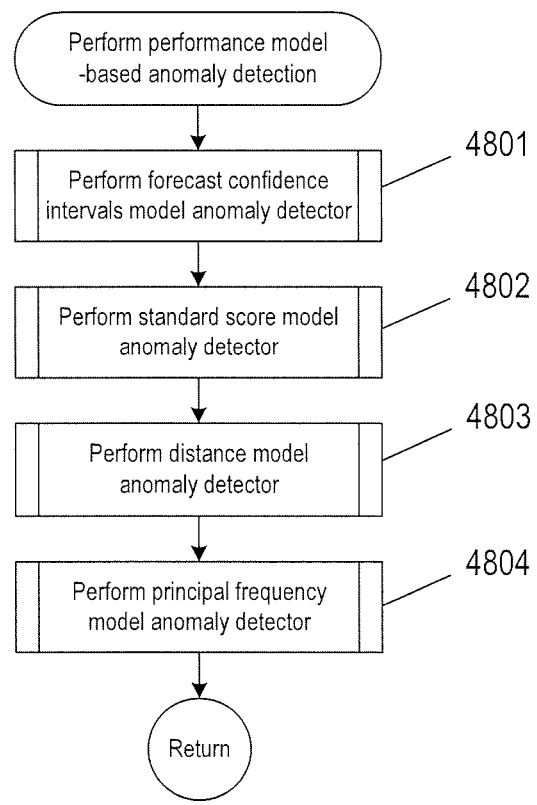
FIG. 48 shows a flow diagram illustrating an example implementation of the "perform performance model-based anomaly detection" step referred to in FIG. 38.

FIG. 48 shows a flow diagram illustrating an example implementation of the "perform performance model-based anomaly detection" step 3803 of FIG. 38. In block 4801, a "perform forecast confidence intervals model anomaly detection" procedure is performed. In block 4802, a "perform standard-score model anomaly detection" procedure is performed. In block 4803, a "perform distance model anomaly detection" procedure is performed. In block 4804, a "perform principal frequency model anomaly detection" procedure is performed.

Figure 49:
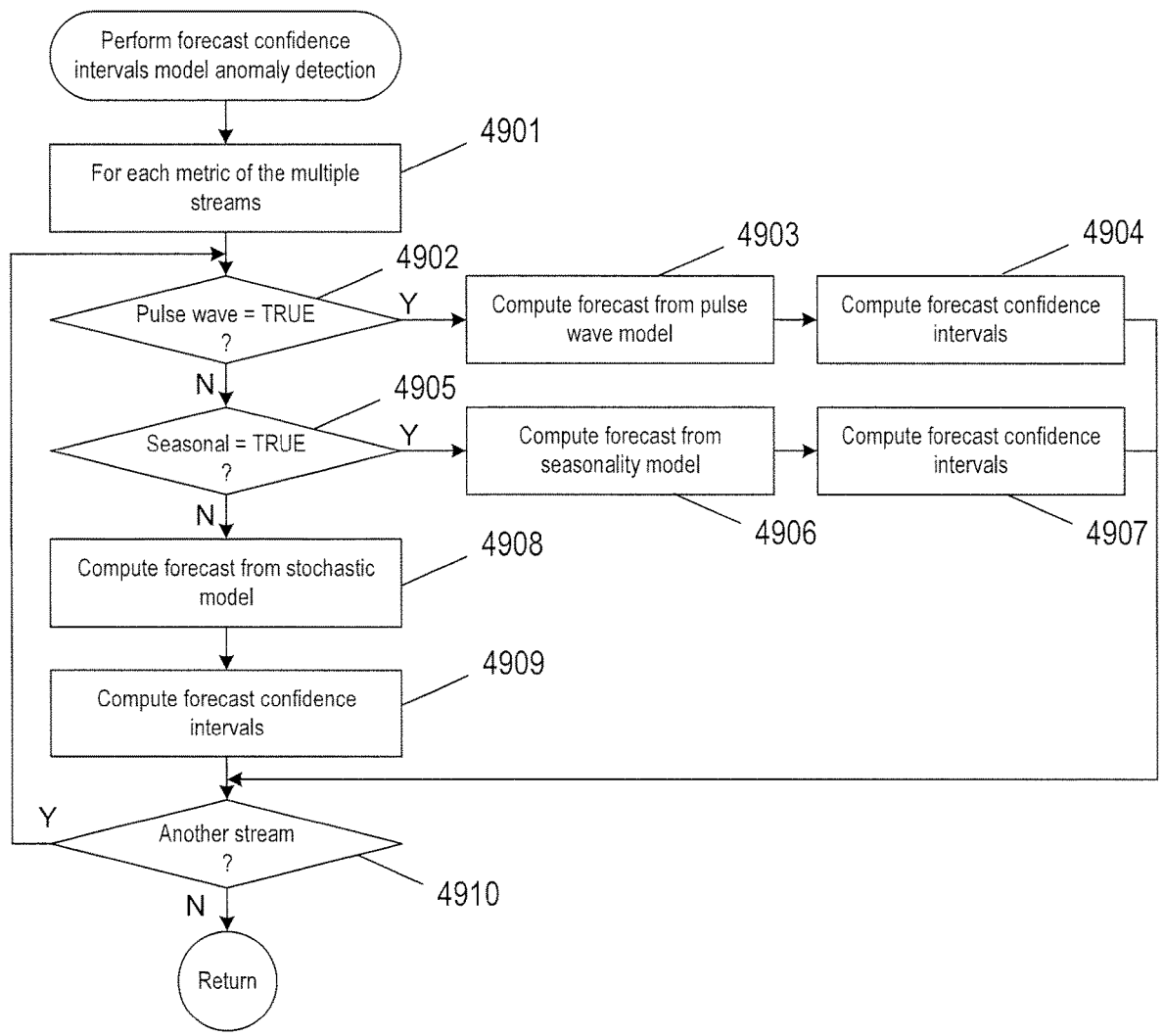
FIG. 49 shows a flow diagram illustrating an example implementation of the "perform forecast confidence intervals model anomaly detection" step referred to in FIG. 48.

FIG. 49 shows a flow diagram illustrating an example implementation of the "perform forecast confidence intervals model anomaly detection" step 4801 of FIG. 48. A loop beginning with block 4901 repeats the computational operations represented by blocks 4902-4909 for each stream of the multiple streams of metric data. In decision block 4902, when "Pulse wave" equals TRUE, control flows to block 4903. In block 4903, a forecast is computed from the pulse wave model as described above with reference to Equation (30) and FIG. 31B. In block 4904, forecast confidence intervals are computed as described above with reference to Equations (32a), (32b) and (35). In decision block 4905, when "Seasonal" equals TRUE, control flows to block 4906. In block 4906, a forecast is computed from the seasonal model as described above with reference to Equation (31) and FIG. 31C. In block 4907, forecast confidence intervals are computed as described above with reference to Equations (32a), (32b) and (35). In block 4908, a forecast is computed from the stochastic model as described above with reference to Equation (29) and FIG. 31A. In block 4909, forecast confidence intervals are computed as described above with reference to Equations (32a)-(35). In decision block 4910, when the metric value violates the forecast confidence interval control flows to block 4911. In block

1911, the resource associated with the metric that the violates the forecast confidence interval is identified as exhibiting anomalous behavior. In decision block 4912, the operations represented by blocks 4902-4911 are repeated for another metric in the streams of metric data.

Figure 50:
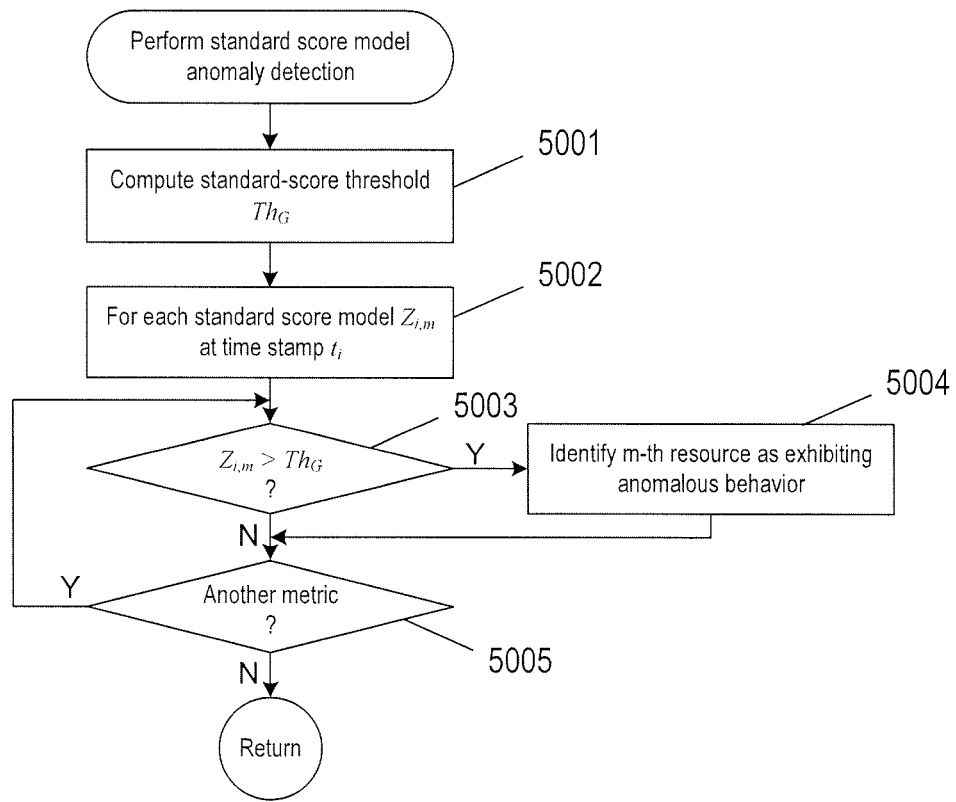
FIG. 50 shows a flow diagram illustrating an example implementation of the "perform standard-score model anomaly detection" step referred to in FIG. 48.

FIG. 50 shows a flow diagram illustrating an example implementation of the "perform standard-score model anomaly detection" step 4802 of FIG. 48. In block 5001, a standard-score threshold is computed as described above with reference to Equation (38b). A loop beginning with block 5002 repeats the computational operations represented by blocks 5003-5004 for each standard-score model. In decision block 5003, when the standard-score model is greater than the standard-score threshold control flows to block 5004. In block 5004, the resource associated with the standard-score model is identified as exhibiting anomalous behavior. In decision block 5005, block 5003 is repeated for another metric.

Figure 51:
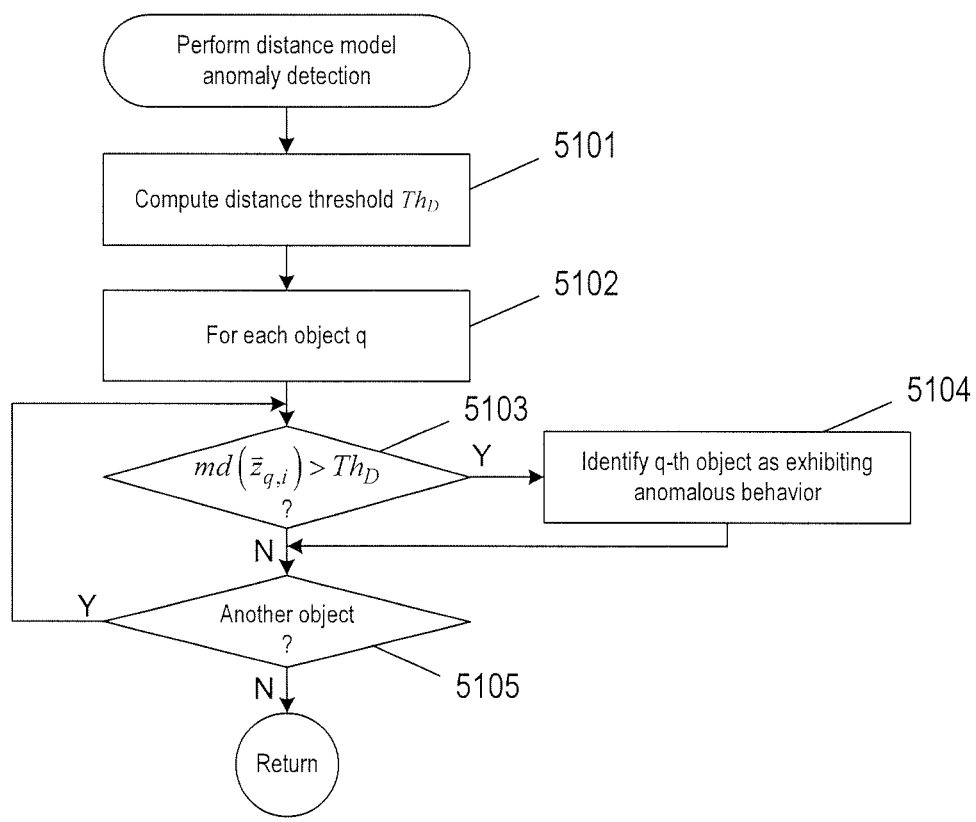
FIG. 51 shows a flow diagram illustrating an example implementation of the "perform distance model anomaly detection" step referred to in FIG. 48.

FIG. 51 shows a flow diagram illustrating an example implementation of the "perform distance model anomaly detection" step 4803 of FIG. 48. In block 5101, a distance threshold is computed as described above with reference to Equation (42). A loop beginning with block 5102 repeats the computational operations represented by blocks 5103-5104 for each object. In decision block 5103, when the distance model is greater than the distance threshold, control flows to block 5104. In block 5104, the object associate with the distance model is identified as exhibiting anomalous behavior. In decision block 5105, block 5103 is repeated for another object.

Figure 52:
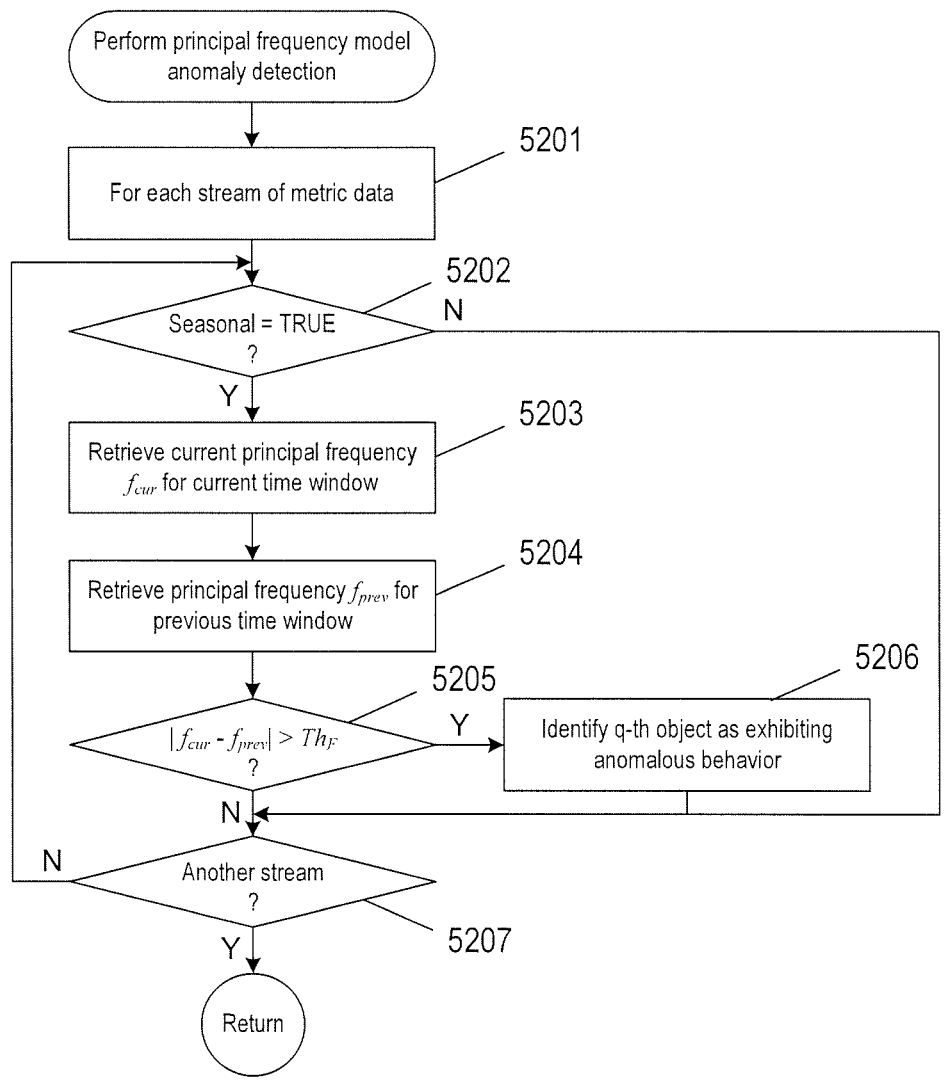
FIG. 52 shows a flow diagram illustrating an example implementation of the "perform principal frequency model anomaly detection" step referred to in FIG. 48.

FIG. 52 shows a flow diagram illustrating an example implementation of the "perform principal frequency model anomaly detection" step 4804 of FIG. 48. A loop beginning with block 5201 repeats the computational operations represented by block 5202-5206 for each stream of metric data. In decision block 5202, when seasonal equals TRUE, control flows to block 5203. In block 5203, a current principal frequency is retrieved for the current time window. In block 5204, a previous principal frequency is retrieved for a previous time window. In decision block 5205, when the condition given by Equation (43) is satisfied, control flows to block 5206. In block 5206, the resource associated with the stream of metric data is identified as exhibiting anomalous behavior. In decision block 5207, the operations represented by blocks 5202-5206 are repeated for another stream of the metric data.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A process stored in one or more data-storage devices and executed using one or more processors of a computer system to detect anomalous behavior exhibited by resources and objects of a distributed computing system, the process comprising:
    receiving multiple streams of metric data generated by metric sources in the distributed computing system;
    updating a performance model based on most recently received metric values of the streams of metric data, the performance being selected from a library of parametric, regression-based, and signal processing-based performance models;
    performing anomaly detection to detect changes in one or more of the streams of metric data based on the updated performance model, the streams of metric data being assigned probability scores based on a probability density function; and
    notifying an anomaly listener of anomalous behavior exhibited by a resource or object associated with a change detected in one or more of the streams of metric data.

2. The process of claim 1 wherein updating the performance model comprises:
    for new metric values of the streams of metric data,
        computing a mean of the recently received metric values, and
        computing a sample standard deviation of the recently received metric values; and
    for each new metric value of the streams of metric data, computing a standard-score model based on the recently received metric value, the mean, and the sample standard deviation.

3. The process of claim 1 wherein updating the performance model comprises:
    computing a mean usage tuple from new metric values of the streams of metric data, each element of the mean-usage tuple corresponding to the mean usage of a resource of the distributed computing system;
    forming a usage tuple from the new metric values of the resources;
    computing a covariance matrix of the new metric values of the resources; and
    computing a distance model that represents a distance from the usage tuple to the mean-usage tuple based on the usage tuple, the mean-usage tuple, and the covariance matrix.

4. The process of claim 1 wherein updating the performance model comprises:
    for each stream of the multiple streams of metric data,
        computing forecast metric values in a forecast interval; and
        computing a forecast confidence intervals model for each of the forecast metric values.

5. The process of claim 1 wherein updating the performance model comprises:
    for each stream of the streams of metric data,
        determining if the stream of the metric data is a seasonal stream of metric data;
        if the stream of metric data is a seasonal stream of metric data, computing a principal frequency of the stream of metric data based on new metric values in a current time window; and
        computing an absolute difference between the principal frequency in the current time window and a principal frequency in a previous time window.

6. The process of claim 1 wherein performing anomaly detection to detect changes in one or more of the streams of metric data based on the updated performance model comprises:
    determining a threshold based on the performance model; and
    when the performance model violates the threshold, identifying the resource or object as exhibiting anomalous behavior.

7. A computer system to detect anomalous behavior exhibited by resources and objects of a distributed computing system, the system comprising:
one or more processors;
one or more data-storage devices; and
machine-readable instructions stored in the one or more data-storage devices that when executed using the one or more processors controls the system to perform operations comprising:
receiving multiple streams of metric data generated by metric sources in of the distributed computing system;
updating a performance model based on most recently received metric values of the streams of metric data, the performance being selected from a library of parametric, regression-based, and signal processing-based performance models;
performing anomaly detection to detect changes in one or more of the streams of metric data based on the updated performance model, the streams of metric data being assigned probability scores based on a probability density function; and
notifying an anomaly listener of anomalous behavior exhibited by a resource or object associated with a change detected in one or more of the streams of metric data.

8. The system of claim 7 wherein updating the performance model comprises:
for new metric values of the streams of metric data,
computing a mean of the recently received metric values, and
computing a sample standard deviation of the recently received metric values; and
for each new metric value of the streams of metric data, computing a standard-score model based on the recently received metric value, the mean, and the sample standard deviation.

9. The system of claim 7 wherein updating the performance model comprises:
computing a mean usage tuple from new metric values of the streams of metric data, each element of the mean-usage tuple corresponding to the mean usage of a resource of the distributed computing system
forming a usage tuple from the new metric values of the resources;
computing a covariance matrix of the new metric values of the resources; and
computing a distance model that represents a distance from the usage tuple to the mean-usage tuple based on the usage tuple, the mean-usage tuple, and the covariance matrix.

10. The system of claim 7 wherein updating the performance model comprises:
for each stream of the multiple streams of metric data,
computing forecast metric values in a forecast interval; and
computing a forecast confidence intervals model for each of the forecast metric values.

11. The system of claim 7 wherein updating the performance model comprises:
for each stream of the streams of metric data,
determining if the stream of the metric data is a seasonal stream of metric data;
if the stream of metric data is a seasonal stream of metric data, computing a principal frequency of the stream of metric data based on new metric values in a current time window; and
computing an absolute difference between the principal frequency in the current time window and a principal frequency in a previous time window.

12. The system of claim 7 wherein performing anomaly detection to detect changes in one or more of the streams of metric data based on the updated performance model comprises:
determining a threshold based on the performance model; and
when the performance model violates the threshold, identifying the resource or object as exhibiting anomalous behavior.

13. A non-transitory computer-readable medium encoded with machine-readable instructions that controls one or more processors of a computer system to perform the operations comprising:
receiving multiple streams of metric data generated by metric sources in a distributed computing system;
updating a performance model based on most recently received metric values of the streams of metric data, the performance being selected from a library of parametric, regression-based, and signal processing-based performance models;
performing anomaly detection to detect changes in one or more of the streams of metric data based on the updated performance model, the streams of metric data being assigned probability scores based on a probability density function; and
notifying an anomaly listener of anomalous behavior exhibited by a resource or object of the distributed computing system, the resource or object associated with a change detected in one or more of the streams of metric data.

14. The medium of claim 13 wherein updating the performance model comprises:
for new metric values of the streams of metric data,
computing a mean of the recently received metric values, and
computing a sample standard deviation of the recently received metric values; and
for each new metric value of the streams of metric data, computing a standard-score model based on the recently received metric value, the mean, and the sample standard deviation.

15. The medium of claim 13 wherein updating the performance model comprises:
computing a mean usage tuple from new metric values of the streams of metric data, each element of the mean-usage tuple corresponding to the mean usage of a resource of the distributed computing system used by the object;
forming a usage tuple from the new metric values of the resources;
computing a covariance matrix of the new metric values of the resources; and
computing a distance model that represents a distance from the usage tuple to the mean-usage tuple based on the usage tuple, the mean-usage tuple, and the covariance matrix.

16. The medium of claim 13 wherein updating the performance model comprises:
for each stream of the multiple streams of metric data,
computing forecast metric values in a forecast interval; and
computing a forecast confidence interval for each of the forecast metric values.

17. The medium of claim 13 wherein updating the performance model comprises:
for each stream of the streams of metric data,
determining if the stream of the metric data is a seasonal stream of metric data;
if the stream of metric data is a seasonal stream of metric data, computing a principal frequency of the stream of metric data based on new metric values in a current time window; and
computing an absolute difference between the principal frequency in the current time window and a principal frequency in a previous time window.

18. The medium of claim 13 wherein performing anomaly detection to detect changes in one or more of the streams of metric data based on the updated performance model comprises:
determining a threshold based on the performance model; and
when the performance model violates the threshold, identifying the resource or object as exhibiting anomalous behavior.

\* \* \* \* \*